(12) United States Patent
Ogawa et al.

(10) Patent No.: US 8,017,263 B2
(45) Date of Patent: Sep. 13, 2011

(54) SEPARATOR AND BATTERY

(75) Inventors: Kenichi Ogawa, Fukushima (JP);
Hiroyuki Akashi, Kanagawa (JP);
Yosuke Konishi, Fukushima (JP);
Atsushi Kajita, Fukushima (JP);
Yoshiaki Obana, Fukushima (JP);
Tomitaro Hara, Fukushima (JP)

(73) Assignee: Sony Corporation, Tokyo (JP)

( * ) Notice: Subject to any disclaimer, the term of this patent is extended or adjusted under 35 U.S.C. 154(b) by 1175 days.

(21) Appl. No.: 11/626,249

(22) Filed: Jan. 23, 2007

(65) Prior Publication Data

US 2010/0255362 A1   Oct. 7, 2010

(30) Foreign Application Priority Data

Jan. 24, 2006  (JP) ................. 2006-015558

(51) Int. Cl.
  *H01M 2/16* (2006.01)
(52) U.S. Cl. ........ 429/145; 429/144
(58) Field of Classification Search .......... None
  See application file for complete search history.

(56) References Cited

U.S. PATENT DOCUMENTS

| | | | | |
|---|---|---|---|---|
| 4,560,633 A | * | 12/1985 | Kobayashi et al. | 429/213 |
| 6,153,337 A | * | 11/2000 | Carlson et al. | 429/247 |
| 7,510,803 B2 | | 3/2009 | Adachi et al. | |
| 7,745,050 B2 | * | 6/2010 | Kajita et al. | 429/251 |
| 2003/0031924 A1 | * | 2/2003 | Lee et al. | 429/142 |
| 2004/0115523 A1 | * | 6/2004 | Hommura et al. | 429/144 |
| 2005/0221185 A1 | * | 10/2005 | Sakata et al. | 429/231.8 |
| 2006/0222955 A1 | * | 10/2006 | Ogawa et al. | 429/254 |
| 2007/0122716 A1 | * | 5/2007 | Seo et al. | 429/251 |
| 2007/0178384 A1 | * | 8/2007 | Kajita et al. | 429/251 |

FOREIGN PATENT DOCUMENTS

| | | |
|---|---|---|
| JP | 8-153542 | 6/1998 |
| WO | WO 02 065561 A1 * | 8/2002 |
| WO | WO 03019713 | 3/2003 |

OTHER PUBLICATIONS

Linden et al., Handbook of Batteries, 1995, McGraw Hill, Third Edition, chapter 1.*

* cited by examiner

*Primary Examiner* — Robert Hodge
(74) *Attorney, Agent, or Firm* — K&L Gates LLP

(57) ABSTRACT

A battery in which a cathode and an anode are arranged so as to face each other an having a separator in between is provided. The separator is formed from a plurality of laminated microporous membranes and has a film thickness of 10x μm and a piercing strength of 150x gf or more, where $1 \leq x \leq 2$. The air permeability of one layer among the plurality of microporous membranes is equal to or larger than 10% of the air permeability of the whole separator.

16 Claims, 4 Drawing Sheets

SEPARATOR AND BATTERY

CROSS REFERENCES TO RELATED APPLICATIONS

The present application claims priority to Japanese Patent Application JP 2006-015558 filed in the Japanese Patent Office on Jan. 24, 2006, the entire contents of which is being incorporated herein by reference.

BACKGROUND

The present disclosure relates to a separator and a battery and, more particularly, to a microporous separator and a battery using such a separator.

Owing to the development of a recent portable electronic apparatus technique, electronic apparatuses such as cellular phones, notebook-sized computers, and the like are appreciated as a basic technique which supports an advanced information society. Studies and development regarding a technique for realizing advanced functions of those electronic apparatuses are vigorously being progressed. Electric power consumption of those electronic apparatuses is also increasing in proportion. On the contrary, it is requested that those electronic apparatuses can be driven for a long time and it is inevitably requested to realize high energy density of a secondary battery serving as a driving power source.

From viewpoints of an occupied volume, a mass, and the like of a battery which is built in the electronic apparatus, the larger energy density of the battery, the better. At present, lithium ion secondary batteries are built in most of the apparatuses because they have excellent energy density.

Generally, in the lithium ion secondary battery, lithium cobalt acid is used for a cathode, a carbon material is used for an anode, and an operating voltage is set to a value within a range from 2.5 to 4.2 V. In a single battery, a terminal voltage can be raised to 4.2V owing to an excellent electrochemical stability of a non-aqueous electrolyte material, a separator, and the like.

On the other hand, in the lithium ion secondary battery in the related art which operates at the maximum voltage of 4.2V, a cathode active material such as lithium cobalt acid or the like which is used for the cathode merely uses a capacitance of about 60% of its theoretical capacitance and a residual capacitance can be utilized in principle by further raising a charge voltage. Actually, it has been known that the high energy density can be realized by setting the voltage upon charging to 4.25V or more (for example, refer to a pamphlet of International Publication No. WO03/019713).

In such a lithium ion secondary battery, although the battery has been designed so as to assure sufficient safety under the ordinary using conditions, in order to cope with the realization of the recent high capacitance, higher safety is requested.

In a lithium ion secondary battery having a winded laminate structure, in order to realize higher safety, there has been proposed a technique to use a structure in which cathode/anode collector exposed portions are made to face cathode/anode outermost peripheral portions by a length of one circumference or more (for example, refer to JP-A-1996 (Heisei 8)-153542. According to such a lithium ion secondary battery, even if it is erroneously used, a sudden temperature increase of the battery can be suppressed by an inner short-circuit due to a contact of metals whose electric resistances are sufficiently small. The lithium ion secondary battery having such a structure has already been put into practical use and it has been confirmed that the excellent effect is obtained.

SUMMARY

However, in the case of the battery whose charge voltage has been set to a value over 4.2V, since a degree of risk that is caused by the erroneous using method increases more than that in the battery in the related art, it is necessary to further improve the safety. From a viewpoint of battery characteristics, it is also important to prevent load characteristics from deteriorating in association with the improvement of the safety.

In the battery whose charge voltage has been set to a value over 4.2V, therefore, it is desirable to provide a separator which can realize excellent safety without causing a deterioration in load characteristics and to provide a battery using such a separator.

According to an embodiment, there is provided a battery in which a cathode and an anode are arranged so as to face each other with having a separator in between, wherein the separator is formed by a plurality of laminated microporous membranes and has a film thickness of 10x μm and a piercing strength of 150x gf or more (where, $1 \leq x \leq 2$), and air permeability of one layer among the plurality of microporous membranes is equal to or larger than 10% of air permeability of the whole separator.

According to another embodiment, there is provided a separator formed by a plurality of laminated microporous membranes, wherein the separator has a film thickness of 10x μm and a piercing strength of 150x gf or more (where, $1 \leq x \leq 2$), and air permeability of one layer among the plurality of microporous membranes is equal to or larger than 10% of air permeability of the whole separator.

According to the present embodiments, the film thickness of the separator formed by the plurality of laminated microporous membranes is equal to 10x μm, the piercing strength is equal to or larger than 150x gf (where, $1 \leq x \leq 2$), and the air permeability of one layer among the plurality of microporous membranes is equal to or larger than 10% of the air permeability of the whole separator. Therefore, an increase in temperature of the battery in an abnormal state can be suppressed without causing a deterioration of load characteristics.

According to still another embodiment, there is provided a battery in which a cathode and an anode are arranged so as to face each other with having a separator in between, wherein the separator is formed by a plurality of laminated microporous membranes and has a film thickness of 10x μm and a piercing strength of 150x gf or less (where, $1 \leq x \leq 2$), and air permeability of one layer among the plurality of microporous membranes is equal to or larger than 35% of air permeability of the whole separator.

According to another embodiment, there is provided a separator formed by a plurality of laminated microporous membranes, wherein the separator has a film thickness of 10x μm and a piercing strength of 150x gf or less (where, $1 \leq x \leq 2$), and air permeability of one layer among the plurality of microporous membranes is equal to or larger than 35% of air permeability of the whole separator.

According to the present embodiments, the film thickness of the separator formed by the plurality of laminated microporous membranes is equal to 10x μm, the piercing strength is equal to or smaller than 150x gf (where, $1 \leq x \leq 2$), and the air permeability of one layer among the plurality of microporous membranes is equal to or larger than 35% of the air permeability of the whole separator. Therefore, an increase in temperature of the battery in an abnormal state can be suppressed without causing a deterioration of load characteristics.

According to the present embodiments, it is preferable that an open circuit voltage in a full charging state per pair of cathode and anode lies within a range from 4.25V to 6.00V, both inclusive. As an anode, it is possible to use an anode containing a carbon material or an anode containing a metal material which can dope and dedope alkaline metal ions or alkaline earth metal ions. It is preferable that a carbon material contains at least one kind selected from a group including graphite, easy-graphitizable carbon i.e. soft carbon, and non-easy-graphitizable carbon i.e. hard carbon. It is preferable that an alkaline metal or an alkaline earth metal contains at least one kind selected from a group including silicon, germanium, tin, and lead.

According to the present embodiments, it is preferable that the microporous membrane has an air permeability which is equal to or larger than 10% of that of the whole separator and the microporous membranes other than such a microporous membrane have different air permeability values. It is also preferable that a melting point of the microporous membrane having air permeability which is equal to or larger than 10% of that of the whole separator is lower than those of the microporous membranes other than such a microporous membrane. It is also preferable that a plurality of microporous membranes used in the separator are made of polyolefin. It is also preferable that the microporous membrane has an air permeability which is equal to or larger than 10% of that of the whole separator is made of polyethylene.

According to the present embodiments, it is preferable that the microporous membrane has an air permeability which is equal to or larger than 35% of that of the whole separator and the microporous membranes other than such a microporous membrane have the different air permeability values. It is also preferable that a melting point of the microporous membrane having an air permeability which is equal to or larger than 35% of that of the whole separator is lower than those of the microporous membranes other than such a microporous membrane. It is also preferable that a plurality of microporous membranes used in the separator are made of polyolefin. It is also preferable that the microporous membrane has an air permeability which is equal to or larger than 35% of that of the whole separator is made of polyethylene.

As described above, according to the present embodiments, the increase in temperature of the battery in the abnormal state can be suppressed without causing the deterioration of the load characteristics. Therefore, the battery having good load characteristics and excellent safety can be realized.

Additional features and advantages are described herein, and will be apparent from, the following Detailed Description and the figures.

BRIEF DESCRIPTION OF THE FIGURES

DETAILED DESCRIPTION (1) First Embodiment (1-1) Construction of Secondary Battery FIG. 1 is a cross sectional view showing an example of a construction of a secondary battery according to the first embodiment. This secondary battery is what is called a lithium ion secondary battery in which lithium (Li) is used as an electrode reactive substance and a capacitor of an anode is expressed by a capacitive component due to dope and dedope of lithium. This battery is what is called a cylindrical type and a winded electrode member 20 around which a pair of belt-shaped cathode 21 and a belt-shaped anode 22 have been wound through a separator 23 is provided in an almost hollow cylindrical battery can 11. An electrolytic solution as a liquid electrolyte is impregnated in the separator 23. The battery can 11 is made of, for example, iron (Fe) plated with nickel (Ni). One end portion of the battery can 11 is closed and the other end portion is open. A pair of insulating plates 12 and 13 are respectively arranged perpendicularly to a wound peripheral surface so as to sandwich the winded electrode member 20.

Figure 1:
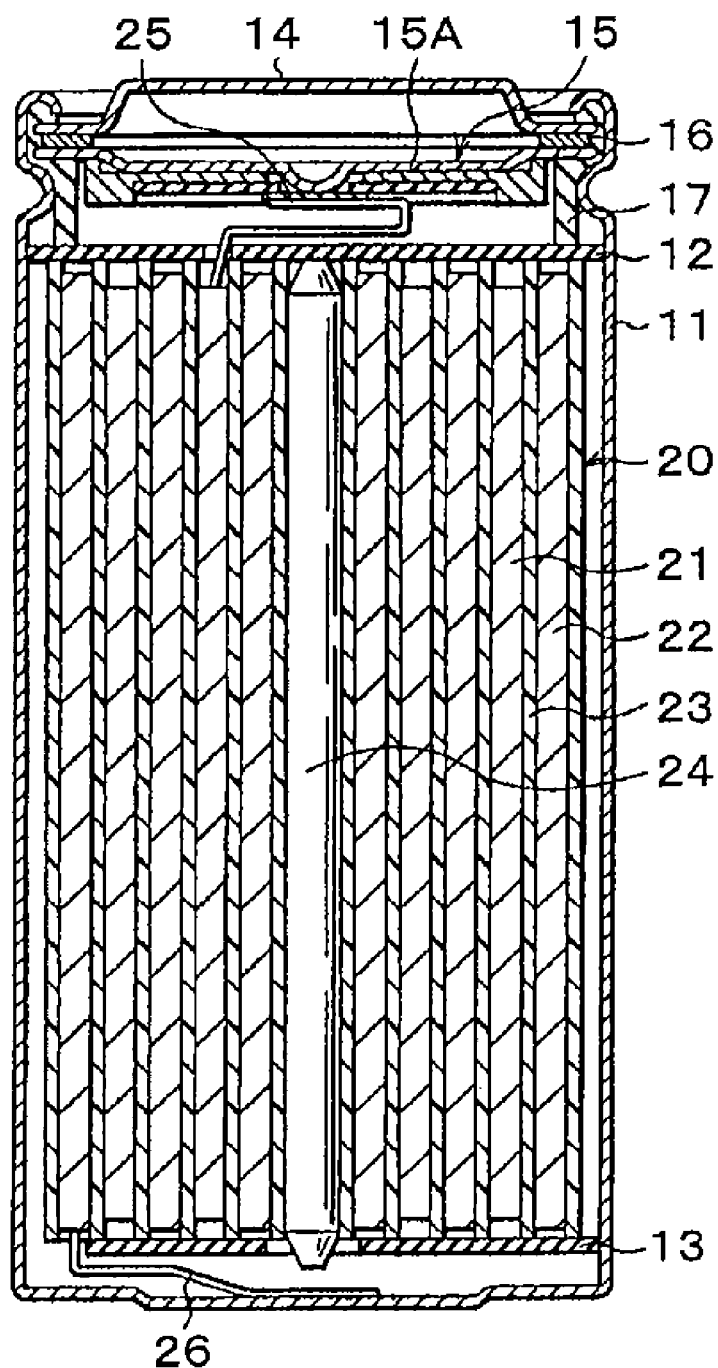
FIG. 1 is a cross sectional view showing an example of a construction of a secondary battery according to a first embodiment.

A battery cap 14 and a relief valve mechanism 15 and a thermally-sensitive resistive element (PTC element: Positive Temperature Coefficient element) 16 provided in the battery cap 14 are caulked through a gasket 17 and attached to the open end portion of the battery can 11. The inside of the battery can 11 is sealed. The battery cap 14 is made of for example, a material similar to that of the battery can 11. The relief valve mechanism 15 is electrically connected to the battery cap 14 through the PTC element 16. When an inner pressure of the battery rises to a predetermined value or more due to an inner short-circuit, heating from the outside, or the like, a disk plate 15A is turned round, thereby disconnecting the electrical connection between the battery cap 14 and the winded electrode member 20. When a temperature rises, a current is limited due to an increase in resistance value of the PTC element 16 and abnormal heat generation by the large current is prevented. For example, the PTC element 16 operates at a temperature of 120° C. or higher. The gasket 17 is made of, for example, an insulating material and its surface is coated with asphalt.

The winded electrode member 20 is wound around, for example, a center pin 24 as a center. A cathode lead 25 made of aluminum (Al) or the like is connected to the cathode 21 of the winded electrode member 20. An anode lead 26 made of nickel or the like is connected to the anode 22. The cathode lead 25 is welded to the relief valve mechanism 15, so that it is electrically connected to the battery cap 14. The anode lead 26 is welded and electrically connected to the battery can 11.

Figure 2:
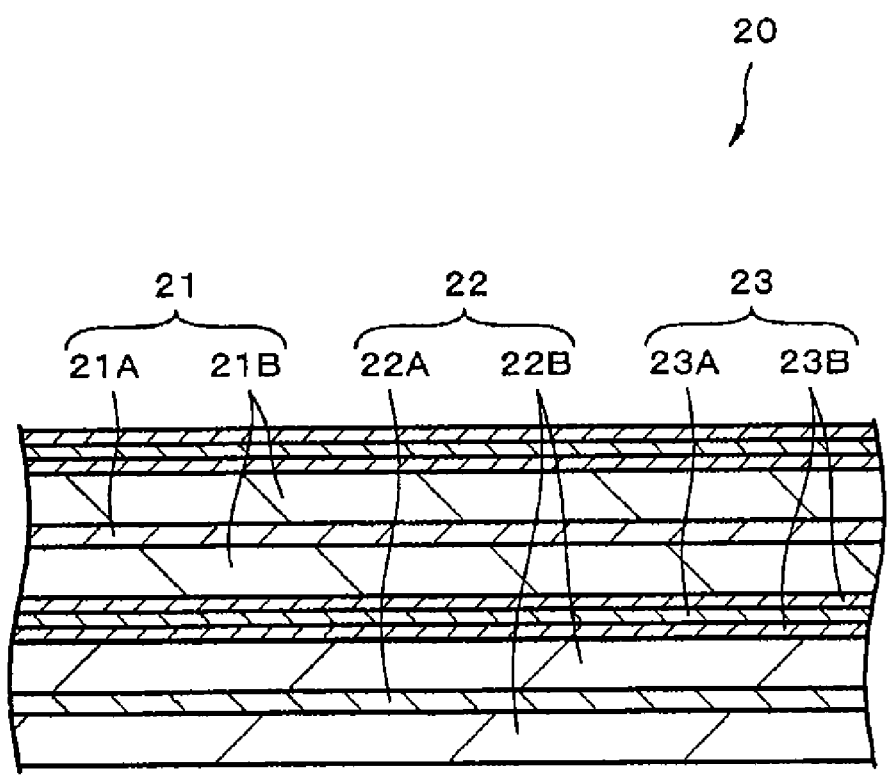
FIG. 2 is a cross sectional view showing enlargedly a part of a winded electrode member in the secondary battery shown in FIG. 1.

FIG. 2 enlargedly shows a part of the winded electrode member 20 shown in FIG. 1. The cathode 21, anode 22, separator 23, and electrolyte constructing the secondary battery will be sequentially explained hereinbelow with reference to FIG. 2.

(Cathode)

The cathode 21 has a structure in which, for example, cathode active material layers 21B are provided for both surfaces of a cathode collector 21A having a pair of surfaces which face each other. Although not shown, the cathode active material layer 21B may be provided for only one surface of the cathode collector 21A. The cathode collector 21A is made of, for example, a metal foil such as an aluminum foil or the like. As a cathode active material, the cathode active material layer 21B contains, for example, one, two, or more kinds of cathode materials which can dope and dedope lithium and is constructed so as to contain a conductive material such as graphite or the like and a binder such as polyvinylidene fluoride or the like as necessary.

For example, a compound containing lithium such as lithium oxide, lithium phosphorus oxide, lithium sulfide, interlayer compound containing lithium, or the like is properly used as a cathode material which can dope and dedope lithium, or two or more kinds of them may be mixed and used. In order to increase an energy density, lithium-contained compounds containing lithium, a transition metal element, and oxygen (O) are preferable. Among them, it is preferable to use a lithium-contained compound containing at least one kind selected from a group including cobalt (Co), nickel, manganese (Mn), and iron as a transition metal element. As such a lithium-contained compound, for example, the following materials can be mentioned: a lithium composite oxide having a stratified rock-salt type structure shown in Formula 1, 2, or 3; a lithium composite oxide having a spinel type structure shown in Formula 4; a lithium composite phosphate having an olivin type structure shown in Formula 5; or the like. Specifically speaking, $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1), or the like can be mentioned.

$$Li_jMn_{(1-g-h)}Ni_gM1_hO_{(2-j)}F_k \quad \text{(Formula 1)}$$

(in the formula, M1 denotes at least one kind selected from a group including cobalt, magnesium (Mg), aluminum, boron (B), titanium (Ti), vanadium (V), chromium (Cr), iron, copper (Cu), zinc (Zn), zirconium (Zr), molybdenum (Mo), tin (Sn), calcium (Ca), strontium (Sr), and tungsten (W); f is set to a value within a range of 0.8≦f≦1.2; g is set to a value within a range of 0<g<0.5; h is set to a value within a range of 0≦h≦0.5; g+h<1; j is set to a value within a range of −0.1≦j≦0.2; and k is set to a value within a range of 0≦k≦0.1. Compositions of lithium differ depending on the charging/discharging state and the value of f indicates a value in the full discharging state).

$$Li_mNi_{(1-n)}M2_nO_{(2-p)}F_q \quad \text{(Formula 2)}$$

(in the formula, M2 denotes at least one kind selected from a group including cobalt, manganese, magnesium, aluminum, boron, titanium, vanadium, chromium, iron, copper, zinc, molybdenum, tin, calcium, strontium, and tungsten; m is set to a value within a range of 0.8≦m≦1.2; n is set to a value within a range of 0.005≦n≦0.5; p is set to a value within a range of −0.1≦p≦0.2; and q is set to a value within a range of 0≦q≦0.1. Compositions of lithium differ depending on the charging/discharging state and the value of m indicates a value in the full discharging state).

$$Li_rCo_{(1-s)}M3_sO_{(2-t)}F_u \quad \text{(Formula 3)}$$

(in the formula, M3 denotes at least one kind selected from a group including nickel, manganese, magnesium, aluminum, boron, titanium, vanadium, chromium, iron, copper, zinc, molybdenum, tin, calcium, strontium, and tungsten; r is set to a value within a range of 0.8≦r≦1.2; s is set to a value within a range of 0≦s<0.5; t is set to a value within a range of −0.1≦t≦0.2; and u is set to a value within a range of 0≦u≦0.1. Compositions of lithium differ depending on the charging/discharging state and the value of r indicates a value in the full discharging state).

$$Li_vMn_{2-w}M4_wO_xF_y \quad \text{(Formula 4)}$$

(in the formula, M4 denotes at least one kind selected from a group including cobalt, nickel, magnesium, aluminum, boron, titanium, vanadium, chromium, iron, copper, zinc, molybdenum, tin, calcium, strontium, and tungsten; v is set to a value within a range of 0.9≦v≦1.1; w is set to a value within a range of 0≦w≦0.6; x is set to a value within a range of 3.7≦x≦4.1; and y is set to a value within a range of 0≦y≦0.1. Compositions of lithium differ depending on the charging/discharging state and the value of v indicates a value in the full discharging state).

$$Li_zM5PO_4 \quad \text{(Formula 5)}$$

(in the formula, M5 denotes at least one kind selected from a group including cobalt, manganese, iron, nickel, magnesium, aluminum, boron, titanium, vanadium, niobium, copper, zinc, molybdenum, calcium, strontium, tungsten, and zirconium; z is set to a value within a range of 0.9≦z≦1.1. Compositions of lithium differ depending on the charging/discharging state and the value of z indicates a value in the full discharging state).

As a cathode material which can dope and dedope lithium, inorganic compounds such as $MnO_2$, $V_2O_5$, $V_6O_{13}$, NiS, MoS, and the like which do not contain lithium can be also mentioned besides those materials.

(Anode)

The anode 22 has a structure in which, for example, anode active material layers 22B are provided for both surfaces of an anode collector 22A having a pair of surfaces which face each other. Although not shown, the anode active material layer 22B may be provided for only one surface of the anode collector 22A. The anode collector 22A is made of, for example, a metal foil such as a copper foil or the like.

As an anode active material, the anode active material layer 22B is made by containing one, two, or more kinds selected from the anode materials which can dope and dedope lithium. The anode active material layer 22B is made by containing a binder similar to that of the cathode active material layer 21B as necessary.

In this secondary battery, an electrochemical equivalent of an anode material which can dope and dedope lithium is larger than that of the cathode 21 and a lithium metal is not precipitated into the anode 22 during the charging.

In this secondary battery, an open circuit voltage (that is, battery voltage) upon full charging is set so as to lie within a range from 4.25V or more to 4.60V, both inclusive or a range from 4.35V to 4.60V, both inclusive. Therefore, even in the case of the same cathode active material, since an emission amount of lithium per unit mass is larger than that of the battery in which the open circuit voltage upon full charging is equal to 4.20V, an amount of the cathode active material and that of the anode active material are adjusted in accordance with the emission amounts of lithium. Thus, the high energy density can be obtained.

As an anode material which can dope and dedope lithium, for example, a carbon material such as non-easy-graphitizable carbon i.e. hard carbon, easy-graphitizable carbon i.e. soft carbon, graphite, pyrolytic carbon class, coke class, glassy carbon class, organic high molecular compound baked material, carbon fiber, activated charcoal, or the like can be mentioned. Among them, there is a pitch coke, a needle coke, a petroleum coke, or the like as a coke class. The organic high molecular compound baked material denotes a material obtained by baking a high molecular material such as phenol resin, fran resin, or the like at a proper temperature and carbonating it. A part of those materials are classified into non-easy-graphitizable carbon i.e. hard carbon, or easy-graphitizable carbon i.e. soft carbon. Polyacetylene, polypyrrole, or the like can be mentioned as a high molecular material. Those carbon materials are preferable because a change in crystal structure which is caused upon charging or discharging is very small, a high charge/discharge capacitance can be obtained, and good cycle characteristics can be obtained. Particularly, the graphite is preferable because the electrochemical equivalent is large and the high energy density can be obtained. The non-easy-graphitizable carbon i.e. hard carbon, is preferable because excellent characteristics can be obtained. Further, a material whose charge/discharge potential is low, specifically speaking, a material whose charge/discharge potential is close to that of the lithium metal is preferable because the high energy density of the battery can be easily realized.

As an anode material which can dope and dedope lithium, a material which can dope and dedope lithium and contains at least one kind selected from a metal element and a semimetal element as a component element can be also mentioned. By using such a material, the high energy density can be obtained. Particularly, if it is used together with the carbon material, since the high energy density can be obtained and excellent cycle characteristics can be obtained, it is more preferable. Such an anode material may be a sole element of the metal element or the semimetal element, an alloy of them, or a compound of them. A material containing a phase or phases of one, two, or more kinds of them in at least a part of it. In the embodiment, in addition to an alloy containing two or more kinds of metal elements, an alloy containing one or more kinds of metal elements and one or more kinds of semimetal elements is also incorporated. The material may also contain a non-metal element. As its texture, there is a solid solution, an eutectic (eutectic mixture), an intermetallic compound, or a texture in which two or more kinds of them coexist.

As such a metal element or semimetal element constructing the anode material, for example, magnesium, boron, aluminum, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), or platinum (Pt) can be mentioned. They may be crystalline or amorphous.

Among them, as an anode material, a material containing a metal element or a semimetal element of the 4B group in the short period type periodic table as a component element is preferable. A material containing at least either silicon or tin as a component element is particularly preferable. This is because according to silicon and tin, an ability of doping and dedoping lithium is high and the high energy density can be obtained.

As an alloy of tin, for example, an alloy containing at least one kind selected from a group including silicon, nickel, copper, iron, cobalt, manganese, zinc, indium, silver, titanium (Ti), germanium, bismuth, antimony (Sb), and chromium as a second component element other than tin can be mentioned. As an alloy of silicon, for example, an alloy containing at least one kind selected from a group including tin, nickel, copper, iron, cobalt, manganese, zinc, indium, silver, titanium, germanium, bismuth, antimony, and chromium as a second component element other than silicon can be mentioned.

As a compound of tin or a compound of silicon, for example, a compound containing oxygen (O) or carbon (C) can be mentioned. In addition to tin or silicon, the foregoing second component element may be contained.

As an anode material which can dope and dedope lithium, further, another metal compound or a high molecular material can be mentioned. As another metal compound, an oxide such as $MnO_2$, $V_2O_5$, $V_6O_{13}$, or the like, a sulfide such as NiS, MoS, or the like, or a lithium nitride such as $LiN_3$ or the like can be mentioned. As a high molecular material, polyacetylene, polyaniline, polypyrrole, or the like can be mentioned.

(Separator)

The separator 23 has: a base material layer 23A; and a surface layer 23B provided on the surface of the base material layer 23A on the side which faces the cathode 21 or surface layers 23B provided on both surfaces of the base material layer 23A. In FIG. 2, a case where the surface layers 23B are provided on both surfaces of the base material layer 23A is illustrated.

It is preferable that a thickness of separator 23 lies within a range from 10 µm or more to 20 µm or less. This is because if the thickness is small, there is a case where a short-circuit occurs, and if the thickness is large, an ion conductivity deteriorates and a volume capacitance decreases. It is preferable that air permeability of the separator 23 lies within a range from 100 [sec/100 ml] or more to 600 [sec/100 ml] or less. This is because if the air permeability is low, there is a case where the short-circuit occurs, and if the air permeability is high, the ion conductivity deteriorates. Further, it is preferable that a porosity of the separator 23 lies within a range from 30% or more to 60% or less. This is because if the porosity is small, the ion conductivity deteriorates, and if the porosity is large, there is a case where the short-circuit occurs. In addition, it is preferable that a piercing strength of the separator 23 is equal to or larger than 100 gf. This is because when the piercing strength is too small, the short-circuit could occur. It is also preferable that the piercing strength of the separator 23 is equal to or smaller than 800 gf. This is because when the piercing strength is too large, the ion conductivity becomes too low. It is more preferable that the piercing strength is smaller than 600 gf.

The base material layer 23A is a microporous membrane made of, for example, polyolefin. As polyolefin constructing the microporous membrane, for example, polypropylene or polyethylene can be used. The microporous membrane made of polyolefin is preferable because it has an excellent short-circuit preventing effect and the improvement of the battery safety due to a shut-down effect can be realized. Particularly, polyethylene is preferable as a material constructing the base material layer 23A because the shut-down effect can be obtained within a range from 100° C. or more to 160° C. or less and it has an excellent electrochemical stability. Polypropylene is also preferable. As another material, it can be used by being copolymerized with polyethylene or polypropylene or by being blended therewith so long as it is a resin having a chemical stability.

The surface layer 23B is made by containing at least one kind selected from a group including, for example, polyvinylidene fluoride, polytetrafluoro ethylene, polypropylene, and aramid. Thus, the chemical stability is improved and the occurrence of the small short-circuit is suppressed. The surface layer 23B on the side which faces the cathode 21 and the surface layer 23B on the side which faces the anode 22 are not limited to the same material but they may be made of different materials.

The base material layer 23A and the surface layer 23B have different air permeability values. It is preferable that the air permeability of the base material layer 23A lies within a range from 15 [sec/100 ml] or more to 600 [sec/100 ml] or less. This is because if the air permeability is less than 15 [sec/100 ml], there is a case where the short-circuit occurs. If the air permeability exceeds 600 [sec/100 ml], the load characteristics deteriorate.

It is preferable that the air permeability of the surface layer 23B lies within a range from 45 [sec/100 ml] or more to 600 [sec/100 ml] or less. This is because if the air permeability is less than 45 [sec/100 ml], there is a case where the short-circuit occurs. If the air permeability exceeds 600 [sec/100 ml], the load characteristics deteriorate.

The separator 23 has the film thickness of 10 μm or more and 20 μm or less. When the film thickness of the separator is expressed as 10x μm using factor x wherein $1 \leq x \leq 2$, and the piercing strength is 150x gf or more, it is preferable that the air permeability of at least one layer of microporous membranes constructing each layer of the separator, for example, the base material layer 23A is equal to or larger than 10% of that of the whole separator. In other words, the separator 23 has the film thickness of 10x μm and the piercing strength of 150x gf or more wherein $1 \leq x \leq 2$, and the air permeability of one layer of a plurality of the microporous membranes is equal to or larger than 10% of that of the whole separator. If the air permeability is less than 10%, the safety deteriorates.

When the film thickness of the separator is expressed as 10x μm using factor x wherein $1 \leq x \leq 2$, and the piercing strength is 150x gf or less, it is preferable that the air permeability of at least one layer of microporous membranes constructing each layer of the separator, for example, the base material layer 23A is equal to or larger than 35% of that of the whole separator. In other words, the separator 23 has the film thickness of 10x μm and the piercing strength of 150x gf or less wherein $1 \leq x \leq 2$, and the air permeability of one layer of a plurality of the microporous membranes is equal to or larger than 35% of that of the whole separator. If the air permeability is less than 35%, the safety deteriorates.

It is preferable that a melting point of a material constructing the base material layer 23A is lower than that of the surface layers 23B. Since the melting points differ as mentioned above, for example, in the case where a large current flows in the battery and heat is generated from the battery, the base material layer 23A is softened by the heat generation, the shut-down occurs, and the shape of the separator 23 can be maintained by the surface layers 23B.

It is preferable that the thickness of material layer 23A lies within a range from 4.9 μm or more to 20 μm or less. If the thickness is less than 4.9 μm, the suppressing effect of the occurrence of the small short-circuit decreases. If the thickness exceeds 20 μm, the ion conductivity deteriorates and the volume capacitance decreases.

It is preferable that the thickness of surface layer 23B on the side which faces the cathode 21 lies within a range from 0.1 μm or more to 10 μm or less. If the thickness is less than 0.1 μm, the suppressing effect of the occurrence of the small short-circuit decreases. If the thickness exceeds 10 μm, the ion conductivity deteriorates and the volume capacitance decreases.

It is preferable that the thickness of surface layer 23B on the side which faces the anode 22 lies within a range from 0.1 μm or more to 10 μm or less. If the thickness is less than 0.1 μm, the suppressing effect of the occurrence of the small short-circuit decreases. If the thickness exceeds 10 μm, the ion conductivity deteriorates and the volume capacitance decreases.

(Electrolyte)

An electrolytic solution as a liquid electrolyte contains a solvent and an electrolytic salt dissolved into the solvent. Cyclic carbonic ester such as ethylene carbonate, propylene carbonate, or the like can be used as a solvent. It is preferable that either ethylene carbonate or propylene carbonate or, particularly, both of them are mixed and used. This is because the cycle characteristics can be improved.

As a solvent, it is preferable to mix and use chain-like carbonic ester such as diethyl carbonate, dimethyl carbonate, ethylmethyl carbonate, methylpropyl carbonate, or the like in addition to those cyclic carbonic ester. This is because the high ion conductivity can be obtained.

Further, as a solvent, it is preferable to contain 2,4-difluoroanisole or vinylene carbonate. This is because in the case of 2,4-difluoroanisole, the discharge capacitance can be improved and in the case of vinylene carbonate, the cycle characteristics can be improved. Therefore, if they are mixed and used, since the discharge capacitance and the cycle characteristics can be improved, it is preferable.

As other solvents, the following materials can be mentioned: butylene carbonate, γ-butyrolactone, γ-valerolactone, 1,2-dimethoxy ethane, tetrahydrofuran, 2-methyl tetrahydrofuran, 1,3-dioxorane, 4-methyl-1,3-dioxorane, methyl acetate, methyl propionate, acetonitrile, glutaronitrile, adiponitrile, methoxy acetonitrile, 3-methoxy propylonitrile, N,N-dimethyl formamide, N-methylpyrrolidinone, N-methyl oxazolidinone, N,N-dimethyl imidazolidinone, nitromethane, nitroethane, sulfolan, dimethyl sulfoxide, trimethyl phosphate, and the like.

There is also a case where a compound in which hydrogen in at least a part of those non-aqueous solvents has been replaced by fluorine is preferable because there is a case where the reversibility of the electrode reaction can be improved in dependence on the kind of electrode which is combined.

As an electrolytic salt, for example, a lithium salt can be mentioned. One kind can be solely used or two or more kinds can be also mixed and used. As a lithium salt, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro [oxolato-O,O'] lithium boric acid, lithium bisoxalate borate, LiBr, or the like can be mentioned. Among them, $LiPF_6$ is preferable because the high ion conductivity can be obtained and the cycle characteristics can be improved.

(1-2) Manufacturing Method of Secondary Battery

An example of a manufacturing method of the secondary battery according to the first embodiment is described below.

First, the cathode mixture is adjusted, for example, by mixing, the cathode active material, conductive material, and binder, the cathode mixture is dispersed into the solvent such as N-methyl-2-pyrolidone or the like, thereby forming the paste-like cathode mixture slurry. Subsequently, the cathode collector 21A is coated with the cathode mixture slurry, the solvent is dried, thereafter, the obtained collector is compression-molded by a roll pressing machine or the like, and the cathode active material layer 21B is formed. Thus, the cathode 21 is obtained.

For example, the anode active material and binder are mixed and the anode mixture is adjusted. This anode mixture is dispersed into the solvent such as N-methyl-2-pyrolidone or the like, thereby forming the paste-like anode mixture slurry. Subsequently, the anode collector 22A is coated with the anode mixture slurry, the solvent is dried, and thereafter, the obtained collector is compression-molded by the roll pressing machine or the like, thereby forming the anode active material layer 22B. Thus, the anode 22 is obtained.

Subsequently, the cathode lead 25 is attached to the cathode collector 21A by welding or the like and the anode lead 26 is attached to the anode collector 22A by welding or the like. Thereafter, the cathode 21 and the anode 22 are wound through the separator 23, a front end portion of the cathode lead 25 is welded to the relief valve mechanism 15, a front end portion of the anode lead 26 is welded to the battery can 11, and the wound cathode 21 and anode 22 are sandwiched by the pair of insulating plates 12 and 13 and enclosed in the battery can 11. After the cathode 21 and the anode 22 were enclosed in the battery can 11, the electrolytic solution is injected into the battery can 11 and dipped into the separator 23. Thereafter, the battery cap 14, relief valve mechanism 15, and PTC element 16 are caulked and fixed to the open end portion of the battery can 11 through the gasket 17. Thus, the secondary battery shown in FIG. 1 is obtained.

In the secondary battery, when the charge is performed, lithium ions are dedoped from the cathode active material layer 21B. Through the electrolytic solution, the lithium ions are doped into the anode material which can dope and dedope lithium contained in the anode active material layer 22B. Subsequently, when the discharge is performed, the lithium ions doped in the anode material which can dope and dedope lithium in the anode active material layer 22B are dedoped and doped into the cathode active material layer 21B through the electrolytic solution. Since the separator 23 has the construction mentioned above, the chemical stability is improved. Even if the open circuit voltage upon full charging is increased, the occurrence of the small short-circuit is suppressed and the battery characteristics are improved.

As mentioned above, according to the first embodiment, the secondary battery has the cathode 21 and the anode 22 arranged so as to face each other and the separator 23 in between. The open circuit voltage in the full charging state per pair of cathode 21 and anode 22 lies within a range from 4.25V or more to 4.60V or less or a range from 4.35V or more to 4.60V or less, the separator 23 has the film thickness of 10 to 20 μm, the converted piercing strength of the separator 23 is equal to 300 gf or more in which the piercing strength is converted to the piercing strength which will be obtained in case the film thickness is equal to 20 μm (or equal to 150 gf or more in which the piercing strength is converted to the piercing strength which will be obtained in case when the film thickness is equal to 10 μm), and the air permeability of the base material layer 23A is equal to or larger than 10% of that of the whole separator. Therefore, the safety at the time of the external short-circuit or the like can be improved without causing a deterioration in the load characteristics.

As mentioned above, the secondary battery has the cathode 21 and the anode 22 arranged so as to face each other and the separator 23 in between. The open circuit voltage in the full charging state per pair of cathode 21 and anode 22 lies within a range from 4.25V or more to 4.60V or less or a range from 4.35V or more to 4.60V or less, the separator 23 has the film thickness of 10 to 20 the converted piercing strength of the separator 23 is equal to 300 gf or less in which the piercing strength is converted to the piercing strength which will be obtained in case the film thickness is equal to 20 μm (or equal to 150 gf or less in which the piercing strength is converted to the piercing strength which will be obtained in case when the film thickness is equal to 10 μm), and the air permeability of the base material layer 23A is equal to or larger than 35% of that of the whole separator. Therefore, the safety at the time of the external short-circuit or the like can be improved without causing a deterioration in the load characteristics.

Since the open circuit voltage in the full charging state lies within a range from 4.25V or more to 4.60V or less or a range from 4.35V or more to 4.60V or less, the high energy density can be obtained. The layer made of at least one kind selected from the group including polyvinylidene fluoride, polyethylene terephthalate, polypropylene, and aramid is formed on the side of the separator 23 which faces at least the cathode 21. Thus, the chemical stability of the separator 23 can be improved and the occurrence of the small short-circuit is suppressed. Thus, the energy density can be raised and the battery characteristics such as cycle characteristics, high-temperature holding characteristics, or the like can be improved.

The relation between the measured piercing strength and the converted piercing strength is as follows.

$S_{20} = S \times 20/T,$ $S_{10} = S \times 10/T,$ $S_{20} = S_{10} \times 2,$ wherein, $S_{20}$ is the converted piercing strength converted into the piercing strength which will be obtained in case the film thickness is 20 μm, $S_{10}$ is the converted piercing strength converted into the piercing strength which will be obtained in case the film thickness is 10 μm, S is the measured piercing strength, T is the film thickness.

(2) Second Embodiment

A secondary battery according to the second embodiment is a lithium metal secondary battery in which the capacitance of the anode is expressed by a capacitive component by precipitation and dissolution of lithium as an electrode reactive substance.

This secondary battery has a construction and an effect similar to those of the secondary battery of the first embodiment except that a construction of the anode active material layer 22B differs from that in the first embodiment. Therefore, the corresponding component elements in FIGS. 1 and 2 are designated by the same reference numerals and an explanation of the same portions is omitted here.

The anode active material layer 22B is made of a lithium metal as an anode active material and can obtain the high energy density. Although it is possible to construct in such a manner that the battery already has the anode active material layer 22B upon assembling, it is also possible to construct in such a manner that the anode active material layer 22B does not exist upon assembling but it is made of the lithium metal which has been precipitated upon charging. The anode active material layer 22B can be also used as a collector and the anode collector 22A can be deleted.

This secondary battery can be manufactured in a manner similar to the secondary battery according to the first embodiment except that the anode 22 is formed only by the anode collector 22A or only by the lithium metal or the anode active material layer 22B is formed by adhering the lithium metal to the anode collector 22A.

In this secondary battery, when the charge is performed, for example, lithium ions are dedoped from the cathode 21 and precipitated as a lithium metal on the surface of the anode collector 22A through the electrolyte, thereby forming the anode active material layer 22B as shown in FIG. 2. When the discharge is performed, for example, the lithium metal is eluted as lithium ions from the anode active material layer 22B and doped into the cathode 21 through the electrolyte. Since the separator 23 has the foregoing construction here, the chemical stability is improved and even if the open circuit voltage upon full charging is raised, the occurrence of the small short-circuit is suppressed and the battery characteristics are improved.

(3) Third Embodiment

In a secondary battery according to the third embodiment, a capacitance of an anode includes a capacitive component by the dope and dedope of lithium as an electrode reactive substance and a capacitive component by the precipitation and dissolution of lithium and is expressed by the sum of them.

This secondary battery has a construction and an effect similar to those of the secondary battery of the first or second embodiment except that a construction of the anode active material layer differs from that in the first or second embodiment, and it can be similarly manufactured. Therefore, the corresponding component elements in FIGS. 1 and 2 are designated by the same reference numerals and will be explained. A detailed explanation of the same portions is omitted here.

In the anode active material layer 22B, for example, the charge capacitance of the anode material which can dope and dedope lithium is set to be smaller than that of the cathode 21, so that the precipitation of the lithium metal in the anode 22 is started at a point of time when the open circuit voltage (that is, battery voltage) is lower than an overcharge voltage in the charging step. Consequently, in this secondary battery, both of the anode material which can dope and dedope lithium and the lithium metal function as an anode active material, while the anode material which can dope and dedope lithium becomes a base material when the lithium metal is precipitated.

The overcharge voltage denotes an open circuit voltage when the battery enters the overcharging state and indicates a voltage higher than an open circuit voltage of a "fully charged" battery disclosed and defined in, for example, "Lithium secondary battery safety evaluation reference guideline" (SBA G1101) as one of the guides determined by Battery Industry Association in Japan. In other words, the overcharge voltage indicates a voltage higher than the open circuit voltage after the battery was charged by using a charging method used when a nominal capacitance of each battery is obtained, a standard charging method, or a recommended charging method.

This secondary battery is similar to the lithium ion secondary battery in the related art with respect to a point that the anode material which can dope and dedope lithium is used for the anode 22 and is also similar to the lithium metal secondary battery in the related art with respect to a point that the lithium metal is precipitated in the anode 22. However, since the lithium metal is precipitated in the anode material which can dope and dedope lithium, the high energy density can be obtained and the cycle characteristics and rapid charging characteristics can be improved.

In this secondary battery, when the charge is performed, lithium ions are dedoped from the cathode 21 and are first doped into the anode material which can dope and dedope lithium contained in the anode 22 through the electrolyte. When the charge is further continued, in the state where the open circuit voltage is lower than the overcharge voltage, the precipitation of the lithium metal on the surface of the anode material which can dope and dedope lithium is started. After that, the lithium metal continues to be precipitated in the anode 22 until the charge is finished. Subsequently, when the discharge is performed, first, the lithium metal precipitated in the anode 22 is eluted as lithium ions and doped into the cathode 21 through the electrolyte. When the discharge is further continued, the lithium ions doped in the anode material which can dope and dedope lithium in the anode 22 are dedoped and doped into the cathode 21 through the electrolyte. Since the separator 23 has the foregoing construction here, the chemical stability is improved and even if the open circuit voltage upon full charging is raised, the occurrence of the small short-circuit is suppressed and the battery characteristics are improved.

(4) Fourth Embodiment

Figure 3:
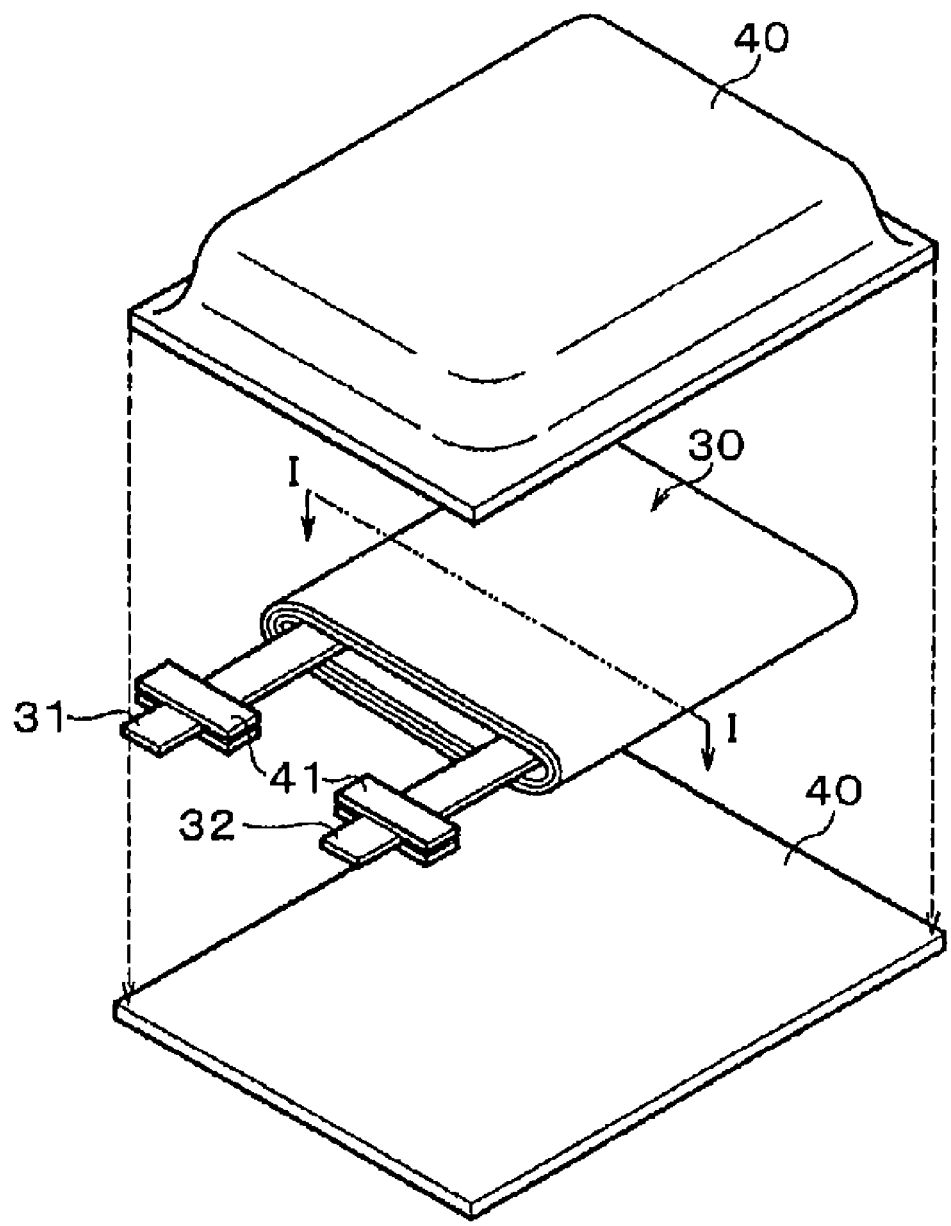
FIG. 3 is an exploded perspective view showing an example of a construction of a secondary battery according to a fourth embodiment.

FIG. 3 is an exploded perspective view showing an example of a construction of a secondary battery according to the fourth embodiment. According to this secondary battery, a winded electrode member 30 to which a cathode lead 31 and an anode lead 32 have been attached is enclosed in a film-shaped sheathing member 40, and miniaturization, a light weight, and a thin shape can be realized.

Each of the cathode lead 31 and the anode lead 32 is led out, for example, in the same direction from the inside of the sheathing member 40 toward the outside. For example, each of the cathode lead 31 and the anode lead 32 is made of a metal material such as aluminum, copper, nickel, stainless steel, or the like and has a thin-plate shape or a mesh shape.

The sheathing member 40 is made of a rectangular aluminum laminate film obtained by, for example, adhering a nylon film, an aluminum foil, and a polyethylene film in this order. The sheathing member 40 is arranged so that, for example, the polyethylene film side and the winded electrode member 30 face each other and their outer edge portions are closely adhered by melt-bonding or by an adhesive agent. Adhesive films 41 to prevent an intrusion of the open air are inserted between the sheathing member 40, the cathode lead 31, and the anode lead 32. The adhesive films 41 are made of a material having adhesive performance to the cathode lead 31 and the anode lead 32, for example, a polyolefin resin such as polyethylene, polypropylene, denatured polyethylene, denatured polypropylene, or the like.

The sheathing member 40 may be constructed by a laminate film having another structure, a high molecular film made of polypropylene or the like, or a metal film in place of the foregoing aluminum laminate film.

Figure 4:
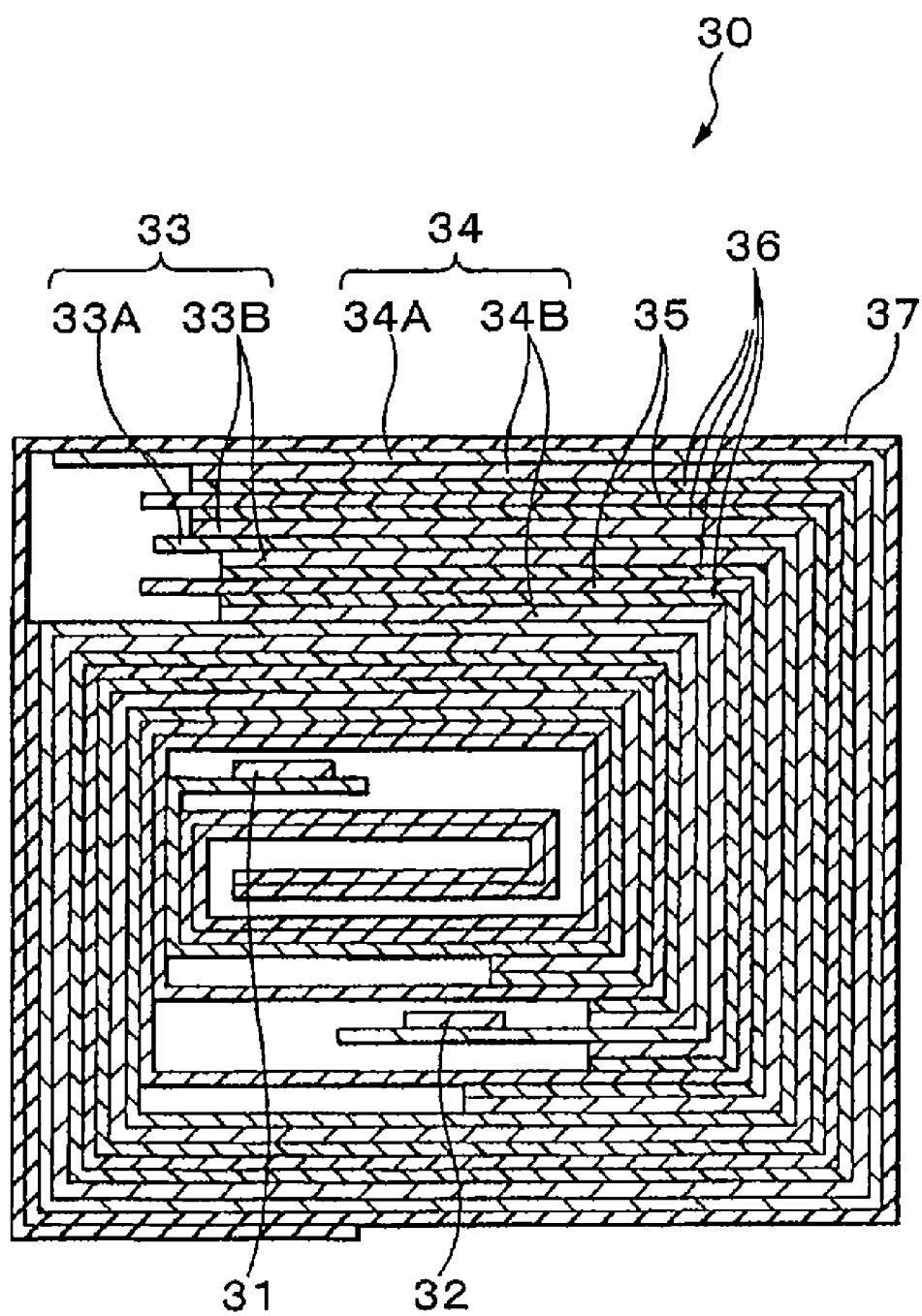
FIG. 4 is a cross sectional view taken along the I-I line of a winded electrode member shown in FIG. 3.

FIG. 4 shows a cross sectional structure taken along the I-I line in the winded electrode member 30 shown in FIG. 3. The winded electrode member 30 is constructed in such a manner that a cathode 33 and an anode 34 are laminated through a separator 35 and an electrolyte layer 36 and wound and the outermost peripheral portion is protected by a protecting tape 37.

The cathode 33 has a structure in which a cathode active material layer 33B or cathode active material layers 33B is/are provided for one surface or both surfaces of a cathode collector 33A. The anode 34 has a structure in which an anode active material layer 34B or anode active material layers 34B is/are provided for one surface or both surfaces of an anode collector 34A. The cathode 33 and the anode 34 are arranged so that the cathode active material layer 33B and the anode active material layer 34B face each other. A construction of the cathode collector 33A, cathode active material layer 33B, anode collector 34A, anode active material layer 34B, and separator 35 is similar to that of the cathode collector 21A, cathode active material layer 21B, anode collector 22A, anode active material layer 22B, and separator 23 described in each of the first to third embodiments.

The electrolyte layer 36 includes an electrolytic solution and a high molecular compound serving as a holder to hold the electrolytic solution and is in what is called a gel-state. The gel-like electrolyte layer 36 is preferable because high ion conductivity can be obtained and a leakage of the solution of the battery can be prevented. A construction of the electrolytic solution (that is, solvent, electrolytic salt, or the like) is similar to that of the secondary battery according to each of the first to third embodiments. As a high molecular compound, for example, there can be mentioned: polyacrylonitrile; polyvinylidene fluoride; copolymer of vinylidene fluoride and hexafluoro propylene; polytetrafluoro ethylene;

polyhexafluoro propylene; polyethylene oxide; polypropylene oxide; polyphosphazene; polysiloxane; polyvinyl acetate; polyvinyl alcohol; polymethyl methacrylate; polyacrylic acid; polymethacrylate; styrene-butadiene rubber; nitrile-butadiene rubber; polystyrene; polycarbonate; or the like. Polyacrylonitrile, polyvinylidene fluoride, polyhexafluoro propylene, or polyethylene oxide is preferable, particularly, from a viewpoint of electrochemical stability.

This secondary battery can be manufactured, for example, as follows.

First, each of the cathode 33 and the anode 34 is coated with a presolvent containing a solvent, electrolytic salt, a high molecular compound, and a mixed solvent, and the mixed solvent is volatilized, thereby forming the electrolyte layer 36. After that, the cathode lead 31 is attached to an end portion of the cathode collector 33A by welding. The anode lead 32 is also attached to an end portion of the anode collector 34A by welding. Subsequently, the cathode 33 and anode 34 on each of which the electrolyte layer 36 has been formed are laminated through the separator 35, thereby obtaining a laminate. After that, this laminate is wound in its longitudinal direction and the protecting tape 37 is adhered onto the outermost peripheral portion, thereby forming the winded electrode member 30. Finally, for example, the winded electrode member 30 is sandwiched between the sheathing members 40 and the outer edge portions of the sheathing members 40 are closely adhered by thermal melt-bonding or the like, thereby sealing the winded electrode member 30. In this instance, the adhesive films 41 are inserted among the cathode lead 31, the anode lead 32, and the sheathing member 40. Thus, the secondary battery shown in FIGS. 3 and 4 is obtained.

The secondary battery may be manufactured as follows. First, as mentioned above, the cathode 33 and the anode 34 are manufactured, the cathode lead 31 is attached to the cathode 33, the anode lead 32 is attached to the anode 34, thereafter, the cathode 33 and anode 34 are laminated through the separator 35 and wound, the protecting tape 37 is adhered onto the outermost peripheral portion, thereby forming a winded element as a precursor of the winded electrode member 30. Subsequently, the winded element is sandwiched between the sheathing members 40, the outer edge portions excluding one side is thermally melt-bonded into a bag-shaped, and the winded electrode member 30 is enclosed in the sheathing members 40. Subsequently, a composition for the electrolyte containing a solvent, electrolytic salt, a monomer as a raw material of the high molecular compound, a polymerization initiator, and another material such as a polymerization inhibitor or the like as necessary is prepared and injected into the sheathing members 40.

After the composition for the electrolyte was injected, an opening portion of the sheathing members 40 is thermally melt-bonded under the vacuum atmosphere, thereby sealing the winded electrode member 30. Subsequently, the monomer is polymerized by applying heat so as to form a high molecular compound, thereby forming the gel-like electrolyte layer 36. In this manner, the secondary battery shown in FIG. 3 is obtained.

Functions and effects of this secondary battery are similar to those of the secondary batteries according to the first to third embodiments.

Examples

Although examples are specifically explained hereinbelow, the embodiments are not limited to those examples.

Constructions of the separators of samples 1-1-1 to 1-8-12 are shown in TABLEs 1 to 8. Constructions of the separators of samples 2-1-1 to 2-8-12 are shown in TABLEs 9 to 16. Constructions of the separators of samples 3-1-1 to 3-8-12 are shown in TABLEs 17 to 24. Constructions of the separators of samples 4-1-1 to 4-8-12 are shown in TABLEs 25 to 32. Constructions of the separators of samples 5-1-1 to 5-8-12 are shown in TABLEs 33 to 40. Constructions of the separators of samples 6-1-1 to 6-8-12 are shown in TABLEs 41 to 48.

The values of air permeability shown in TABLEs 1 to 48 are obtained by measuring them by using a Gurley type densometer (made by Toyo Seiki Co., Ltd.). The values of piercing strength are obtained by measuring them by using a Handy compression tester (made by Kato Tech Co., Ltd.). The piercing strength is the maximum load when the needle with 1 mm diameter and 0.5 mm R of the top point is pierced at the speed of 0.2 cm per second.

TABLE 1

| | FEATURE | PHYSICAL PROPERTIES OF SEPARATOR ||| ACTUAL MEASUREMENT VALUE OF AIR PERMEABILITY AND RATIO OF EACH PORTION |||
|---|---|---|---|---|---|---|---|
| | | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 1-1-1 | PIERCING STRENGTH | 78 | 5 | 90 | 40.5 (45%) | 9 (10%) | 40.5 (45%) |
| SAMPLE 1-1-2 | 75 [gf] OR MORE | 78 | 5 | 91 | 39 (43%) | 11 (12%) | 41 (45%) |
| SAMPLE 1-1-3 | | 83 | 5 | 128 | 54 (42%) | 23 (18%) | 51 (40%) |
| SAMPLE 1-1-4 | | 83 | 5 | 119 | 48 (40%) | 23 (20%) | 48 (40%) |
| SAMPLE 1-1-5 | | 94 | 5 | 71 | 32 (45%) | 6 (8%) | 33 (47%) |
| SAMPLE 1-1-6 | | 94 | 5 | 78 | 36 (46%) | 7 (9%) | 35 (45%) |
| SAMPLE 1-1-7 | PIERCING STRENGTH | 64 | 5 | 112 | 38 (34%) | 39 (35%) | 35 (31%) |
| SAMPLE 1-1-8 | 75 [gf] OR LESS | 64 | 5 | 102 | 33 (32%) | 41 (40%) | 28 (28%) |

TABLE 1-continued

| | | | | | | | |
|---|---|---|---|---|---|---|---|
| SAMPLE 1-1-9 | | 67 | 5 | 63 | 23 (37%) | 15 (24%) | 25 (39%) |
| SAMPLE 1-1-10 | | 72 | 5 | 82 | 32 (39%) | 16 (20%) | 34 (41%) |
| SAMPLE 1-1-11 | | 72 | 5 | 69 | 26 (38%) | 17 (25%) | 25 (37%) |
| SAMPLE 1-1-12 | PE SOLE BODY | 102 | 5 | 67 | — | 67 (100[%]) | — |

| | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | LOAD CHARACTERISTICS (DISCHARGE CAPACITANCE MAINTAINING RATIO AT 1[C] TO THAT AT 0.2[C]) |
|---|---|---|---|---|---|---|
| SAMPLE 1-1-1 | 1.5 | 2 (58%) | 1.5 | 4.2 | PTC IS NECESSARY | 99% |
| SAMPLE 1-1-2 | 1.5 | 2 (58%) | 1.5 | 4.2 | PTC IS NECESSARY | 99% |
| SAMPLE 1-1-3 | 1.5 | 2 (42%) | 1.5 | 4.2 | PTC IS NECESSARY | 99% |
| SAMPLE 1-1-4 | 1.5 | 2 (42%) | 1.5 | 4.2 | PTC IS NECESSARY | 99% |
| SAMPLE 1-1-5 | 1.5 | 2 (62%) | 1.5 | 4.2 | PTC IS NECESSARY | 99% |
| SAMPLE 1-1-6 | 1.5 | 2 (62%) | 1.5 | 4.2 | PTC IS NECESSARY | 99% |
| SAMPLE 1-1-7 | 1.5 | 2 (36%) | 1.5 | 4.2 | PTC IS NECESSARY | 99% |
| SAMPLE 1-1-8 | 1.5 | 2 (36%) | 1.5 | 4.2 | PTC IS NECESSARY | 99% |
| SAMPLE 1-1-9 | 1.5 | 2 (53%) | 1.5 | 4.2 | PTC IS NECESSARY | 99% |
| SAMPLE 1-1-10 | 1.5 | 2 (52%) | 1.5 | 4.2 | PTC IS NECESSARY | 99% |
| SAMPLE 1-1-11 | 1.5 | 2 (53%) | 1.5 | 4.2 | PTC IS NECESSARY | 99% |
| SAMPLE 1-1-12 | — | 5 (52%) | — | 4.2 | PTC IS NECESSARY | 99% |

TABLE 2

| | FEATURE | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 1-2-1 | PIERCING STRENGTH 150 [gf] OR MORE | 156 | 10 | 180 | 81 (45%) | 18 (10%) | 81 (45%) |
| SAMPLE 1-2-2 | | 156 | 10 | 182 | 78 (43%) | 21 (12%) | 81 (45%) |
| SAMPLE 1-2-3 | | 166 | 10 | 257 | 108 (42%) | 47 (18%) | 102 (40%) |
| SAMPLE 1-2-4 | | 166 | 10 | 240 | 96 (40%) | 48 (20%) | 96 (40%) |
| SAMPLE 1-2-5 | | 189 | 10 | 143 | 64 (45%) | 11 (8%) | 67 (47%) |
| SAMPLE 1-2-6 | | 189 | 10 | 155 | 71 (46%) | 14 (9%) | 70 (45%) |
| SAMPLE 1-2-7 | PIERCING STRENGTH 150 [gf] OR LESS | 130 | 10 | 225 | 76 (34%) | 78 (35%) | 70 (31%) |
| SAMPLE 1-2-8 | | 130 | 10 | 204 | 66 (32%) | 81 (40%) | 57 (28%) |
| SAMPLE 1-2-9 | | 134 | 10 | 126 | 46 (37%) | 30 (24%) | 49 (39%) |

TABLE 2-continued

| | | FILM THICKNESS AND VOID RATIO OF EACH PORTION | | | | | |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | LOAD CHARACTERISTICS (DISCHARGE CAPACITANCE MAINTAINING RATIO AT 1[C] TO THAT AT 0.2[C]) |
| SAMPLE 1-2-10 | | 144 | 10 | 165 | 64 (39%) | 33 (20%) | 67 (41%) |
| SAMPLE 1-2-11 | | 144 | 10 | 139 | 53 (38%) | 34 (25%) | 52 (37%) |
| SAMPLE 1-2-12 | PE SOLE BODY | 205 | 10 | 135 | — | 135 (100[%]) | — |
| SAMPLE 1-2-1 | | 3 | 4 (58%) | 3 | 4.2 | PTC IS UNNECESSARY | 99% |
| SAMPLE 1-2-2 | | 3 | 4 (58%) | 3 | 4.2 | PTC IS UNNECESSARY | 99% |
| SAMPLE 1-2-3 | | 3 | 4 (42%) | 3 | 4.2 | PTC IS UNNECESSARY | 99% |
| SAMPLE 1-2-4 | | 3 | 4 (42%) | 3 | 4.2 | PTC IS UNNECESSARY | 99% |
| SAMPLE 1-2-5 | | 3 | 4 (62%) | 3 | 4.2 | PTC IS UNNECESSARY | 99% |
| SAMPLE 1-2-6 | | 3 | 4 (62%) | 3 | 4.2 | PTC IS UNNECESSARY | 99% |
| SAMPLE 1-2-7 | | 3 | 4 (36%) | 3 | 4.2 | PTC IS UNNECESSARY | 99% |
| SAMPLE 1-2-8 | | 3 | 4 (36%) | 3 | 4.2 | PTC IS UNNECESSARY | 99% |
| SAMPLE 1-2-9 | | 3 | 4 (53%) | 3 | 4.2 | PTC IS UNNECESSARY | 99% |
| SAMPLE 1-2-10 | | 3 | 4 (52%) | 3 | 4.2 | PTC IS UNNECESSARY | 99% |
| SAMPLE 1-2-11 | | 3 | 4 (52%) | 3 | 4.2 | PTC IS UNNECESSARY | 99% |
| SAMPLE 1-2-12 | | — | 10 (52%) | — | 4.2 | PTC IS UNNECESSARY | 99% |

TABLE 3

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 1-3-1 | PIERCING STRENGTH | 187 | 12 | 216 | 97 (45%) | 22 (10%) | 97 (45%) |
| SAMPLE 1-3-2 | 180 [gf] OR MORE | 187 | 12 | 218 | 94 (43%) | 26 (12%) | 98 (45%) |
| SAMPLE 1-3-3 | | 199 | 12 | 307 | 129 (42%) | 55 (18%) | 123 (40%) |
| SAMPLE 1-3-4 | | 199 | 12 | 288 | 115 (40%) | 58 (20%) | 115 (40%) |
| SAMPLE 1-3-5 | | 226 | 12 | 171 | 77 (45%) | 14 (8%) | 80 (47%) |
| SAMPLE 1-3-6 | | 226 | 12 | 186 | 85 (46%) | 17 (9%) | 84 (45%) |
| SAMPLE 1-3-7 | PIERCING STRENGTH | 156 | 12 | 271 | 92 (34%) | 95 (35%) | 84 (31%) |
| SAMPLE 1-3-8 | 180 [gf] OR LESS | 156 | 12 | 244 | 78 (32%) | 98 (40%) | 68 (28%) |
| SAMPLE 1-3-9 | | 160 | 12 | 151 | 56 (37%) | 36 (24%) | 59 (39%) |
| SAMPLE 1-3-10 | | 172 | 12 | 198 | 77 (39%) | 40 (20%) | 81 (41%) |

TABLE 3-continued

| | | | | | | | |
|---|---|---|---|---|---|---|---|
| SAMPLE 1-3-11 | | 172 | 12 | 165 | 63 (38%) | 41 (25%) | 61 (37%) |
| SAMPLE 1-3-12 | PE SOLE BODY | 246 | 12 | 162 | — | 162 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 1-3-1 | 4 | 4 (58%) | 4 | 4.2 | PTC IS UNNECESSARY | 99% | |
| SAMPLE 1-3-2 | 4 | 4 (58%) | 4 | 4.2 | PTC IS UNNECESSARY | 99% | |
| SAMPLE 1-3-3 | 4 | 4 (42%) | 4 | 4.2 | PTC IS UNNECESSARY | 99% | |
| SAMPLE 1-3-4 | 4 | 4 (42%) | 4 | 4.2 | PTC IS UNNECESSARY | 99% | |
| SAMPLE 1-3-5 | 4 | 4 (62%) | 4 | 4.2 | PTC IS UNNECESSARY | 99% | |
| SAMPLE 1-3-6 | 4 | 4 (62%) | 4 | 4.2 | PTC IS UNNECESSARY | 99% | |
| SAMPLE 1-3-7 | 4 | 4 (36%) | 4 | 4.2 | PTC IS UNNECESSARY | 99% | |
| SAMPLE 1-3-8 | 4 | 4 (36%) | 4 | 4.2 | PTC IS UNNECESSARY | 99% | |
| SAMPLE 1-3-9 | 4 | 4 (53%) | 4 | 4.2 | PTC IS UNNECESSARY | 99% | |
| SAMPLE 1-3-10 | 4 | 4 (52%) | 4 | 4.2 | PTC IS UNNECESSARY | 99% | |
| SAMPLE 1-3-11 | 4 | 4 (52%) | 4 | 4.2 | PTC IS UNNECESSARY | 99% | |
| SAMPLE 1-3-12 | — | 12 (52%) | — | 4.2 | PTC IS UNNECESSARY | 99% | |

TABLE 4

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST | AIR PERMEABILITY OF THE 2ND | AIR PERMEABILITY OF THE 3RD |
| | FEATURE | PIERCING STRENGTH [gf] | FILM THICKNESS [μ] | AIR PERMEABILITY [sec/100 ml] | LAYER PP [sec/100 ml] (TO TOTAL) | LAYER PE [sec/100 ml] (TO TOTAL) | LAYER PP [sec/100 ml] (TO TOTAL) |
| SAMPLE 1-4-1 | PIERCING STRENGTH 240 [gf] OR MORE | 250 | 16 | 288 | 129 (45%) | 30 (10%) | 129 (45%) |
| SAMPLE 1-4-2 | | 250 | 16 | 291 | 125 (43%) | 35 (12%) | 131 (45%) |
| SAMPLE 1-4-3 | | 265 | 16 | 410 | 172 (42%) | 74 (18%) | 164 (40%) |
| SAMPLE 1-4-4 | | 265 | 16 | 383 | 153 (40%) | 77 (20%) | 153 (40%) |
| SAMPLE 1-4-5 | | 302 | 16 | 227 | 102 (45%) | 18 (8%) | 107 (47%) |
| SAMPLE 1-4-6 | | 302 | 16 | 247 | 114 (46%) | 22 (9%) | 111 (45%) |
| SAMPLE 1-4-7 | PIERCING STRENGTH 240 [gf] OR LESS | 208 | 16 | 359 | 122 (34%) | 126 (35%) | 111 (31%) |
| SAMPLE 1-4-8 | | 208 | 16 | 325 | 104 (32%) | 130 (40%) | 91 (28%) |
| SAMPLE 1-4-9 | | 214 | 16 | 201 | 74 (37%) | 48 (24%) | 78 (39%) |
| SAMPLE 1-4-10 | | 230 | 16 | 263 | 102 (39%) | 53 (20%) | 108 (41%) |
| SAMPLE 1-4-11 | | 230 | 16 | 224 | 85 (38%) | 56 (25%) | 83 (37%) |

TABLE 4-continued

| SAMPLE 1-4-12 | PE SOLE BODY | 328 | 16 | 216 | — | 216 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 1-4-1 | | 5.5 | 5 (58%) | 5.5 | 4.2 | PTC IS UNNECESSARY | 98% |
| SAMPLE 1-4-2 | | 5.5 | 5 (58%) | 5.5 | 4.2 | PTC IS UNNECESSARY | 98% |
| SAMPLE 1-4-3 | | 5.5 | 5 (42%) | 5.5 | 4.2 | PTC IS UNNECESSARY | 98% |
| SAMPLE 1-4-4 | | 5.5 | 5 (42%) | 5.5 | 4.2 | PTC IS UNNECESSARY | 98% |
| SAMPLE 1-4-5 | | 5.5 | 5 (62%) | 5.5 | 4.2 | PTC IS UNNECESSARY | 98% |
| SAMPLE 1-4-6 | | 5.5 | 5 (62%) | 5.5 | 4.2 | PTC IS UNNECESSARY | 98% |
| SAMPLE 1-4-7 | | 5.5 | 5 (36%) | 5.5 | 4.2 | PTC IS UNNECESSARY | 98% |
| SAMPLE 1-4-8 | | 5.5 | 5 (36%) | 5.5 | 4.2 | PTC IS UNNECESSARY | 98% |
| SAMPLE 1-4-9 | | 5.5 | 5 (53%) | 5.5 | 4.2 | PTC IS UNNECESSARY | 98% |
| SAMPLE 1-4-10 | | 5.5 | 5 (52%) | 5.5 | 4.2 | PTC IS UNNECESSARY | 98% |
| SAMPLE 1-4-11 | | 5.5 | 5 (52%) | 5.5 | 4.2 | PTC IS UNNECESSARY | 98% |
| SAMPLE 1-4-12 | | — | 16 (52%) | — | 4.2 | PTC IS UNNECESSARY | 98% |

TABLE 5

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 1-5-1 | PIERCING STRENGTH 270 [gf] OR MORE | 280 | 18 | 324 | 146 (45%) | 32 (10%) | 146 (45%) |
| SAMPLE 1-5-2 | | 280 | 18 | 326 | 140 (43%) | 39 (12%) | 147 (45%) |
| SAMPLE 1-5-3 | | 298 | 18 | 461 | 194 (42%) | 83 (18%) | 184 (40%) |
| SAMPLE 1-5-4 | | 298 | 18 | 430 | 172 (40%) | 86 (20%) | 172 (40%) |
| SAMPLE 1-5-5 | | 340 | 18 | 255 | 115 (45%) | 20 (8%) | 120 (47%) |
| SAMPLE 1-5-6 | | 340 | 18 | 278 | 128 (46%) | 25 (9%) | 125 (45%) |
| SAMPLE 1-5-7 | PIERCING STRENGTH 270 [gf] OR LESS | 234 | 18 | 403 | 137 (34%) | 141 (35%) | 125 (31%) |
| SAMPLE 1-5-8 | | 234 | 18 | 365 | 117 (32%) | 146 (40%) | 102 (28%) |
| SAMPLE 1-5-9 | | 241 | 18 | 226 | 84 (37%) | 54 (24%) | 88 (39%) |
| SAMPLE 1-5-10 | | 259 | 18 | 296 | 115 (39%) | 59 (20%) | 121 (41%) |
| SAMPLE 1-5-11 | | 259 | 18 | 252 | 96 (38%) | 63 (25%) | 93 (37%) |

TABLE 5-continued

| SAMPLE 1-5-12 | PE SOLE BODY | 369 | 18 | 243 | — | 243 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 1-5-1 | | 6 | 6 (58%) | 6 | 4.2 | PTC IS UNNECESSARY | 98% |
| SAMPLE 1-5-2 | | 6 | 6 (58%) | 6 | 4.2 | PTC IS UNNECESSARY | 98% |
| SAMPLE 1-5-3 | | 6 | 6 (42%) | 6 | 4.2 | PTC IS UNNECESSARY | 98% |
| SAMPLE 1-5-4 | | 6 | 6 (42%) | 6 | 4.2 | PTC IS UNNECESSARY | 98% |
| SAMPLE 1-5-5 | | 6 | 6 (62%) | 6 | 4.2 | PTC IS UNNECESSARY | 98% |
| SAMPLE 1-5-6 | | 6 | 6 (62%) | 6 | 4.2 | PTC IS UNNECESSARY | 98% |
| SAMPLE 1-5-7 | | 6 | 6 (36%) | 6 | 4.2 | PTC IS UNNECESSARY | 98% |
| SAMPLE 1-5-8 | | 6 | 6 (36%) | 6 | 4.2 | PTC IS UNNECESSARY | 98% |
| SAMPLE 1-5-9 | | 6 | 6 (53%) | 6 | 4.2 | PTC IS UNNECESSARY | 98% |
| SAMPLE 1-5-10 | | 6 | 6 (52%) | 6 | 4.2 | PTC IS UNNECESSARY | 98% |
| SAMPLE 1-5-11 | | 6 | 6 (52%) | 6 | 4.2 | PTC IS UNNECESSARY | 98% |
| SAMPLE 1-5-12 | | — | 16 (52%) | — | 4.2 | PTC IS UNNECESSARY | 98% |

TABLE 6

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 1-6-1 | PIERCING STRENGTH | 312 | 20 | 360 | 162 (45%) | 36 (10%) | 162 (45%) |
| SAMPLE 1-6-2 | 300 [gf] OR MORE | 312 | 20 | 364 | 156 (43%) | 45 (12%) | 163 (45%) |
| SAMPLE 1-6-3 | | 332 | 20 | 515 | 216 (42%) | 95 (18%) | 204 (40%) |
| SAMPLE 1-6-4 | | 332 | 20 | 479 | 193 (40%) | 95 (20%) | 191 (40%) |
| SAMPLE 1-6-5 | | 379 | 20 | 286 | 128 (45%) | 22 (8%) | 134 (47%) |
| SAMPLE 1-6-6 | | 379 | 20 | 310 | 143 (46%) | 28 (9%) | 139 (45%) |
| SAMPLE 1-6-7 | PIERCING STRENGTH | 259 | 20 | 450 | 153 (34%) | 157 (35%) | 139 (31%) |
| SAMPLE 1-6-8 | 300 [gf] OR LESS | 259 | 20 | 409 | 132 (32%) | 162 (40%) | 115 (28%) |
| SAMPLE 1-6-9 | | 268 | 20 | 253 | 93 (37%) | 61 (24%) | 99 (39%) |
| SAMPLE 1-6-10 | | 288 | 20 | 330 | 128 (39%) | 67 (20%) | 135 (41%) |
| SAMPLE 1-6-11 | | 288 | 20 | 279 | 106 (38%) | 69 (25%) | 104 (37%) |

TABLE 6-continued

| SAMPLE 1-6-12 | PE SOLE BODY | 410 | 20 | 270 | — | 270 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [°C.] EXTERNAL SHORT-CIRCUIT PTC | |
| SAMPLE 1-6-1 | | 6.5 | 7 (58%) | 6.5 | 4.2 | PTC IS UNNECESSARY | 96% |
| SAMPLE 1-6-2 | | 6.5 | 7 (58%) | 6.5 | 4.2 | PTC IS UNNECESSARY | 96% |
| SAMPLE 1-6-3 | | 6.5 | 7 (42%) | 6.5 | 4.2 | PTC IS UNNECESSARY | 96% |
| SAMPLE 1-6-4 | | 6.5 | 7 (42%) | 6.5 | 4.2 | PTC IS UNNECESSARY | 96% |
| SAMPLE 1-6-5 | | 6.5 | 7 (62%) | 6.5 | 4.2 | PTC IS UNNECESSARY | 96% |
| SAMPLE 1-6-6 | | 6.5 | 7 (62%) | 6.5 | 4.2 | PTC IS UNNECESSARY | 96% |
| SAMPLE 1-6-7 | | 6.5 | 7 (36%) | 6.5 | 4.2 | PTC IS UNNECESSARY | 96% |
| SAMPLE 1-6-8 | | 6.5 | 7 (36%) | 6.5 | 4.2 | PTC IS UNNECESSARY | 96% |
| SAMPLE 1-6-9 | | 6.5 | 7 (53%) | 6.5 | 4.2 | PTC IS UNNECESSARY | 96% |
| SAMPLE 1-6-10 | | 6.5 | 7 (52%) | 6.5 | 4.2 | PTC IS UNNECESSARY | 96% |
| SAMPLE 1-6-11 | | 6.5 | 7 (52%) | 6.5 | 4.2 | PTC IS UNNECESSARY | 96% |
| SAMPLE 1-6-12 | | — | 20 (52%) | — | 4.2 | PTC IS UNNECESSARY | 96% |

TABLE 7

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 1-7-1 | PIERCING STRENGTH | 468 | 30 | 540 | 243 (45%) | 54 (10%) | 243 (45%) |
| SAMPLE 1-7-2 | 450 [gf] OR MORE | 468 | 30 | 546 | 234 (43%) | 65 (12%) | 245 (45%) |
| SAMPLE 1-7-3 | | 498 | 30 | 772 | 324 (42%) | 139 (18%) | 308 (40%) |
| SAMPLE 1-7-4 | | 498 | 30 | 718 | 287 (40%) | 143 (20%) | 287 (40%) |
| SAMPLE 1-7-5 | | 555 | 30 | 429 | 193 (45%) | 34 (8%) | 201 (47%) |
| SAMPLE 1-7-6 | | 555 | 30 | 465 | 213 (46%) | 41 (9%) | 209 (45%) |
| SAMPLE 1-7-7 | PIERCING STRENGTH | 388 | 30 | 675 | 229 (34%) | 236 (35%) | 209 (31%) |
| SAMPLE 1-7-8 | 450 [gf] OR LESS | 388 | 30 | 613 | 196 (32%) | 245 (40%) | 171 (28%) |
| SAMPLE 1-7-9 | | 402 | 30 | 379 | 140 (37%) | 90 (24%) | 147 (39%) |
| SAMPLE 1-7-10 | | 432 | 30 | 495 | 193 (39%) | 99 (20%) | 202 (41%) |
| SAMPLE 1-7-11 | | 432 | 30 | 418 | 158 (38%) | 104 (25%) | 154 (37%) |

TABLE 7-continued

| SAMPLE 1-7-12 | PE SOLE BODY | 615 | 30 | 405 | — | 405 (100[%]) | — |
|---|---|---|---|---|---|---|---|

| | FILM THICKNESS AND VOID RATIO OF EACH PORTION | | | | | LOAD |
|---|---|---|---|---|---|---|
| | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 1-7-1 | 10 | 10 (58%) | 10 | 4.2 | PTC IS UNNECESSARY | 92% |
| SAMPLE 1-7-2 | 10 | 10 (58%) | 10 | 4.2 | PTC IS UNNECESSARY | 92% |
| SAMPLE 1-7-3 | 10 | 10 (42%) | 10 | 4.2 | PTC IS UNNECESSARY | 92% |
| SAMPLE 1-7-4 | 10 | 10 (42%) | 10 | 4.2 | PTC IS UNNECESSARY | 92% |
| SAMPLE 1-7-5 | 10 | 10 (62%) | 10 | 4.2 | PTC IS UNNECESSARY | 92% |
| SAMPLE 1-7-6 | 10 | 10 (62%) | 10 | 4.2 | PTC IS UNNECESSARY | 92% |
| SAMPLE 1-7-7 | 10 | 10 (36%) | 10 | 4.2 | PTC IS UNNECESSARY | 92% |
| SAMPLE 1-7-8 | 10 | 10 (36%) | 10 | 4.2 | PTC IS UNNECESSARY | 92% |
| SAMPLE 1-7-9 | 10 | 10 (53%) | 10 | 4.2 | PTC IS UNNECESSARY | 92% |
| SAMPLE 1-7-10 | 10 | 10 (52%) | 10 | 4.2 | PTC IS UNNECESSARY | 92% |
| SAMPLE 1-7-11 | 10 | 10 (52%) | 10 | 4.2 | PTC IS UNNECESSARY | 92% |
| SAMPLE 1-7-12 | — | 30 (52%) | — | 4.2 | PTC IS UNNECESSARY | 92% |

TABLE 8

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 1-8-1 | PIERCING STRENGTH 525 [gf] OR MORE | 546 | 35 | 630 | 283 (45%) | 63 (10%) | 283 (45%) |
| SAMPLE 1-8-2 | | 546 | 35 | 637 | 273 (43%) | 76 (12%) | 286 (45%) |
| SAMPLE 1-8-3 | | 581 | 35 | 901 | 378 (42%) | 162 (18%) | 360 (40%) |
| SAMPLE 1-8-4 | | 581 | 35 | 838 | 335 (40%) | 167 (20%) | 335 (40%) |
| SAMPLE 1-8-5 | | 663 | 35 | 500 | 225 (45%) | 40 (8%) | 235 (47%) |
| SAMPLE 1-8-6 | | 663 | 35 | 542 | 249 (46%) | 48 (9%) | 243 (45%) |
| SAMPLE 1-8-7 | PIERCING STRENGTH 525 [gf] OR LESS | 453 | 35 | 787 | 267 (34%) | 275 (35%) | 243 (31%) |
| SAMPLE 1-8-8 | | 453 | 35 | 715 | 228 (32%) | 286 (40%) | 200 (28%) |
| SAMPLE 1-8-9 | | 469 | 35 | 442 | 163 (37%) | 106 (24%) | 172 (39%) |
| SAMPLE 1-8-10 | | 504 | 35 | 577 | 225 (39%) | 115 (20%) | 236 (41%) |
| SAMPLE 1-8-11 | | 504 | 35 | 488 | 185 (38%) | 122 (25%) | 180 (37%) |

TABLE 8-continued

| SAMPLE 1-8-12 | PE SOLE BODY | 717 | 35 | 472 | — | 472 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 1-8-1 | | 11.5 | 12 (58%) | 11.5 | 4.2 | PTC IS UNNECESSARY | 89% |
| SAMPLE 1-8-2 | | 11.5 | 12 (58%) | 11.5 | 4.2 | PTC IS UNNECESSARY | 89% |
| SAMPLE 1-8-3 | | 11.5 | 12 (42%) | 11.5 | 4.2 | PTC IS UNNECESSARY | 89% |
| SAMPLE 1-8-4 | | 11.5 | 12 (42%) | 11.5 | 4.2 | PTC IS UNNECESSARY | 89% |
| SAMPLE 1-8-5 | | 11.5 | 12 (62%) | 11.5 | 4.2 | PTC IS UNNECESSARY | 89% |
| SAMPLE 1-8-6 | | 11.5 | 12 (62%) | 11.5 | 4.2 | PTC IS UNNECESSARY | 89% |
| SAMPLE 1-8-7 | | 11.5 | 12 (36%) | 11.5 | 4.2 | PTC IS UNNECESSARY | 89% |
| SAMPLE 1-8-8 | | 11.5 | 12 (36%) | 11.5 | 4.2 | PTC IS UNNECESSARY | 89% |
| SAMPLE 1-8-9 | | 11.5 | 12 (53%) | 11.5 | 4.2 | PTC IS UNNECESSARY | 89% |
| SAMPLE 1-8-10 | | 11.5 | 12 (52%) | 11.5 | 4.2 | PTC IS UNNECESSARY | 89% |
| SAMPLE 1-8-11 | | 11.5 | 12 (52%) | 11.5 | 4.2 | PTC IS UNNECESSARY | 89% |
| SAMPLE 1-8-12 | | — | 35 (52%) | — | 4.2 | PTC IS UNNECESSARY | 89% |

TABLE 9

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 2-1-1 | PIERCING STRENGTH 75 [gf] OR MORE | 78 | 5 | 90 | 40.5 (45%) | 9 (10%) | 40.5 (45%) |
| SAMPLE 2-1-2 | | 78 | 5 | 91 | 39 (43%) | 11 (12%) | 41 (45%) |
| SAMPLE 2-1-3 | | 83 | 5 | 128 | 54 (42%) | 23 (18%) | 51 (40%) |
| SAMPLE 2-1-4 | | 83 | 5 | 119 | 48 (40%) | 23 (20%) | 48 (40%) |
| SAMPLE 2-1-5 | | 94 | 5 | 71 | 32 (45%) | 6 (8%) | 33 (47%) |
| SAMPLE 2-1-6 | | 94 | 5 | 78 | 36 (46%) | 7 (9%) | 35 (45%) |
| SAMPLE 2-1-7 | PIERCING STRENGTH 75 [gf] OR LESS | 64 | 5 | 112 | 38 (34%) | 39 (35%) | 35 (31%) |
| SAMPLE 2-1-8 | | 64 | 5 | 102 | 33 (32%) | 41 (40%) | 28 (28%) |
| SAMPLE 2-1-9 | | 67 | 5 | 63 | 23 (37%) | 15 (24%) | 25 (39%) |
| SAMPLE 2-1-10 | | 72 | 5 | 82 | 32 (39%) | 16 (20%) | 34 (41%) |
| SAMPLE 2-1-11 | | 72 | 5 | 69 | 26 (38%) | 17 (25%) | 25 (37%) |

TABLE 9-continued

| SAMPLE 2-1-12 | PE SOLE BODY | 102 | 5 | 67 | — | 67 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 2-1-1 | | 1.5 | 2 (58%) | 1.5 | 4.35 | PTC IS NECESSARY | 99% |
| SAMPLE 2-1-2 | | 1.5 | 2 (58%) | 1.5 | 4.35 | PTC IS NECESSARY | 99% |
| SAMPLE 2-1-3 | | 1.5 | 2 (42%) | 1.5 | 4.35 | PTC IS NECESSARY | 99% |
| SAMPLE 2-1-4 | | 1.5 | 2 (42%) | 1.5 | 4.35 | PTC IS NECESSARY | 99% |
| SAMPLE 2-1-5 | | 1.5 | 2 (62%) | 1.5 | 4.35 | PTC IS NECESSARY | 99% |
| SAMPLE 2-1-6 | | 1.5 | 2 (62%) | 1.5 | 4.35 | PTC IS NECESSARY | 99% |
| SAMPLE 2-1-7 | | 1.5 | 2 (36%) | 1.5 | 4.35 | PTC IS NECESSARY | 99% |
| SAMPLE 2-1-8 | | 1.5 | 2 (36%) | 1.5 | 4.35 | PTC IS NECESSARY | 99% |
| SAMPLE 2-1-9 | | 1.5 | 2 (53%) | 1.5 | 4.35 | PTC IS NECESSARY | 99% |
| SAMPLE 2-1-10 | | 1.5 | 2 (52%) | 1.5 | 4.35 | PTC IS NECESSARY | 99% |
| SAMPLE 2-1-11 | | 1.5 | 2 (53%) | 1.5 | 4.35 | PTC IS NECESSARY | 99% |
| SAMPLE 2-1-12 | | — | 5 (52%) | — | 4.35 | PTC IS NECESSARY | 99% |

TABLE 10

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 2-2-1 | PIERCING STRENGTH 150 [gf] OR MORE | 156 | 10 | 180 | 81 (45%) | 18 (10%) | 81 (45%) |
| SAMPLE 2-2-2 | | 156 | 10 | 182 | 78 (43%) | 21 (12%) | 81 (45%) |
| SAMPLE 2-2-3 | | 166 | 10 | 257 | 108 (42%) | 47 (18%) | 102 (40%) |
| SAMPLE 2-2-4 | | 166 | 10 | 240 | 96 (40%) | 48 (20%) | 96 (40%) |
| SAMPLE 2-2-5 | | 189 | 10 | 143 | 64 (45%) | 11 (8%) | 67 (47%) |
| SAMPLE 2-2-6 | | 189 | 10 | 155 | 71 (46%) | 14 (9%) | 70 (45%) |
| SAMPLE 2-2-7 | PIERCING STRENGTH 150 [gf] OR LESS | 130 | 10 | 225 | 76 (34%) | 78 (35%) | 70 (31%) |
| SAMPLE 2-2-8 | | 130 | 10 | 204 | 66 (32%) | 81 (40%) | 57 (28%) |
| SAMPLE 2-2-9 | | 134 | 10 | 126 | 46 (37%) | 30 (24%) | 49 (39%) |
| SAMPLE 2-2-10 | | 144 | 10 | 165 | 64 (39%) | 33 (20%) | 67 (41%) |
| SAMPLE 2-2-11 | | 144 | 10 | 139 | 53 (38%) | 34 (25%) | 52 (37%) |

TABLE 10-continued

| | | | | | | | |
|---|---|---|---|---|---|---|---|
| SAMPLE 2-2-12 | PE SOLE BODY | 205 | 10 | 135 | — | 135 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 2-2-1 | | 3 | 4 (58%) | 3 | 4.35 | PTC IS UNNECESSARY | 99% |
| SAMPLE 2-2-2 | | 3 | 4 (58%) | 3 | 4.35 | PTC IS UNNECESSARY | 99% |
| SAMPLE 2-2-3 | | 3 | 4 (42%) | 3 | 4.35 | PTC IS UNNECESSARY | 99% |
| SAMPLE 2-2-4 | | 3 | 4 (42%) | 3 | 4.35 | PTC IS UNNECESSARY | 99% |
| SAMPLE 2-2-5 | | 3 | 4 (62%) | 3 | 4.35 | PTC IS NECESSARY | 99% |
| SAMPLE 2-2-6 | | 3 | 4 (62%) | 3 | 4.35 | PTC IS NECESSARY | 99% |
| SAMPLE 2-2-7 | | 3 | 4 (36%) | 3 | 4.35 | PTC IS UNNECESSARY | 99% |
| SAMPLE 2-2-8 | | 3 | 4 (36%) | 3 | 4.35 | PTC IS UNNECESSARY | 99% |
| SAMPLE 2-2-9 | | 3 | 4 (53%) | 3 | 4.35 | PTC IS NECESSARY | 99% |
| SAMPLE 2-2-10 | | 3 | 4 (52%) | 3 | 4.35 | PTC IS NECESSARY | 99% |
| SAMPLE 2-2-11 | | 3 | 4 (52%) | 3 | 4.35 | PTC IS NECESSARY | 99% |
| SAMPLE 2-2-12 | | — | 10 (52%) | — | 4.35 | PTC IS UNNECESSARY | 99% |

TABLE 11

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST | AIR PERMEABILITY OF THE 2ND | AIR PERMEABILITY OF THE 3RD |
| | FEATURE | PIERCING STRENGTH [gf] | FILM THICKNESS [μ] | AIR PERMEABILITY [sec/100 ml] | LAYER PP [sec/100 ml] (TO TOTAL) | LAYER PE [sec/100 ml] (TO TOTAL) | LAYER PP [sec/100 ml] (TO TOTAL) |
| SAMPLE 2-3-1 | PIERCING STRENGTH | 187 | 12 | 216 | 97 (45%) | 22 (10%) | 97 (45%) |
| SAMPLE 2-3-2 | 180 [gf] OR MORE | 187 | 12 | 218 | 94 (43%) | 26 (12%) | 98 (45%) |
| SAMPLE 2-3-3 | | 199 | 12 | 307 | 129 (42%) | 55 (18%) | 123 (40%) |
| SAMPLE 2-3-4 | | 199 | 12 | 288 | 115 (40%) | 58 (20%) | 115 (40%) |
| SAMPLE 2-3-5 | | 226 | 12 | 171 | 77 (45%) | 14 (8%) | 80 (47%) |
| SAMPLE 2-3-6 | | 226 | 12 | 186 | 85 (46%) | 17 (9%) | 84 (45%) |
| SAMPLE 2-3-7 | PIERCING STRENGTH | 156 | 12 | 271 | 92 (34%) | 95 (35%) | 84 (31%) |
| SAMPLE 2-3-8 | 180 [gf] OR LESS | 156 | 12 | 244 | 78 (32%) | 98 (40%) | 68 (28%) |
| SAMPLE 2-3-9 | | 160 | 12 | 151 | 56 (37%) | 36 (24%) | 59 (39%) |
| SAMPLE 2-3-10 | | 172 | 12 | 198 | 77 (39%) | 40 (20%) | 81 (41%) |
| SAMPLE 2-3-11 | | 172 | 12 | 165 | 63 (38%) | 41 (25%) | 61 (37%) |

TABLE 11-continued

| | | | | | | | |
|---|---|---|---|---|---|---|---|
| SAMPLE 2-3-12 | PE SOLE BODY | 246 | 12 | 162 | — | 162 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 2-3-1 | | 4 | 4 (58%) | 4 | 4.35 | PTC IS UNNECESSARY | 99% |
| SAMPLE 2-3-2 | | 4 | 4 (58%) | 4 | 4.35 | PTC IS UNNECESSARY | 99% |
| SAMPLE 2-3-3 | | 4 | 4 (42%) | 4 | 4.35 | PTC IS UNNECESSARY | 99% |
| SAMPLE 2-3-4 | | 4 | 4 (42%) | 4 | 4.35 | PTC IS UNNECESSARY | 99% |
| SAMPLE 2-3-5 | | 4 | 4 (62%) | 4 | 4.35 | PTC IS NECESSARY | 99% |
| SAMPLE 2-3-6 | | 4 | 4 (62%) | 4 | 4.35 | PTC IS NECESSARY | 99% |
| SAMPLE 2-3-7 | | 4 | 4 (36%) | 4 | 4.35 | PTC IS UNNECESSARY | 99% |
| SAMPLE 2-3-8 | | 4 | 4 (36%) | 4 | 4.35 | PTC IS UNNECESSARY | 99% |
| SAMPLE 2-3-9 | | 4 | 4 (53%) | 4 | 4.35 | PTC IS NECESSARY | 99% |
| SAMPLE 2-3-10 | | 4 | 4 (52%) | 4 | 4.35 | PTC IS NECESSARY | 99% |
| SAMPLE 2-3-11 | | 4 | 4 (52%) | 4 | 4.35 | PTC IS NECESSARY | 99% |
| SAMPLE 2-3-12 | | — | 12 (52%) | — | 4.35 | PTC IS UNNECESSARY | 99% |

TABLE 12

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST | AIR PERMEABILITY OF THE 2ND | AIR PERMEABILITY OF THE 3RD |
| | FEATURE | PIERCING STRENGTH [gf] | FILM THICKNESS [μ] | AIR PERMEABILITY [sec/100 ml] | LAYER PP [sec/100 ml] (TO TOTAL) | LAYER PE [sec/100 ml] (TO TOTAL) | LAYER PP [sec/100 ml] (TO TOTAL) |
| SAMPLE 2-4-1 | PIERCING STRENGTH | 250 | 16 | 288 | 129 (45%) | 30 (10%) | 129 (45%) |
| SAMPLE 2-4-2 | 240 [gf] OR MORE | 250 | 16 | 291 | 125 (43%) | 35 (12%) | 131 (45%) |
| SAMPLE 2-4-3 | | 265 | 16 | 410 | 172 (42%) | 74 (18%) | 164 (40%) |
| SAMPLE 2-4-4 | | 265 | 16 | 383 | 153 (40%) | 77 (20%) | 153 (40%) |
| SAMPLE 2-4-5 | | 302 | 16 | 227 | 102 (45%) | 18 (8%) | 107 (47%) |
| SAMPLE 2-4-6 | | 302 | 16 | 247 | 114 (46%) | 22 (9%) | 111 (45%) |
| SAMPLE 2-4-7 | PIERCING STRENGTH | 208 | 16 | 359 | 122 (34%) | 126 (35%) | 111 (31%) |
| SAMPLE 2-4-8 | 240 [gf] OR LESS | 208 | 16 | 325 | 104 (32%) | 130 (40%) | 91 (28%) |
| SAMPLE 2-4-9 | | 214 | 16 | 201 | 74 (37%) | 48 (24%) | 78 (39%) |
| SAMPLE 2-4-10 | | 230 | 16 | 263 | 102 (39%) | 53 (20%) | 108 (41%) |
| SAMPLE 2-4-11 | | 230 | 16 | 224 | 85 (38%) | 56 (25%) | 83 (37%) |

TABLE 12-continued

| SAMPLE 2-4-12 | PE SOLE BODY | 328 | 16 | 216 | — | 216 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 2-4-1 | | 5.5 | 5 (58%) | 5.5 | 4.35 | PTC IS UNNECESSARY | 98% |
| SAMPLE 2-4-2 | | 5.5 | 5 (58%) | 5.5 | 4.35 | PTC IS UNNECESSARY | 98% |
| SAMPLE 2-4-3 | | 5.5 | 5 (42%) | 5.5 | 4.35 | PTC IS UNNECESSARY | 98% |
| SAMPLE 2-4-4 | | 5.5 | 5 (42%) | 5.5 | 4.35 | PTC IS UNNECESSARY | 98% |
| SAMPLE 2-4-5 | | 5.5 | 5 (62%) | 5.5 | 4.35 | PTC IS NECESSARY | 98% |
| SAMPLE 2-4-6 | | 5.5 | 5 (62%) | 5.5 | 4.35 | PTC IS NECESSARY | 98% |
| SAMPLE 2-4-7 | | 5.5 | 5 (36%) | 5.5 | 4.35 | PTC IS UNNECESSARY | 98% |
| SAMPLE 2-4-8 | | 5.5 | 5 (36%) | 5.5 | 4.35 | PTC IS UNNECESSARY | 98% |
| SAMPLE 2-4-9 | | 5.5 | 5 (53%) | 5.5 | 4.35 | PTC IS NECESSARY | 98% |
| SAMPLE 2-4-10 | | 5.5 | 5 (52%) | 5.5 | 4.35 | PTC IS NECESSARY | 98% |
| SAMPLE 2-4-11 | | 5.5 | 5 (52%) | 5.5 | 4.35 | PTC IS NECESSARY | 98% |
| SAMPLE 2-4-12 | | — | 16 (52%) | — | 4.35 | PTC IS UNNECESSARY | 98% |

TABLE 13

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 2-5-1 | PIERCING STRENGTH | 280 | 18 | 324 | 146 (45%) | 32 (10%) | 146 (45%) |
| SAMPLE 2-5-2 | 270 [gf] OR MORE | 280 | 18 | 326 | 140 (43%) | 39 (12%) | 147 (45%) |
| SAMPLE 2-5-3 | | 298 | 18 | 461 | 194 (42%) | 83 (18%) | 184 (40%) |
| SAMPLE 2-5-4 | | 298 | 18 | 430 | 172 (40%) | 86 (20%) | 172 (40%) |
| SAMPLE 2-5-5 | | 340 | 18 | 255 | 115 (45%) | 20 (8%) | 120 (47%) |
| SAMPLE 2-5-6 | | 340 | 18 | 278 | 128 (46%) | 25 (9%) | 125 (45%) |
| SAMPLE 2-5-7 | PIERCING STRENGTH | 234 | 18 | 403 | 137 (34%) | 141 (35%) | 125 (31%) |
| SAMPLE 2-5-8 | 270 [gf] OR LESS | 234 | 18 | 365 | 117 (32%) | 146 (40%) | 102 (28%) |
| SAMPLE 2-5-9 | | 241 | 18 | 226 | 84 (37%) | 54 (24%) | 88 (39%) |
| SAMPLE 2-5-10 | | 259 | 18 | 296 | 115 (39%) | 59 (20%) | 121 (41%) |
| SAMPLE 2-5-11 | | 259 | 18 | 252 | 96 (38%) | 63 (25%) | 93 (37%) |

TABLE 13-continued

| SAMPLE 2-5-12 | PE SOLE BODY | 369 | 18 | 243 | — | 243 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 2-5-1 | | 6 | 6 (58%) | 6 | 4.35 | PTC IS UNNECESSARY | 98% |
| SAMPLE 2-5-2 | | 6 | 6 (58%) | 6 | 4.35 | PTC IS UNNECESSARY | 98% |
| SAMPLE 2-5-3 | | 6 | 6 (42%) | 6 | 4.35 | PTC IS UNNECESSARY | 98% |
| SAMPLE 2-5-4 | | 6 | 6 (42%) | 6 | 4.35 | PTC IS UNNECESSARY | 98% |
| SAMPLE 2-5-5 | | 6 | 6 (62%) | 6 | 4.35 | PTC IS NECESSARY | 98% |
| SAMPLE 2-5-6 | | 6 | 6 (62%) | 6 | 4.35 | PTC IS NECESSARY | 98% |
| SAMPLE 2-5-7 | | 6 | 6 (36%) | 6 | 4.35 | PTC IS UNNECESSARY | 98% |
| SAMPLE 2-5-8 | | 6 | 6 (36%) | 6 | 4.35 | PTC IS UNNECESSARY | 98% |
| SAMPLE 2-5-9 | | 6 | 6 (53%) | 6 | 4.35 | PTC IS NECESSARY | 98% |
| SAMPLE 2-5-10 | | 6 | 6 (52%) | 6 | 4.35 | PTC IS NECESSARY | 98% |
| SAMPLE 2-5-11 | | 6 | 6 (52%) | 6 | 4.35 | PTC IS NECESSARY | 98% |
| SAMPLE 2-5-12 | | — | 16 (52%) | — | 4.35 | PTC IS UNNECESSARY | 98% |

TABLE 14

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST | AIR PERMEABILITY OF THE 2ND | AIR PERMEABILITY OF THE 3RD |
| | FEATURE | PIERCING STRENGTH [gf] | FILM THICKNESS [μ] | AIR PERMEABILITY [sec/100 ml] | LAYER PP [sec/100 ml] (TO TOTAL) | LAYER PE [sec/100 ml] (TO TOTAL) | LAYER PP [sec/100 ml] (TO TOTAL) |
| SAMPLE 2-6-1 | PIERCING STRENGTH | 312 | 20 | 360 | 162 (45%) | 36 (10%) | 162 (45%) |
| SAMPLE 2-6-2 | 300 [gf] OR MORE | 312 | 20 | 364 | 156 (43%) | 45 (12%) | 163 (45%) |
| SAMPLE 2-6-3 | | 332 | 20 | 515 | 216 (42%) | 95 (18%) | 204 (40%) |
| SAMPLE 2-6-4 | | 332 | 20 | 479 | 193 (40%) | 95 (20%) | 191 (40%) |
| SAMPLE 2-6-5 | | 379 | 20 | 286 | 128 (45%) | 22 (8%) | 134 (47%) |
| SAMPLE 2-6-6 | | 379 | 20 | 310 | 143 (46%) | 28 (9%) | 139 (45%) |
| SAMPLE 2-6-7 | PIERCING STRENGTH | 259 | 20 | 450 | 153 (34%) | 157 (35%) | 139 (31%) |
| SAMPLE 2-6-8 | 300 [gf] OR LESS | 259 | 20 | 409 | 132 (32%) | 162 (40%) | 115 (28%) |
| SAMPLE 2-6-9 | | 268 | 20 | 253 | 93 (37%) | 61 (24%) | 99 (39%) |
| SAMPLE 2-6-10 | | 288 | 20 | 330 | 128 (39%) | 67 (20%) | 135 (41%) |
| SAMPLE 2-6-11 | | 288 | 20 | 279 | 106 (38%) | 69 (25%) | 104 (37%) |

TABLE 14-continued

| SAMPLE 2-6-12 | PE SOLE BODY | 410 | 20 | 270 | — | 270 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 2-6-1 | | 6.5 | 7 (58%) | 6.5 | 4.35 | PTC IS UNNECESSARY | 96% |
| SAMPLE 2-6-2 | | 6.5 | 7 (58%) | 6.5 | 4.35 | PTC IS UNNECESSARY | 96% |
| SAMPLE 2-6-3 | | 6.5 | 7 (42%) | 6.5 | 4.35 | PTC IS UNNECESSARY | 96% |
| SAMPLE 2-6-4 | | 6.5 | 7 (42%) | 6.5 | 4.35 | PTC IS UNNECESSARY | 96% |
| SAMPLE 2-6-5 | | 6.5 | 7 (62%) | 6.5 | 4.35 | PTC IS NECESSARY | 96% |
| SAMPLE 2-6-6 | | 6.5 | 7 (62%) | 6.5 | 4.35 | PTC IS NECESSARY | 96% |
| SAMPLE 2-6-7 | | 6.5 | 7 (36%) | 6.5 | 4.35 | PTC IS UNNECESSARY | 96% |
| SAMPLE 2-6-8 | | 6.5 | 7 (36%) | 6.5 | 4.35 | PTC IS UNNECESSARY | 96% |
| SAMPLE 2-6-9 | | 6.5 | 7 (53%) | 6.5 | 4.35 | PIC IS NECESSARY | 96% |
| SAMPLE 2-6-10 | | 6.5 | 7 (52%) | 6.5 | 4.35 | PTC IS NECESSARY | 96% |
| SAMPLE 2-6-11 | | 6.5 | 7 (52%) | 6.5 | 4.35 | PTC IS NECESSARY | 96% |
| SAMPLE 2-6-12 | | — | 20 (52%) | — | 4.35 | PTC IS UNNECESSARY | 96% |

TABLE 15

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 2-7-1 | PIERCING STRENGTH 450 [gf] OR MORE | 468 | 30 | 540 | 243 (45%) | 54 (10%) | 243 (45%) |
| SAMPLE 2-7-2 | | 468 | 30 | 546 | 234 (43%) | 65 (12%) | 245 (45%) |
| SAMPLE 2-7-3 | | 498 | 30 | 772 | 324 (42%) | 139 (18%) | 308 (40%) |
| SAMPLE 2-7-4 | | 498 | 30 | 718 | 287 (40%) | 143 (20%) | 287 (40%) |
| SAMPLE 2-7-5 | | 555 | 30 | 429 | 193 (45%) | 34 (8%) | 201 (47%) |
| SAMPLE 2-7-6 | | 555 | 30 | 465 | 213 (46%) | 41 (9%) | 209 (45%) |
| SAMPLE 2-7-7 | PIERCING STRENGTH 450 [gf] OR LESS | 388 | 30 | 675 | 229 (34%) | 236 (35%) | 209 (31%) |
| SAMPLE 2-7-8 | | 388 | 30 | 613 | 196 (32%) | 245 (40%) | 171 (28%) |
| SAMPLE 2-7-9 | | 402 | 30 | 379 | 140 (37%) | 90 (24%) | 147 (39%) |
| SAMPLE 2-7-10 | | 432 | 30 | 495 | 193 (39%) | 99 (20%) | 202 (41%) |
| SAMPLE 2-7-11 | | 432 | 30 | 418 | 158 (38%) | 104 (25%) | 154 (37%) |

TABLE 15-continued

| SAMPLE 2-7-12 | PE SOLE BODY | 615 | 30 | 405 | — | 405 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 2-7-1 | | 10 | 10 (58%) | 10 | 4.35 | PTC IS UNNECESSARY | 92% |
| SAMPLE 2-7-2 | | 10 | 10 (58%) | 10 | 4.35 | PTC IS UNNECESSARY | 92% |
| SAMPLE 2-7-3 | | 10 | 10 (42%) | 10 | 4.35 | PTC IS UNNECESSARY | 92% |
| SAMPLE 2-7-4 | | 10 | 10 (42%) | 10 | 4.35 | PTC IS UNNECESSARY | 92% |
| SAMPLE 2-7-5 | | 10 | 10 (62%) | 10 | 4.35 | PTC IS UNNECESSARY | 92% |
| SAMPLE 2-7-6 | | 10 | 10 (62%) | 10 | 4.35 | PTC IS UNNECESSARY | 92% |
| SAMPLE 2-7-7 | | 10 | 10 (36%) | 10 | 4.35 | PTC IS UNNECESSARY | 92% |
| SAMPLE 2-7-8 | | 10 | 10 (36%) | 10 | 4.35 | PTC IS UNNECESSARY | 92% |
| SAMPLE 2-7-9 | | 10 | 10 (53%) | 10 | 4.35 | PTC IS UNNECESSARY | 92% |
| SAMPLE 2-7-10 | | 10 | 10 (52%) | 10 | 4.35 | PTC IS UNNECESSARY | 92% |
| SAMPLE 2-7-11 | | 10 | 10 (52%) | 10 | 4.35 | PTC IS UNNECESSARY | 92% |
| SAMPLE 2-7-12 | | — | 30 (52%) | — | 4.35 | PTC IS UNNECESSARY | 92% |

TABLE 16

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 2-8-1 | PIERCING STRENGTH | 546 | 35 | 630 | 283 (45%) | 63 (10%) | 283 (45%) |
| SAMPLE 2-8-2 | 525 [gf] OR MORE | 546 | 35 | 637 | 273 (43%) | 76 (12%) | 286 (45%) |
| SAMPLE 2-8-3 | | 581 | 35 | 901 | 378 (42%) | 162 (18%) | 360 (40%) |
| SAMPLE 2-8-4 | | 581 | 35 | 838 | 335 (40%) | 167 (20%) | 335 (40%) |
| SAMPLE 2-8-5 | | 663 | 35 | 500 | 225 (45%) | 40 (8%) | 235 (47%) |
| SAMPLE 2-8-6 | | 663 | 35 | 542 | 249 (46%) | 48 (9%) | 243 (45%) |
| SAMPLE 2-8-7 | PIERCING STRENGTH | 453 | 35 | 787 | 267 (34%) | 275 (35%) | 243 (31%) |
| SAMPLE 2-8-8 | 525 [gf] OR LESS | 453 | 35 | 715 | 228 (32%) | 286 (40%) | 200 (28%) |
| SAMPLE 2-8-9 | | 469 | 35 | 442 | 163 (37%) | 106 (24%) | 172 (39%) |
| SAMPLE 2-8-10 | | 504 | 35 | 577 | 225 (39%) | 115 (20%) | 236 (41%) |
| SAMPLE 2-8-11 | | 504 | 35 | 488 | 185 (38%) | 122 (25%) | 180 (37%) |

TABLE 16-continued

| SAMPLE 2-8-12 | PE SOLE BODY | 717 | 35 | 472 | — | 472 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 2-8-1 | | 11.5 | 12 (58%) | 11.5 | 4.35 | PTC IS UNNECESSARY | 89% |
| SAMPLE 2-8-2 | | 11.5 | 12 (58%) | 11.5 | 4.35 | PTC IS UNNECESSARY | 89% |
| SAMPLE 2-8-3 | | 11.5 | 12 (42%) | 11.5 | 4.35 | PTC IS UNNECESSARY | 89% |
| SAMPLE 2-8-4 | | 11.5 | 12 (42%) | 11.5 | 4.35 | PTC IS UNNECESSARY | 89% |
| SAMPLE 2-8-5 | | 11.5 | 12 (62%) | 11.5 | 4.35 | PTC IS UNNECESSARY | 89% |
| SAMPLE 2-8-6 | | 11.5 | 12 (62%) | 11.5 | 4.35 | PTC IS UNNECESSARY | 89% |
| SAMPLE 2-8-7 | | 11.5 | 12 (36%) | 11.5 | 4.35 | PTC IS UNNECESSARY | 89% |
| SAMPLE 2-8-8 | | 11.5 | 12 (36%) | 11.5 | 4.35 | PTC IS UNNECESSARY | 89% |
| SAMPLE 2-8-9 | | 11.5 | 12 (53%) | 11.5 | 4.35 | PTC IS UNNECESSARY | 89% |
| SAMPLE 2-8-10 | | 11.5 | 12 (52%) | 11.5 | 4.35 | PTC IS UNNECESSARY | 89% |
| SAMPLE 2-8-11 | | 11.5 | 12 (52%) | 11.5 | 4.35 | PTC IS UNNECESSARY | 89% |
| SAMPLE 2-8-12 | | — | 35 (52%) | — | 4.35 | PTC IS UNNECESSARY | 89% |

TABLE 17

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 3-1-1 | PIERCING STRENGTH 75 [gf] OR MORE | 78 | 5 | 90 | 40.5 (45%) | 9 (10%) | 40.5 (45%) |
| SAMPLE 3-1-2 | | 78 | 5 | 91 | 39 (43%) | 11 (12%) | 41 (45%) |
| SAMPLE 3-1-3 | | 83 | 5 | 128 | 54 (42%) | 23 (18%) | 51 (40%) |
| SAMPLE 3-1-4 | | 83 | 5 | 119 | 48 (40%) | 23 (20%) | 48 (40%) |
| SAMPLE 3-1-5 | | 94 | 5 | 71 | 32 (45%) | 6 (8%) | 33 (47%) |
| SAMPLE 3-1-6 | | 94 | 5 | 78 | 36 (46%) | 7 (9%) | 35 (45%) |
| SAMPLE 3-1-7 | PIERCING STRENGTH 75 [gf] OR LESS | 64 | 5 | 112 | 38 (34%) | 39 (35%) | 35 (31%) |
| SAMPLE 3-1-8 | | 64 | 5 | 102 | 33 (32%) | 41 (40%) | 28 (28%) |
| SAMPLE 3-1-9 | | 67 | 5 | 63 | 23 (37%) | 15 (24%) | 25 (39%) |
| SAMPLE 3-1-10 | | 72 | 5 | 82 | 32 (39%) | 16 (20%) | 34 (41%) |
| SAMPLE 3-1-11 | | 72 | 5 | 69 | 26 (38%) | 17 (25%) | 25 (37%) |

TABLE 17-continued

| | | | | | | | |
|---|---|---|---|---|---|---|---|
| SAMPLE 3-1-12 | PE SOLE BODY | 102 | 5 | 67 | — | 67 (100[%]) | — |

| | FILM THICKNESS AND VOID RATIO OF EACH PORTION | | | | | LOAD |
|---|---|---|---|---|---|---|
| | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 3-1-1 | 1.5 | 2 (58%) | 1.5 | 4.4 | PTC IS NECESSARY | 99% |
| SAMPLE 3-1-2 | 1.5 | 2 (58%) | 1.5 | 4.4 | PIC IS NECESSARY | 99% |
| SAMPLE 3-1-3 | 1.5 | 2 (42%) | 1.5 | 4.4 | PTC IS NECESSARY | 99% |
| SAMPLE 3-1-4 | 1.5 | 2 (42%) | 1.5 | 4.4 | PTC IS NECESSARY | 99% |
| SAMPLE 3-1-5 | 1.5 | 2 (62%) | 1.5 | 4.4 | PTC IS NECESSARY | 99% |
| SAMPLE 3-1-6 | 1.5 | 2 (62%) | 1.5 | 4.4 | PTC IS NECESSARY | 99% |
| SAMPLE 3-1-7 | 1.5 | 2 (36%) | 1.5 | 4.4 | PTC IS NECESSARY | 99% |
| SAMPLE 3-1-8 | 1.5 | 2 (36%) | 1.5 | 4.4 | PTC IS NECESSARY | 99% |
| SAMPLE 3-1-9 | 1.5 | 2 (53%) | 1.5 | 4.4 | PTC IS NECESSARY | 99% |
| SAMPLE 3-1-10 | 1.5 | 2 (52%) | 1.5 | 4.4 | PTC IS NECESSARY | 99% |
| SAMPLE 3-1-11 | 1.5 | 2 (53%) | 1.5 | 4.4 | PTC IS NECESSARY | 99% |
| SAMPLE 3-1-12 | — | 5 (52%) | — | 4.4 | PTC IS NECESSARY | 99% |

TABLE 18

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 3-2-1 | PIERCING STRENGTH | 156 | 10 | 180 | 81 (45%) | 18 (10%) | 81 (45%) |
| SAMPLE 3-2-2 | 150 [gf] OR MORE | 156 | 10 | 182 | 78 (43%) | 21 (12%) | 81 (45%) |
| SAMPLE 3-2-3 | | 166 | 10 | 257 | 108 (42%) | 47 (18%) | 102 (40%) |
| SAMPLE 3-2-4 | | 166 | 10 | 240 | 96 (40%) | 48 (20%) | 96 (40%) |
| SAMPLE 3-2-5 | | 189 | 10 | 143 | 64 (45%) | 11 (8%) | 67 (47%) |
| SAMPLE 3-2-6 | | 189 | 10 | 155 | 71 (46%) | 14 (9%) | 70 (45%) |
| SAMPLE 3-2-7 | PIERCING STRENGTH | 130 | 10 | 225 | 76 (34%) | 78 (35%) | 70 (31%) |
| SAMPLE 3-2-8 | 150 [gf] OR LESS | 130 | 10 | 204 | 66 (32%) | 81 (40%) | 57 (28%) |
| SAMPLE 3-2-9 | | 134 | 10 | 126 | 46 (37%) | 30 (24%) | 49 (39%) |
| SAMPLE 3-2-10 | | 144 | 10 | 165 | 64 (39%) | 33 (20%) | 67 (41%) |
| SAMPLE 3-2-11 | | 144 | 10 | 139 | 53 (38%) | 34 (25%) | 52 (37%) |

TABLE 18-continued

| | | | | | | | |
|---|---|---|---|---|---|---|---|
| SAMPLE 3-2-12 | PE SOLE BODY | 205 | 10 | 135 | — | 135 (100[%]) | — |

| | FILM THICKNESS AND VOID RATIO OF EACH PORTION | | | | | LOAD |
|---|---|---|---|---|---|---|
| | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 3-2-1 | 3 | 4 (58%) | 3 | 4.4 | PTC IS UNNECESSARY | 99% |
| SAMPLE 3-2-2 | 3 | 4 (58%) | 3 | 4.4 | PTC IS UNNECESSARY | 99% |
| SAMPLE 3-2-3 | 3 | 4 (42%) | 3 | 4.4 | PTC IS UNNECESSARY | 99% |
| SAMPLE 3-2-4 | 3 | 4 (42%) | 3 | 4.4 | PTC IS UNNECESSARY | 99% |
| SAMPLE 3-2-5 | 3 | 4 (62%) | 3 | 4.4 | PTC IS NECESSARY | 99% |
| SAMPLE 3-2-6 | 3 | 4 (62%) | 3 | 4.4 | PTC IS NECESSARY | 99% |
| SAMPLE 3-2-7 | 3 | 4 (36%) | 3 | 4.4 | PTC IS UNNECESSARY | 99% |
| SAMPLE 3-2-8 | 3 | 4 (36%) | 3 | 4.4 | PTC IS UNNECESSARY | 99% |
| SAMPLE 3-2-9 | 3 | 4 (53%) | 3 | 4.4 | PTC IS NECESSARY | 99% |
| SAMPLE 3-2-10 | 3 | 4 (52%) | 3 | 4.4 | PTC IS NECESSARY | 99% |
| SAMPLE 3-2-11 | 3 | 4 (52%) | 3 | 4.4 | PTC IS NECESSARY | 99% |
| SAMPLE 3-2-12 | — | 10 (52%) | — | 4.4 | PTC IS UNNECESSARY | 99% |

TABLE 19

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 3-3-1 | PIERCING STRENGTH | 187 | 12 | 216 | 97 (45%) | 22 (10%) | 97 (45%) |
| SAMPLE 3-3-2 | 180 [gf] OR MORE | 187 | 12 | 218 | 94 (43%) | 26 (12%) | 98 (45%) |
| SAMPLE 3-3-3 | | 199 | 12 | 307 | 129 (42%) | 55 (18%) | 123 (40%) |
| SAMPLE 3-3-4 | | 199 | 12 | 288 | 115 (40%) | 58 (20%) | 115 (40%) |
| SAMPLE 3-3-5 | | 226 | 12 | 171 | 77 (45%) | 14 (8%) | 80 (47%) |
| SAMPLE 3-3-6 | | 226 | 12 | 186 | 85 (46%) | 17 (9%) | 84 (45%) |
| SAMPLE 3-3-7 | PIERCING STRENGTH | 156 | 12 | 271 | 92 (34%) | 95 (35%) | 84 (31%) |
| SAMPLE 3-3-8 | 180 [gf] OR LESS | 156 | 12 | 244 | 78 (32%) | 98 (40%) | 68 (28%) |
| SAMPLE 3-3-9 | | 160 | 12 | 151 | 56 (37%) | 36 (24%) | 59 (39%) |
| SAMPLE 3-3-10 | | 172 | 12 | 198 | 77 (39%) | 40 (20%) | 81 (41%) |
| SAMPLE 3-3-11 | | 172 | 12 | 165 | 63 (38%) | 41 (25%) | 61 (37%) |

TABLE 19-continued

| SAMPLE 3-3-12 | PE SOLE BODY | 246 | 12 | 162 | — | 162 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 3-3-1 | | 4 | 4 (58%) | 4 | 4.4 | PTC IS UNNECESSARY | 99% |
| SAMPLE 3-3-2 | | 4 | 4 (58%) | 4 | 4.4 | PTC IS UNNECESSARY | 99% |
| SAMPLE 3-3-3 | | 4 | 4 (42%) | 4 | 4.4 | PTC IS UNNECESSARY | 99% |
| SAMPLE 3-3-4 | | 4 | 4 (42%) | 4 | 4.4 | PTC IS UNNECESSARY | 99% |
| SAMPLE 3-3-5 | | 4 | 4 (62%) | 4 | 4.4 | PTC IS NECESSARY | 99% |
| SAMPLE 3-3-6 | | 4 | 4 (62%) | 4 | 4.4 | PTC IS NECESSARY | 99% |
| SAMPLE 3-3-7 | | 4 | 4 (36%) | 4 | 4.4 | PTC IS UNNECESSARY | 99% |
| SAMPLE 3-3-8 | | 4 | 4 (36%) | 4 | 4.4 | PTC IS UNNECESSARY | 99% |
| SAMPLE 3-3-9 | | 4 | 4 (53%) | 4 | 4.4 | PTC IS NECESSARY | 99% |
| SAMPLE 3-3-10 | | 4 | 4 (52%) | 4 | 4.4 | PTC IS NECESSARY | 99% |
| SAMPLE 3-3-11 | | 4 | 4 (52%) | 4 | 4.4 | PTC IS NECESSARY | 99% |
| SAMPLE 3-3-12 | | — | 12 (52%) | — | 4.4 | PTC IS UNNECESSARY | 99% |

TABLE 20

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| | FEATURE | PIERCING STRENGTH [gf] | FILM THICKNESS [μ] | AIR PERMEABILITY [sec/100 ml] | | | |
| SAMPLE 3-4-1 | PIERCING STRENGTH 240 [gf] OR MORE | 250 | 16 | 288 | 129 (45%) | 30 (10%) | 129 (45%) |
| SAMPLE 3-4-2 | | 250 | 16 | 291 | 125 (43%) | 35 (12%) | 131 (45%) |
| SAMPLE 3-4-3 | | 265 | 16 | 410 | 172 (42%) | 74 (18%) | 164 (40%) |
| SAMPLE 3-4-4 | | 265 | 16 | 383 | 153 (40%) | 77 (20%) | 153 (40%) |
| SAMPLE 3-4-5 | | 302 | 16 | 227 | 102 (45%) | 18 (8%) | 107 (47%) |
| SAMPLE 3-4-6 | | 302 | 16 | 247 | 114 (46%) | 22 (9%) | 111 (45%) |
| SAMPLE 3-4-7 | PIERCING STRENGTH 240 [gf] OR LESS | 208 | 16 | 359 | 122 (34%) | 126 (35%) | 111 (31%) |
| SAMPLE 3-4-8 | | 208 | 16 | 325 | 104 (32%) | 130 (40%) | 91 (28%) |
| SAMPLE 3-4-9 | | 214 | 16 | 201 | 74 (37%) | 48 (24%) | 78 (39%) |
| SAMPLE 3-4-10 | | 230 | 16 | 263 | 102 (39%) | 53 (20%) | 108 (41%) |
| SAMPLE 3-4-11 | | 230 | 16 | 224 | 85 (38%) | 56 (25%) | 83 (37%) |

TABLE 20-continued

| SAMPLE 3-4-12 | PE SOLE BODY | 328 | 16 | 216 | — | 216 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| | SAMPLE 3-4-1 | 5.5 | 5 (58%) | 5.5 | 4.4 | PTC IS UNNECESSARY | 98% |
| | SAMPLE 3-4-2 | 5.5 | 5 (58%) | 5.5 | 4.4 | PTC IS UNNECESSARY | 98% |
| | SAMPLE 3-4-3 | 5.5 | 5 (42%) | 5.5 | 4.4 | PTC IS UNNECESSARY | 98% |
| | SAMPLE 3-4-4 | 5.5 | 5 (42%) | 5.5 | 4.4 | PTC IS UNNECESSARY | 98% |
| | SAMPLE 3-4-5 | 5.5 | 5 (62%) | 5.5 | 4.4 | PTC IS NECESSARY | 98% |
| | SAMPLE 3-4-6 | 5.5 | 5 (62%) | 5.5 | 4.4 | PTC IS NECESSARY | 98% |
| | SAMPLE 3-4-7 | 5.5 | 5 (36%) | 5.5 | 4.4 | PTC IS UNNECESSARY | 98% |
| | SAMPLE 3-4-8 | 5.5 | 5 (36%) | 5.5 | 4.4 | PTC IS UNNECESSARY | 98% |
| | SAMPLE 3-4-9 | 5.5 | 5 (53%) | 5.5 | 4.4 | PTC IS NECESSARY | 98% |
| | SAMPLE 3-4-10 | 5.5 | 5 (52%) | 5.5 | 4.4 | PTC IS NECESSARY | 98% |
| | SAMPLE 3-4-11 | 5.5 | 5 (52%) | 5.5 | 4.4 | PTC IS NECESSARY | 98% |
| | SAMPLE 3-4-12 | — | 16 (52%) | — | 4.4 | PTC IS UNNECESSARY | 98% |

TABLE 21

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 3-5-1 | PIERCING STRENGTH 270 [gf] OR MORE | 280 | 18 | 324 | 146 (45%) | 32 (10%) | 146 (45%) |
| SAMPLE 3-5-2 | | 280 | 18 | 326 | 140 (43%) | 39 (12%) | 147 (45%) |
| SAMPLE 3-5-3 | | 298 | 18 | 461 | 194 (42%) | 83 (18%) | 184 (40%) |
| SAMPLE 3-5-4 | | 298 | 18 | 430 | 172 (40%) | 86 (20%) | 172 (40%) |
| SAMPLE 3-5-5 | | 340 | 18 | 255 | 115 (45%) | 20 (8%) | 120 (47%) |
| SAMPLE 3-5-6 | | 340 | 18 | 278 | 128 (46%) | 25 (9%) | 125 (45%) |
| SAMPLE 3-5-7 | PIERCING STRENGTH 270 [gf] OR LESS | 234 | 18 | 403 | 137 (34%) | 141 (35%) | 125 (31%) |
| SAMPLE 3-5-8 | | 234 | 18 | 365 | 117 (32%) | 146 (40%) | 102 (28%) |
| SAMPLE 3-5-9 | | 241 | 18 | 226 | 84 (37%) | 54 (24%) | 88 (39%) |
| SAMPLE 3-5-10 | | 259 | 18 | 296 | 115 (39%) | 59 (20%) | 121 (41%) |
| SAMPLE 3-5-11 | | 259 | 18 | 252 | 96 (38%) | 63 (25%) | 93 (37%) |

TABLE 21-continued

| | | | | | | | |
|---|---|---|---|---|---|---|---|
| SAMPLE 3-5-12 | PE SOLE BODY | 369 | 18 | 243 | — | 243 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 3-5-1 | | 6 | 6 (58%) | 6 | 4.4 | PTC IS UNNECESSARY | 98% |
| SAMPLE 3-5-2 | | 6 | 6 (58%) | 6 | 4.4 | PTC IS UNNECESSARY | 98% |
| SAMPLE 3-5-3 | | 6 | 6 (42%) | 6 | 4.4 | PTC IS UNNECESSARY | 98% |
| SAMPLE 3-5-4 | | 6 | 6 (42%) | 6 | 4.4 | PTC IS UNNECESSARY | 98% |
| SAMPLE 3-5-5 | | 6 | 6 (62%) | 6 | 4.4 | PTC IS NECESSARY | 98% |
| SAMPLE 3-5-6 | | 6 | 6 (62%) | 6 | 4.4 | PTC IS NECESSARY | 98% |
| SAMPLE 3-5-7 | | 6 | 6 (36%) | 6 | 4.4 | PTC IS UNNECESSARY | 98% |
| SAMPLE 3-5-8 | | 6 | 6 (36%) | 6 | 4.4 | PTC IS UNNECESSARY | 98% |
| SAMPLE 3-5-9 | | 6 | 6 (53%) | 6 | 4.4 | PTC IS NECESSARY | 98% |
| SAMPLE 3-5-10 | | 6 | 6 (52%) | 6 | 4.4 | PTC IS NECESSARY | 98% |
| SAMPLE 3-5-11 | | 6 | 6 (52%) | 6 | 4.4 | PTC IS NECESSARY | 98% |
| SAMPLE 3-5-12 | | — | 16 (52%) | — | 4.4 | PTC IS UNNECESSARY | 98% |

TABLE 22

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 3-6-1 | PIERCING STRENGTH | 312 | 20 | 360 | 162 (45%) | 36 (10%) | 162 (45%) |
| SAMPLE 3-6-2 | 300 [gf] OR MORE | 312 | 20 | 364 | 156 (43%) | 45 (12%) | 163 (45%) |
| SAMPLE 3-6-3 | | 332 | 20 | 515 | 216 (42%) | 95 (18%) | 204 (40%) |
| SAMPLE 3-6-4 | | 332 | 20 | 479 | 193 (40%) | 95 (20%) | 191 (40%) |
| SAMPLE 3-6-5 | | 379 | 20 | 286 | 128 (45%) | 22 (8%) | 134 (47%) |
| SAMPLE 3-6-6 | | 379 | 20 | 310 | 143 (46%) | 28 (9%) | 139 (45%) |
| SAMPLE 3-6-7 | PIERCING STRENGTH | 259 | 20 | 450 | 153 (34%) | 157 (35%) | 139 (31%) |
| SAMPLE 3-6-8 | 300 [gf] OR LESS | 259 | 20 | 409 | 132 (32%) | 162 (40%) | 115 (28%) |
| SAMPLE 3-6-9 | | 268 | 20 | 253 | 93 (37%) | 61 (24%) | 99 (39%) |
| SAMPLE 3-6-10 | | 288 | 20 | 330 | 128 (39%) | 67 (20%) | 135 (41%) |
| SAMPLE 3-6-11 | | 288 | 20 | 279 | 106 (38%) | 69 (25%) | 104 (37%) |

TABLE 22-continued

| SAMPLE | | | | | | | |
|---|---|---|---|---|---|---|---|
| SAMPLE 3-6-12 | PE SOLE BODY | 410 | 20 | 270 | — | 270 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 3-6-1 | | 6.5 | 7 (58%) | 6.5 | 4.4 | PTC IS UNNECESSARY | 96% |
| SAMPLE 3-6-2 | | 6.5 | 7 (58%) | 6.5 | 4.4 | PTC IS UNNECESSARY | 96% |
| SAMPLE 3-6-3 | | 6.5 | 7 (42%) | 6.5 | 4.4 | PTC IS UNNECESSARY | 96% |
| SAMPLE 3-6-4 | | 6.5 | 7 (42%) | 6.5 | 4.4 | PTC IS UNNECESSARY | 96% |
| SAMPLE 3-6-5 | | 6.5 | 7 (62%) | 6.5 | 4.4 | PTC IS NECESSARY | 96% |
| SAMPLE 3-6-6 | | 6.5 | 7 (62%) | 6.5 | 4.4 | PTC IS NECESSARY | 96% |
| SAMPLE 3-6-7 | | 6.5 | 7 (36%) | 6.5 | 4.4 | PTC IS UNNECESSARY | 96% |
| SAMPLE 3-6-8 | | 6.5 | 7 (36%) | 6.5 | 4.4 | PTC IS UNNECESSARY | 96% |
| SAMPLE 3-6-9 | | 6.5 | 7 (53%) | 6.5 | 4.4 | PTC IS NECESSARY | 96% |
| SAMPLE 3-6-10 | | 6.5 | 7 (52%) | 6.5 | 4.4 | PTC IS NECESSARY | 96% |
| SAMPLE 3-6-11 | | 6.5 | 7 (52%) | 6.5 | 4.4 | PTC IS NECESSARY | 96% |
| SAMPLE 3-6-12 | | — | 20 (52%) | — | 4.4 | PTC IS UNNECESSARY | 96% |

TABLE 23

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST | AIR PERMEABILITY OF THE 2ND | AIR PERMEABILITY OF THE 3RD |
| | FEATURE | PIERCING STRENGTH [gf] | FILM THICKNESS [μ] | AIR PERMEABILITY [sec/100 ml] | LAYER PP [sec/100 ml] (TO TOTAL) | LAYER PE [sec/100 ml] (TO TOTAL) | LAYER PP [sec/100 ml] (TO TOTAL) |
| SAMPLE 3-7-1 | PIERCING STRENGTH | 468 | 30 | 540 | 243 (45%) | 54 (10%) | 243 (45%) |
| SAMPLE 3-7-2 | 450 [gf] OR MORE | 468 | 30 | 546 | 234 (43%) | 65 (12%) | 245 (45%) |
| SAMPLE 3-7-3 | | 498 | 30 | 772 | 324 (42%) | 139 (18%) | 308 (40%) |
| SAMPLE 3-7-4 | | 498 | 30 | 718 | 287 (40%) | 143 (20%) | 287 (40%) |
| SAMPLE 3-7-5 | | 555 | 30 | 429 | 193 (45%) | 34 (8%) | 201 (47%) |
| SAMPLE 3-7-6 | | 555 | 30 | 465 | 213 (46%) | 41 (9%) | 209 (45%) |
| SAMPLE 3-7-7 | PIERCING STRENGTH | 388 | 30 | 675 | 229 (34%) | 236 (35%) | 209 (31%) |
| SAMPLE 3-7-8 | 450 [gf] OR LESS | 388 | 30 | 613 | 196 (32%) | 245 (40%) | 171 (28%) |
| SAMPLE 3-7-9 | | 402 | 30 | 379 | 140 (37%) | 90 (24%) | 147 (39%) |
| SAMPLE 3-7-10 | | 432 | 30 | 495 | 193 (39%) | 99 (20%) | 202 (41%) |
| SAMPLE 3-7-11 | | 432 | 30 | 418 | 158 (38%) | 104 (25%) | 154 (37%) |

TABLE 23-continued

| SAMPLE 3-7-12 | PE SOLE BODY | 615 | 30 | 405 | — | 405 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 3-7-1 | | 10 | 10 (58%) | 10 | 4.4 | PTC IS UNNECESSARY | 92% |
| SAMPLE 3-7-2 | | 10 | 10 (58%) | 10 | 4.4 | PTC IS UNNECESSARY | 92% |
| SAMPLE 3-7-3 | | 10 | 10 (42%) | 10 | 4.4 | PTC IS UNNECESSARY | 92% |
| SAMPLE 3-7-4 | | 10 | 10 (42%) | 10 | 4.4 | PTC IS UNNECESSARY | 92% |
| SAMPLE 3-7-5 | | 10 | 10 (62%) | 10 | 4.4 | PTC IS UNNECESSARY | 92% |
| SAMPLE 3-7-6 | | 10 | 10 (62%) | 10 | 4.4 | PTC IS UNNECESSARY | 92% |
| SAMPLE 3-7-7 | | 10 | 10 (36%) | 10 | 4.4 | PTC IS UNNECESSARY | 92% |
| SAMPLE 3-7-8 | | 10 | 10 (36%) | 10 | 4.4 | PTC IS UNNECESSARY | 92% |
| SAMPLE 3-7-9 | | 10 | 10 (53%) | 10 | 4.4 | PTC IS UNNECESSARY | 92% |
| SAMPLE 3-7-10 | | 10 | 10 (52%) | 10 | 4.4 | PTC IS UNNECESSARY | 92% |
| SAMPLE 3-7-11 | | 10 | 10 (52%) | 10 | 4.4 | PTC IS UNNECESSARY | 92% |
| SAMPLE 3-7-12 | | — | 30 (52%) | — | 4.4 | PTC IS UNNECESSARY | 92% |

TABLE 24

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 3-8-1 | PIERCING STRENGTH | 546 | 35 | 630 | 283 (45%) | 63 (10%) | 283 (45%) |
| SAMPLE 3-8-2 | 525 [gf] OR MORE | 546 | 35 | 637 | 273 (43%) | 76 (12%) | 286 (45%) |
| SAMPLE 3-8-3 | | 581 | 35 | 901 | 378 (42%) | 162 (18%) | 360 (40%) |
| SAMPLE 3-8-4 | | 581 | 35 | 838 | 335 (40%) | 167 (20%) | 335 (40%) |
| SAMPLE 3-8-5 | | 663 | 35 | 500 | 225 (45%) | 40 (8%) | 235 (47%) |
| SAMPLE 3-8-6 | | 663 | 35 | 542 | 249 (46%) | 48 (9%) | 243 (45%) |
| SAMPLE 3-8-7 | PIERCING STRENGTH | 453 | 35 | 787 | 267 (34%) | 275 (35%) | 243 (31%) |
| SAMPLE 3-8-8 | 525 [gf] OR LESS | 453 | 35 | 715 | 228 (32%) | 286 (40%) | 200 (28%) |
| SAMPLE 3-8-9 | | 469 | 35 | 442 | 163 (37%) | 106 (24%) | 172 (39%) |
| SAMPLE 3-8-10 | | 504 | 35 | 577 | 225 (39%) | 115 (20%) | 236 (41%) |
| SAMPLE 3-8-11 | | 504 | 35 | 488 | 185 (38%) | 122 (25%) | 180 (37%) |

TABLE 24-continued

| SAMPLE 3-8-12 | PE SOLE BODY | 717 | 35 | 472 | — | 472 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 3-8-1 | | 11.5 | 12 (58%) | 11.5 | 4.4 | PTC IS UNNECESSARY | 89% |
| SAMPLE 3-8-2 | | 11.5 | 12 (58%) | 11.5 | 4.4 | PTC IS UNNECESSARY | 89% |
| SAMPLE 3-8-3 | | 11.5 | 12 (42%) | 11.5 | 4.4 | PTC IS UNNECESSARY | 89% |
| SAMPLE 3-8-4 | | 11.5 | 12 (42%) | 11.5 | 4.4 | PTC IS UNNECESSARY | 89% |
| SAMPLE 3-8-5 | | 11.5 | 12 (62%) | 11.5 | 4.4 | PTC IS UNNECESSARY | 89% |
| SAMPLE 3-8-6 | | 11.5 | 12 (62%) | 11.5 | 4.4 | PTC IS UNNECESSARY | 89% |
| SAMPLE 3-8-7 | | 11.5 | 12 (36%) | 11.5 | 4.4 | PTC IS UNNECESSARY | 89% |
| SAMPLE 3-8-8 | | 11.5 | 12 (36%) | 11.5 | 4.4 | PTC IS UNNECESSARY | 89% |
| SAMPLE 3-8-9 | | 11.5 | 12 (53%) | 11.5 | 4.4 | PTC IS UNNECESSARY | 89% |
| SAMPLE 3-8-10 | | 11.5 | 12 (52%) | 11.5 | 4.4 | PTC IS UNNECESSARY | 89% |
| SAMPLE 3-8-11 | | 11.5 | 12 (52%) | 11.5 | 4.4 | PTC IS UNNECESSARY | 89% |
| SAMPLE 3-8-12 | | — | 35 (52%) | — | 4.4 | PTC IS UNNECESSARY | 89% |

TABLE 25

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 4-1-1 | PIERCING STRENGTH 75 [gf] OR MORE | 78 | 5 | 90 | 40.5 (45%) | 9 (10%) | 40.5 (45%) |
| SAMPLE 4-1-2 | | 78 | 5 | 91 | 39 (43%) | 11 (12%) | 41 (45%) |
| SAMPLE 4-1-3 | | 83 | 5 | 128 | 54 (42%) | 23 (18%) | 51 (40%) |
| SAMPLE 4-1-4 | | 83 | 5 | 119 | 48 (40%) | 23 (20%) | 48 (40%) |
| SAMPLE 4-1-5 | | 94 | 5 | 71 | 32 (45%) | 6 (8%) | 33 (47%) |
| SAMPLE 4-1-6 | | 94 | 5 | 78 | 36 (46%) | 7 (9%) | 35 (45%) |
| SAMPLE 4-1-7 | PIERCING STRENGTH 75 [gf] OR LESS | 64 | 5 | 112 | 38 (34%) | 39 (35%) | 35 (31%) |
| SAMPLE 4-1-8 | | 64 | 5 | 102 | 33 (32%) | 41 (40%) | 28 (28%) |
| SAMPLE 4-1-9 | | 67 | 5 | 63 | 23 (37%) | 15 (24%) | 25 (39%) |
| SAMPLE 4-1-10 | | 72 | 5 | 82 | 32 (39%) | 16 (20%) | 34 (41%) |
| SAMPLE 4-1-11 | | 72 | 5 | 69 | 26 (38%) | 17 (25%) | 25 (37%) |

TABLE 25-continued

| SAMPLE 4-1-12 | PE SOLE BODY | 102 | 5 | 67 | — | 67 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| | SAMPLE 4-1-1 | 1.5 | 2 (58%) | 1.5 | 4.45 | PTC IS NECESSARY | 99% |
| | SAMPLE 4-1-2 | 1.5 | 2 (58%) | 1.5 | 4.45 | PTC IS NECESSARY | 99% |
| | SAMPLE 4-1-3 | 1.5 | 2 (42%) | 1.5 | 4.45 | PTC IS NECESSARY | 99% |
| | SAMPLE 4-1-4 | 1.5 | 2 (42%) | 1.5 | 4.45 | PTC IS NECESSARY | 99% |
| | SAMPLE 4-1-5 | 1.5 | 2 (62%) | 1.5 | 4.45 | PTC IS NECESSARY | 99% |
| | SAMPLE 4-1-6 | 1.5 | 2 (62%) | 1.5 | 4.45 | PTC IS NECESSARY | 99% |
| | SAMPLE 4-1-7 | 1.5 | 2 (36%) | 1.5 | 4.45 | PTC IS NECESSARY | 99% |
| | SAMPLE 4-1-8 | 1.5 | 2 (36%) | 1.5 | 4.45 | PTC IS NECESSARY | 99% |
| | SAMPLE 4-1-9 | 1.5 | 2 (53%) | 1.5 | 4.45 | PTC IS NECESSARY | 99% |
| | SAMPLE 4-1-10 | 1.5 | 2 (52%) | 1.5 | 4.45 | PTC IS NECESSARY | 99% |
| | SAMPLE 4-1-11 | 1.5 | 2 (53%) | 1.5 | 4.45 | PTC IS NECESSARY | 99% |
| | SAMPLE 4-1-12 | — | 5 (52%) | — | 4.45 | PTC IS NECESSARY | 99% |

TABLE 26

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 4-2-1 | PIERCING STRENGTH | 156 | 10 | 180 | 81 (45%) | 18 (10%) | 81 (45%) |
| SAMPLE 4-2-2 | 150 [gf] OR MORE | 156 | 10 | 182 | 78 (43%) | 21 (12%) | 81 (45%) |
| SAMPLE 4-2-3 | | 166 | 10 | 257 | 108 (42%) | 47 (18%) | 102 (40%) |
| SAMPLE 4-2-4 | | 166 | 10 | 240 | 96 (40%) | 48 (20%) | 96 (40%) |
| SAMPLE 4-2-5 | | 189 | 10 | 143 | 64 (45%) | 11 (8%) | 67 (47%) |
| SAMPLE 4-2-6 | | 189 | 10 | 155 | 71 (46%) | 14 (9%) | 70 (45%) |
| SAMPLE 4-2-7 | PIERCING STRENGTH | 130 | 10 | 225 | 76 (34%) | 78 (35%) | 70 (31%) |
| SAMPLE 4-2-8 | 150 [gf] OR LESS | 130 | 10 | 204 | 66 (32%) | 81 (40%) | 57 (28%) |
| SAMPLE 4-2-9 | | 134 | 10 | 126 | 46 (37%) | 30 (24%) | 49 (39%) |
| SAMPLE 4-2-10 | | 144 | 10 | 165 | 64 (39%) | 33 (20%) | 67 (41%) |
| SAMPLE 4-2-11 | | 144 | 10 | 139 | 53 (38%) | 34 (25%) | 52 (37%) |

TABLE 26-continued

| SAMPLE 4-2-12 | PE SOLE BODY | 205 | 10 | 135 | — | 135 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 4-2-1 | | 3 | 4 (58%) | 3 | 4.45 | PTC IS UNNECESSARY | 99% |
| SAMPLE 4-2-2 | | 3 | 4 (58%) | 3 | 4.45 | PTC IS UNNECESSARY | 99% |
| SAMPLE 4-2-3 | | 3 | 4 (42%) | 3 | 4.45 | PTC IS UNNECESSARY | 99% |
| SAMPLE 4-2-4 | | 3 | 4 (42%) | 3 | 4.45 | PTC IS UNNECESSARY | 99% |
| SAMPLE 4-2-5 | | 3 | 4 (62%) | 3 | 4.45 | PTC IS NECESSARY | 99% |
| SAMPLE 4-2-6 | | 3 | 4 (62%) | 3 | 4.45 | PTC IS NECESSARY | 99% |
| SAMPLE 4-2-7 | | 3 | 4 (36%) | 3 | 4.45 | PTC IS UNNECESSARY | 99% |
| SAMPLE 4-2-8 | | 3 | 4 (36%) | 3 | 4.45 | PTC IS UNNECESSARY | 99% |
| SAMPLE 4-2-9 | | 3 | 4 (53%) | 3 | 4.45 | PTC IS NECESSARY | 99% |
| SAMPLE 4-2-10 | | 3 | 4 (52%) | 3 | 4.45 | PTC IS NECESSARY | 99% |
| SAMPLE 4-2-11 | | 3 | 4 (52%) | 3 | 4.45 | PTC IS NECESSARY | 99% |
| SAMPLE 4-2-12 | | — | 10 (52%) | — | 4.45 | PTC IS UNNECESSARY | 99% |

TABLE 27

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 4-3-1 | PIERCING STRENGTH | 187 | 12 | 216 | 97 (45%) | 22 (10%) | 97 (45%) |
| SAMPLE 4-3-2 | 180 [gf] OR MORE | 187 | 12 | 218 | 94 (43%) | 26 (12%) | 98 (45%) |
| SAMPLE 4-3-3 | | 199 | 12 | 307 | 129 (42%) | 55 (18%) | 123 (40%) |
| SAMPLE 4-3-4 | | 199 | 12 | 288 | 115 (40%) | 58 (20%) | 115 (40%) |
| SAMPLE 4-3-5 | | 226 | 12 | 171 | 77 (45%) | 14 (8%) | 80 (47%) |
| SAMPLE 4-3-6 | | 226 | 12 | 186 | 85 (46%) | 17 (9%) | 84 (45%) |
| SAMPLE 4-3-7 | PIERCING STRENGTH | 156 | 12 | 271 | 92 (34%) | 95 (35%) | 84 (31%) |
| SAMPLE 4-3-8 | 180 [gf] OR LESS | 156 | 12 | 244 | 78 (32%) | 98 (40%) | 68 (28%) |
| SAMPLE 4-3-9 | | 160 | 12 | 151 | 56 (37%) | 36 (24%) | 59 (39%) |
| SAMPLE 4-3-10 | | 172 | 12 | 198 | 77 (39%) | 40 (20%) | 81 (41%) |
| SAMPLE 4-3-11 | | 172 | 12 | 165 | 63 (38%) | 41 (25%) | 61 (37%) |

TABLE 27-continued

| SAMPLE 4-3-12 | PE SOLE BODY | 246 | 12 | 162 | — | 162 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 4-3-1 | | 4 | 4 (58%) | 4 | 4.45 | PTC IS UNNECESSARY | 99% |
| SAMPLE 4-3-2 | | 4 | 4 (58%) | 4 | 4.45 | PTC IS UNNECESSARY | 99% |
| SAMPLE 4-3-3 | | 4 | 4 (42%) | 4 | 4.45 | PTC IS UNNECESSARY | 99% |
| SAMPLE 4-3-4 | | 4 | 4 (42%) | 4 | 4.45 | PTC IS UNNECESSARY | 99% |
| SAMPLE 4-3-5 | | 4 | 4 (62%) | 4 | 4.45 | PTC IS NECESSARY | 99% |
| SAMPLE 4-3-6 | | 4 | 4 (62%) | 4 | 4.45 | PTC IS NECESSARY | 99% |
| SAMPLE 4-3-7 | | 4 | 4 (36%) | 4 | 4.45 | PTC IS UNNECESSARY | 99% |
| SAMPLE 4-3-8 | | 4 | 4 (36%) | 4 | 4.45 | PTC IS UNNECESSARY | 99% |
| SAMPLE 4-3-9 | | 4 | 4 (53%) | 4 | 4.45 | PTC IS NECESSARY | 99% |
| SAMPLE 4-3-10 | | 4 | 4 (52%) | 4 | 4.45 | PTC IS NECESSARY | 99% |
| SAMPLE 4-3-11 | | 4 | 4 (52%) | 4 | 4.45 | PTC IS NECESSARY | 99% |
| SAMPLE 4-3-12 | | — | 12 (52%) | — | 4.45 | PTC IS UNNECESSARY | 99% |

TABLE 28

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 4-4-1 | PIERCING STRENGTH 240 [gf] OR MORE | 250 | 16 | 288 | 129 (45%) | 30 (10%) | 129 (45%) |
| SAMPLE 4-4-2 | | 250 | 16 | 291 | 125 (43%) | 35 (12%) | 131 (45%) |
| SAMPLE 4-4-3 | | 265 | 16 | 410 | 172 (42%) | 74 (18%) | 164 (40%) |
| SAMPLE 4-4-4 | | 265 | 16 | 383 | 153 (40%) | 77 (20%) | 153 (40%) |
| SAMPLE 4-4-5 | | 302 | 16 | 227 | 102 (45%) | 18 (8%) | 107 (47%) |
| SAMPLE 4-4-6 | | 302 | 16 | 247 | 114 (46%) | 22 (9%) | 111 (45%) |
| SAMPLE 4-4-7 | PIERCING STRENGTH 240 [gf] OR LESS | 208 | 16 | 359 | 122 (34%) | 126 (35%) | 111 (31%) |
| SAMPLE 4-4-8 | | 208 | 16 | 325 | 104 (32%) | 130 (40%) | 91 (28%) |
| SAMPLE 4-4-9 | | 214 | 16 | 201 | 74 (37%) | 48 (24%) | 78 (39%) |
| SAMPLE 4-4-10 | | 230 | 16 | 263 | 102 (39%) | 53 (20%) | 108 (41%) |
| SAMPLE 4-4-11 | | 230 | 16 | 224 | 85 (38%) | 56 (25%) | 83 (37%) |

TABLE 28-continued

| SAMPLE 4-4-12 | PE SOLE BODY | 328 | 16 | 216 | — | 216 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 4-4-1 | | 5.5 | 5 (58%) | 5.5 | 4.45 | PTC IS UNNECESSARY | 98% |
| SAMPLE 4-4-2 | | 5.5 | 5 (58%) | 5.5 | 4.45 | PTC IS UNNECESSARY | 98% |
| SAMPLE 4-4-3 | | 5.5 | 5 (42%) | 5.5 | 4.45 | PTC IS UNNECESSARY | 98% |
| SAMPLE 4-4-4 | | 5.5 | 5 (42%) | 5.5 | 4.45 | PTC IS UNNECESSARY | 98% |
| SAMPLE 4-4-5 | | 5.5 | 5 (62%) | 5.5 | 4.45 | PTC IS NECESSARY | 98% |
| SAMPLE 4-4-6 | | 5.5 | 5 (62%) | 5.5 | 4.45 | PTC IS NECESSARY | 98% |
| SAMPLE 4-4-7 | | 5.5 | 5 (36%) | 5.5 | 4.45 | PTC IS UNNECESSARY | 98% |
| SAMPLE 4-4-8 | | 5.5 | 5 (36%) | 5.5 | 4.45 | PTC IS UNNECESSARY | 98% |
| SAMPLE 4-4-9 | | 5.5 | 5 (53%) | 5.5 | 4.45 | PTC IS NECESSARY | 98% |
| SAMPLE 4-4-10 | | 5.5 | 5 (52%) | 5.5 | 4.45 | PTC IS NECESSARY | 98% |
| SAMPLE 4-4-11 | | 5.5 | 5 (52%) | 5.5 | 4.45 | PTC IS NECESSARY | 98% |
| SAMPLE 4-4-12 | | — | 16 (52%) | — | 4.45 | PTC IS UNNECESSARY | 98% |

TABLE 29

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 4-5-1 | PIERCING STRENGTH | 280 | 18 | 324 | 146 (45%) | 32 (10%) | 146 (45%) |
| SAMPLE 4-5-2 | 270 [gf] OR MORE | 280 | 18 | 326 | 140 (43%) | 39 (12%) | 147 (45%) |
| SAMPLE 4-5-3 | | 298 | 18 | 461 | 194 (42%) | 83 (18%) | 184 (40%) |
| SAMPLE 4-5-4 | | 298 | 18 | 430 | 172 (40%) | 86 (20%) | 172 (40%) |
| SAMPLE 4-5-5 | | 340 | 18 | 255 | 115 (45%) | 20 (8%) | 120 (47%) |
| SAMPLE 4-5-6 | | 340 | 18 | 278 | 128 (46%) | 25 (9%) | 125 (45%) |
| SAMPLE 4-5-7 | PIERCING STRENGTH | 234 | 18 | 403 | 137 (34%) | 141 (35%) | 125 (31%) |
| SAMPLE 4-5-8 | 270 [gf] OR LESS | 234 | 18 | 365 | 117 (32%) | 146 (40%) | 102 (28%) |
| SAMPLE 4-5-9 | | 241 | 18 | 226 | 84 (37%) | 54 (24%) | 88 (39%) |
| SAMPLE 4-5-10 | | 259 | 18 | 296 | 115 (39%) | 59 (20%) | 121 (41%) |
| SAMPLE 4-5-11 | | 259 | 18 | 252 | 96 (38%) | 63 (25%) | 93 (37%) |

TABLE 29-continued

| SAMPLE 4-5-12 | PE SOLE BODY | 369 | 18 | 243 | — | 243 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 4-5-1 | | 6 | 6 (58%) | 6 | 4.45 | PTC IS UNNECESSARY | 98% |
| SAMPLE 4-5-2 | | 6 | 6 (58%) | 6 | 4.45 | PTC IS UNNECESSARY | 98% |
| SAMPLE 4-5-3 | | 6 | 6 (42%) | 6 | 4.45 | PTC IS UNNECESSARY | 98% |
| SAMPLE 4-5-4 | | 6 | 6 (42%) | 6 | 4.45 | PTC IS UNNECESSARY | 98% |
| SAMPLE 4-5-5 | | 6 | 6 (62%) | 6 | 4.45 | PTC IS NECESSARY | 98% |
| SAMPLE 4-5-6 | | 6 | 6 (62%) | 6 | 4.45 | PTC IS NECESSARY | 98% |
| SAMPLE 4-5-7 | | 6 | 6 (36%) | 6 | 4.45 | PTC IS UNNECESSARY | 98% |
| SAMPLE 4-5-8 | | 6 | 6 (36%) | 6 | 4.45 | PTC IS UNNECESSARY | 98% |
| SAMPLE 4-5-9 | | 6 | 6 (53%) | 6 | 4.45 | PTC IS NECESSARY | 98% |
| SAMPLE 4-5-10 | | 6 | 6 (52%) | 6 | 4.45 | PTC IS NECESSARY | 98% |
| SAMPLE 4-5-11 | | 6 | 6 (52%) | 6 | 4.45 | PTC IS NECESSARY | 98% |
| SAMPLE 4-5-12 | | — | 16 (52%) | — | 4.45 | PTC IS UNNECESSARY | 98% |

TABLE 30

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 4-6-1 | PIERCING STRENGTH | 312 | 20 | 360 | 162 (45%) | 36 (10%) | 162 (45%) |
| SAMPLE 4-6-2 | 300 [gf] OR MORE | 312 | 20 | 364 | 156 (43%) | 45 (12%) | 163 (45%) |
| SAMPLE 4-6-3 | | 332 | 20 | 515 | 216 (42%) | 95 (18%) | 204 (40%) |
| SAMPLE 4-6-4 | | 332 | 20 | 479 | 193 (40%) | 95 (20%) | 191 (40%) |
| SAMPLE 4-6-5 | | 379 | 20 | 286 | 128 (45%) | 22 (8%) | 134 (47%) |
| SAMPLE 4-6-6 | | 379 | 20 | 310 | 143 (46%) | 28 (9%) | 139 (45%) |
| SAMPLE 4-6-7 | PIERCING STRENGTH | 259 | 20 | 450 | 153 (34%) | 157 (35%) | 139 (31%) |
| SAMPLE 4-6-8 | 300 [gf] OR LESS | 259 | 20 | 409 | 132 (32%) | 162 (40%) | 115 (28%) |
| SAMPLE 4-6-9 | | 268 | 20 | 253 | 93 (37%) | 61 (24%) | 99 (39%) |
| SAMPLE 4-6-10 | | 288 | 20 | 330 | 128 (39%) | 67 (20%) | 135 (41%) |
| SAMPLE 4-6-11 | | 288 | 20 | 279 | 106 (38%) | 69 (25%) | 104 (37%) |

TABLE 30-continued

| SAMPLE 4-6-12 | PE SOLE BODY | 410 | 20 | 270 | — | 270 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 4-6-1 | | 6.5 | 7 (58%) | 6.5 | 4.45 | PTC IS UNNECESSARY | 96% |
| SAMPLE 4-6-2 | | 6.5 | 7 (58%) | 6.5 | 4.45 | PTC IS UNNECESSARY | 96% |
| SAMPLE 4-6-3 | | 6.5 | 7 (42%) | 6.5 | 4.45 | PTC IS UNNECESSARY | 96% |
| SAMPLE 4-6-4 | | 6.5 | 7 (42%) | 6.5 | 4.45 | PTC IS UNNECESSARY | 96% |
| SAMPLE 4-6-5 | | 6.5 | 7 (62%) | 6.5 | 4.45 | PTC IS NECESSARY | 96% |
| SAMPLE 4-6-6 | | 6.5 | 7 (62%) | 6.5 | 4.45 | PTC IS NECESSARY | 96% |
| SAMPLE 4-6-7 | | 6.5 | 7 (36%) | 6.5 | 4.45 | PTC IS UNNECESSARY | 96% |
| SAMPLE 4-6-8 | | 6.5 | 7 (36%) | 6.5 | 4.45 | PTC IS UNNECESSARY | 96% |
| SAMPLE 4-6-9 | | 6.5 | 7 (53%) | 6.5 | 4.45 | PTC IS NECESSARY | 96% |
| SAMPLE 4-6-10 | | 6.5 | 7 (52%) | 6.5 | 4.45 | PTC IS NECESSARY | 96% |
| SAMPLE 4-6-11 | | 6.5 | 7 (52%) | 6.5 | 4.45 | PTC IS NECESSARY | 96% |
| SAMPLE 4-6-12 | | — | 20 (52%) | — | 4.45 | PTC IS UNNECESSARY | 96% |

TABLE 31

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 4-7-1 | PIERCING STRENGTH | 468 | 30 | 540 | 243 (45%) | 54 (10%) | 243 (45%) |
| SAMPLE 4-7-2 | 450 [gf] OR MORE | 468 | 30 | 546 | 234 (43%) | 65 (12%) | 245 (45%) |
| SAMPLE 4-7-3 | | 498 | 30 | 772 | 324 (42%) | 139 (18%) | 308 (40%) |
| SAMPLE 4-7-4 | | 498 | 30 | 718 | 287 (40%) | 143 (20%) | 287 (40%) |
| SAMPLE 4-7-5 | | 555 | 30 | 429 | 193 (45%) | 34 (8%) | 201 (47%) |
| SAMPLE 4-7-6 | | 555 | 30 | 465 | 213 (46%) | 41 (9%) | 209 (45%) |
| SAMPLE 4-7-7 | PIERCING STRENGTH | 388 | 30 | 675 | 229 (34%) | 236 (35%) | 209 (31%) |
| SAMPLE 4-7-8 | 450 [gf] OR LESS | 388 | 30 | 613 | 196 (32%) | 245 (40%) | 171 (28%) |
| SAMPLE 4-7-9 | | 402 | 30 | 379 | 140 (37%) | 90 (24%) | 147 (39%) |
| SAMPLE 4-7-10 | | 432 | 30 | 495 | 193 (39%) | 99 (20%) | 202 (41%) |
| SAMPLE 4-7-11 | | 432 | 30 | 418 | 158 (38%) | 104 (25%) | 154 (37%) |

TABLE 31-continued

| | | | | | | | |
|---|---|---|---|---|---|---|---|
| SAMPLE 4-7-12 | PE SOLE BODY | 615 | 30 | 405 | — | 405 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 4-7-1 | | 10 | 10 (58%) | 10 | 4.45 | PTC IS UNNECESSARY | 92% |
| SAMPLE 4-7-2 | | 10 | 10 (58%) | 10 | 4.45 | PTC IS UNNECESSARY | 92% |
| SAMPLE 4-7-3 | | 10 | 10 (42%) | 10 | 4.45 | PTC IS UNNECESSARY | 92% |
| SAMPLE 4-7-4 | | 10 | 10 (42%) | 10 | 4.45 | PTC IS UNNECESSARY | 92% |
| SAMPLE 4-7-5 | | 10 | 10 (62%) | 10 | 4.45 | PTC IS UNNECESSARY | 92% |
| SAMPLE 4-7-6 | | 10 | 10 (62%) | 10 | 4.45 | PTC IS UNNECESSARY | 92% |
| SAMPLE 4-7-7 | | 10 | 10 (36%) | 10 | 4.45 | PTC IS UNNECESSARY | 92% |
| SAMPLE 4-7-8 | | 10 | 10 (36%) | 10 | 4.45 | PTC IS UNNECESSARY | 92% |
| SAMPLE 4-7-9 | | 10 | 10 (53%) | 10 | 4.45 | PTC IS UNNECESSARY | 92% |
| SAMPLE 4-7-10 | | 10 | 10 (52%) | 10 | 4.45 | PTC IS UNNECESSARY | 92% |
| SAMPLE 4-7-11 | | 10 | 10 (52%) | 10 | 4.45 | PTC IS UNNECESSARY | 92% |
| SAMPLE 4-7-12 | | — | 30 (52%) | — | 4.45 | PTC IS UNNECESSARY | 92% |

TABLE 32

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 4-8-1 | PIERCING STRENGTH | 546 | 35 | 630 | 283 (45%) | 63 (10%) | 283 (45%) |
| SAMPLE 4-8-2 | 525 [gf] OR MORE | 546 | 35 | 637 | 273 (43%) | 76 (12%) | 286 (45%) |
| SAMPLE 4-8-3 | | 581 | 35 | 901 | 378 (42%) | 162 (18%) | 360 (40%) |
| SAMPLE 4-8-4 | | 581 | 35 | 838 | 335 (40%) | 167 (20%) | 335 (40%) |
| SAMPLE 4-8-5 | | 663 | 35 | 500 | 225 (45%) | 40 (8%) | 235 (47%) |
| SAMPLE 4-8-6 | | 663 | 35 | 542 | 249 (46%) | 48 (9%) | 243 (45%) |
| SAMPLE 4-8-7 | PIERCING STRENGTH | 453 | 35 | 787 | 267 (34%) | 275 (35%) | 243 (31%) |
| SAMPLE 4-8-8 | 525 [gf] OR LESS | 453 | 35 | 715 | 228 (32%) | 286 (40%) | 200 (28%) |
| SAMPLE 4-8-9 | | 469 | 35 | 442 | 163 (37%) | 106 (24%) | 172 (39%) |
| SAMPLE 4-8-10 | | 504 | 35 | 577 | 225 (39%) | 115 (20%) | 236 (41%) |
| SAMPLE 4-8-11 | | 504 | 35 | 488 | 185 (38%) | 122 (25%) | 180 (37%) |

TABLE 32-continued

| SAMPLE | | | | | | | |
|---|---|---|---|---|---|---|---|
| 4-8-12 | PE SOLE BODY | 717 | 35 | 472 | — | 472 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT- CIRCUIT PTC | |
| SAMPLE 4-8-1 | | 11.5 | 12 (58%) | 11.5 | 4.45 | PTC IS UNNECESSARY | 89% |
| SAMPLE 4-8-2 | | 11.5 | 12 (58%) | 11.5 | 4.45 | PTC IS UNNECESSARY | 89% |
| SAMPLE 4-8-3 | | 11.5 | 12 (42%) | 11.5 | 4.45 | PTC IS UNNECESSARY | 89% |
| SAMPLE 4-8-4 | | 11.5 | 12 (42%) | 11.5 | 4.45 | PTC IS UNNECESSARY | 89% |
| SAMPLE 4-8-5 | | 11.5 | 12 (62%) | 11.5 | 4.45 | PTC IS UNNECESSARY | 89% |
| SAMPLE 4-8-6 | | 11.5 | 12 (62%) | 11.5 | 4.45 | PTC IS UNNECESSARY | 89% |
| SAMPLE 4-8-7 | | 11.5 | 12 (36%) | 11.5 | 4.45 | PTC IS UNNECESSARY | 89% |
| SAMPLE 4-8-8 | | 11.5 | 12 (36%) | 11.5 | 4.45 | PTC IS UNNECESSARY | 89% |
| SAMPLE 4-8-9 | | 11.5 | 12 (53%) | 11.5 | 4.45 | PTC IS UNNECESSARY | 89% |
| SAMPLE 4-8-10 | | 11.5 | 12 (52%) | 11.5 | 4.45 | PTC IS UNNECESSARY | 89% |
| SAMPLE 4-8-11 | | 11.5 | 12 (52%) | 11.5 | 4.45 | PTC IS UNNECESSARY | 89% |
| SAMPLE 4-8-12 | | — | 35 (52%) | — | 4.45 | PTC IS UNNECESSARY | 89% |

TABLE 33

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST | AIR PERMEABILITY OF THE 2ND | AIR PERMEABILITY OF THE 3RD |
| | FEATURE | PIERCING STRENGTH [gf] | FILM THICKNESS [μ] | AIR PERMEABILITY [sec/100 ml] | LAYER PP [sec/100 ml] (TO TOTAL) | LAYER PE [sec/100 ml] (TO TOTAL) | LAYER PP [sec/100 ml] (TO TOTAL) |
| SAMPLE 5-1-1 | PIERCING STRENGTH 75 [gf] OR MORE | 78 | 5 | 90 | 40.5 (45%) | 9 (10%) | 40.5 (45%) |
| SAMPLE 5-1-2 | | 78 | 5 | 91 | 39 (43%) | 11 (12%) | 41 (45%) |
| SAMPLE 5-1-3 | | 83 | 5 | 128 | 54 (42%) | 23 (18%) | 51 (40%) |
| SAMPLE 5-1-4 | | 83 | 5 | 119 | 48 (40%) | 23 (20%) | 48 (40%) |
| SAMPLE 5-1-5 | | 94 | 5 | 71 | 32 (45%) | 6 (8%) | 33 (47%) |
| SAMPLE 5-1-6 | | 94 | 5 | 78 | 36 (46%) | 7 (9%) | 35 (45%) |
| SAMPLE 5-1-7 | PIERCING STRENGTH 75 [gf] OR LESS | 64 | 5 | 112 | 38 (34%) | 39 (35%) | 35 (31%) |
| SAMPLE 5-1-8 | | 64 | 5 | 102 | 33 (32%) | 41 (40%) | 28 (28%) |
| SAMPLE 5-1-9 | | 67 | 5 | 63 | 23 (37%) | 15 (24%) | 25 (39%) |
| SAMPLE 5-1-10 | | 72 | 5 | 82 | 32 (39%) | 16 (20%) | 34 (41%) |
| SAMPLE 5-1-11 | | 72 | 5 | 69 | 26 (38%) | 17 (25%) | 25 (37%) |

TABLE 33-continued

| SAMPLE 5-1-12 | PE SOLE BODY | 102 | 5 | 67 | — | 67 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| | SAMPLE 5-1-1 | 1.5 | 2 (58%) | 1.5 | 4.55 | PTC IS NECESSARY | 99% |
| | SAMPLE 5-1-2 | 1.5 | 2 (58%) | 1.5 | 4.55 | PTC IS NECESSARY | 99% |
| | SAMPLE 5-1-3 | 1.5 | 2 (42%) | 1.5 | 4.55 | PTC IS NECESSARY | 99% |
| | SAMPLE 5-1-4 | 1.5 | 2 (42%) | 1.5 | 4.55 | PTC IS NECESSARY | 99% |
| | SAMPLE 5-1-5 | 1.5 | 2 (62%) | 1.5 | 4.55 | PTC IS NECESSARY | 99% |
| | SAMPLE 5-1-6 | 1.5 | 2 (62%) | 1.5 | 4.55 | PTC IS NECESSARY | 99% |
| | SAMPLE 5-1-7 | 1.5 | 2 (36%) | 1.5 | 4.55 | PTC IS NECESSARY | 99% |
| | SAMPLE 5-1-8 | 1.5 | 2 (36%) | 1.5 | 4.55 | PTC IS NECESSARY | 99% |
| | SAMPLE 5-1-9 | 1.5 | 2 (53%) | 1.5 | 4.55 | PTC IS NECESSARY | 99% |
| | SAMPLE 5-1-10 | 1.5 | 2 (52%) | 1.5 | 4.55 | PTC IS NECESSARY | 99% |
| | SAMPLE 5-1-11 | 1.5 | 2 (53%) | 1.5 | 4.55 | PTC IS NECESSARY | 99% |
| | SAMPLE 5-1-12 | — | 5 (52%) | — | 4.55 | PTC IS NECESSARY | 99% |

TABLE 34

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TATAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 5-2-1 | PIERCING STRENGTH | 156 | 10 | 180 | 81 (45%) | 18 (10%) | 81 (45%) |
| SAMPLE 5-2-2 | 150 [gf] OR MORE | 156 | 10 | 182 | 78 (43%) | 21 (12%) | 81 (45%) |
| SAMPLE 5-2-3 | | 166 | 10 | 257 | 108 (42%) | 47 (18%) | 102 (40%) |
| SAMPLE 5-2-4 | | 166 | 10 | 240 | 96 (40%) | 48 (20%) | 96 (40%) |
| SAMPLE 5-2-5 | | 189 | 10 | 143 | 64 (45%) | 11 (8%) | 67 (47%) |
| SAMPLE 5-2-6 | | 189 | 10 | 155 | 71 (46%) | 14 (9%) | 70 (45%) |
| SAMPLE 5-2-7 | PIERCING STRENGTH | 130 | 10 | 225 | 76 (34%) | 78 (35%) | 70 (31%) |
| SAMPLE 5-2-8 | 150 [gf] OR LESS | 130 | 10 | 204 | 66 (32%) | 81 (40%) | 57 (28%) |
| SAMPLE 5-2-9 | | 134 | 10 | 126 | 46 (37%) | 30 (24%) | 49 (39%) |
| SAMPLE 5-2-10 | | 144 | 10 | 165 | 64 (39%) | 33 (20%) | 67 (41%) |
| SAMPLE 5-2-11 | | 144 | 10 | 139 | 53 (38%) | 34 (25%) | 52 (37%) |

TABLE 34-continued

| SAMPLE 5-2-12 | PE SOLE BODY | 205 | 10 | 135 | — | 135 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 5-2-1 | | 3 | 4 (58%) | 3 | 4.55 | PTC IS UNNECESSARY | 99% |
| SAMPLE 5-2-2 | | 3 | 4 (58%) | 3 | 4.55 | PTC IS UNNECESSARY | 99% |
| SAMPLE 5-2-3 | | 3 | 4 (42%) | 3 | 4.55 | PTC IS UNNECESSARY | 99% |
| SAMPLE 5-2-4 | | 3 | 4 (42%) | 3 | 4.55 | PTC IS UNNECESSARY | 99% |
| SAMPLE 5-2-5 | | 3 | 4 (62%) | 3 | 4.55 | PTC IS NECESSARY | 99% |
| SAMPLE 5-2-6 | | 3 | 4 (62%) | 3 | 4.55 | PTC IS NECESSARY | 99% |
| SAMPLE 5-2-7 | | 3 | 4 (36%) | 3 | 4.55 | PTC IS UNNECESSARY | 99% |
| SAMPLE 5-2-8 | | 3 | 4 (36%) | 3 | 4.55 | PTC IS UNNECESSARY | 99% |
| SAMPLE 5-2-9 | | 3 | 4 (53%) | 3 | 4.55 | PTC IS NECESSARY | 99% |
| SAMPLE 5-2-10 | | 3 | 4 (52%) | 3 | 4.55 | PTC IS NECESSARY | 99% |
| SAMPLE 5-2-11 | | 3 | 4 (52%) | 3 | 4.55 | PTC IS NECESSARY | 99% |
| SAMPLE 5-2-12 | | — | 10 (52%) | — | 4.55 | PTC IS UNNECESSARY | 99% |

TABLE 35

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST LAYER PP [sec/100 ml] (TO TATAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| | FEATURE | PIERCING STRENGTH [gf] | FILM THICKNESS [μ] | AIR PERMEABILITY [sec/100 ml] | | | |
| SAMPLE 5-3-1 | PIERCING STRENGTH | 187 | 12 | 216 | 97 (45%) | 22 (10%) | 97 (45%) |
| SAMPLE 5-3-2 | 180 [gf] OR MORE | 187 | 12 | 218 | 94 (43%) | 26 (12%) | 98 (45%) |
| SAMPLE 5-3-3 | | 199 | 12 | 307 | 129 (42%) | 55 (18%) | 123 (40%) |
| SAMPLE 5-3-4 | | 199 | 12 | 288 | 115 (40%) | 58 (20%) | 115 (40%) |
| SAMPLE 5-3-5 | | 226 | 12 | 171 | 77 (45%) | 14 (8%) | 80 (47%) |
| SAMPLE 5-3-6 | | 226 | 12 | 186 | 85 (46%) | 17 (9%) | 84 (45%) |
| SAMPLE 5-3-7 | PIERCING STRENGTH | 156 | 12 | 271 | 92 (34%) | 95 (35%) | 84 (31%) |
| SAMPLE 5-3-8 | 180 [gf] OR LESS | 156 | 12 | 244 | 78 (32%) | 98 (40%) | 68 (28%) |
| SAMPLE 5-3-9 | | 160 | 12 | 151 | 56 (37%) | 36 (24%) | 59 (39%) |
| SAMPLE 5-3-10 | | 172 | 12 | 198 | 77 (39%) | 40 (20%) | 81 (41%) |
| SAMPLE 5-3-11 | | 172 | 12 | 165 | 63 (38%) | 41 (25%) | 61 (37%) |

TABLE 35-continued

| SAMPLE 5-3-12 | PE SOLE BODY | 246 | 12 | 162 | — | 162 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 5-3-1 | | 4 | 4 (58%) | 4 | 4.55 | PTC IS UNNECESSARY | 99% |
| SAMPLE 5-3-2 | | 4 | 4 (58%) | 4 | 4.55 | PTC IS UNNECESSARY | 99% |
| SAMPLE 5-3-3 | | 4 | 4 (42%) | 4 | 4.55 | PTC IS UNNECESSARY | 99% |
| SAMPLE 5-3-4 | | 4 | 4 (42%) | 4 | 4.55 | PTC IS UNNECESSARY | 99% |
| SAMPLE 5-3-5 | | 4 | 4 (62%) | 4 | 4.55 | PTC IS NECESSARY | 99% |
| SAMPLE 5-3-6 | | 4 | 4 (62%) | 4 | 4.55 | PTC IS NECESSARY | 99% |
| SAMPLE 5-3-7 | | 4 | 4 (36%) | 4 | 4.55 | PTC IS UNNECESSARY | 99% |
| SAMPLE 5-3-8 | | 4 | 4 (36%) | 4 | 4.55 | PTC IS UNNECESSARY | 99% |
| SAMPLE 5-3-9 | | 4 | 4 (53%) | 4 | 4.55 | PTC IS NECESSARY | 99% |
| SAMPLE 5-3-10 | | 4 | 4 (52%) | 4 | 4.55 | PTC IS NECESSARY | 99% |
| SAMPLE 5-3-11 | | 4 | 4 (52%) | 4 | 4.55 | PTC IS NECESSARY | 99% |
| SAMPLE 5-3-12 | | — | 12 (52%) | — | 4.55 | PTC IS UNNECESSARY | 99% |

TABLE 36

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 5-4-1 | PIERCING STRENGTH 240 [gf] OR MORE | 250 | 16 | 288 | 129 (45%) | 30 (10%) | 129 (45%) |
| SAMPLE 5-4-2 | | 250 | 16 | 291 | 125 (43%) | 35 (12%) | 131 (45%) |
| SAMPLE 5-4-3 | | 265 | 16 | 410 | 172 (42%) | 74 (18%) | 164 (40%) |
| SAMPLE 5-4-4 | | 265 | 16 | 383 | 153 (40%) | 77 (20%) | 153 (40%) |
| SAMPLE 5-4-5 | | 302 | 16 | 227 | 102 (45%) | 18 (8%) | 107 (47%) |
| SAMPLE 5-4-6 | | 302 | 16 | 247 | 114 (46%) | 22 (9%) | 111 (45%) |
| SAMPLE 5-4-7 | PIERCING STRENGTH 240 [gf] OR LESS | 208 | 16 | 359 | 122 (34%) | 126 (35%) | 111 (31%) |
| SAMPLE 5-4-8 | | 208 | 16 | 325 | 104 (32%) | 130 (40%) | 91 (28%) |
| SAMPLE 5-4-9 | | 214 | 16 | 201 | 74 (37%) | 48 (24%) | 78 (39%) |
| SAMPLE 5-4-10 | | 230 | 16 | 263 | 102 (39%) | 53 (20%) | 108 (41%) |
| SAMPLE 5-4-11 | | 230 | 16 | 224 | 85 (38%) | 56 (25%) | 83 (37%) |

TABLE 36-continued

| SAMPLE 5-4-12 | PE SOLE BODY | 328 | 16 | 216 | — | 216 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 5-4-1 | | 5.5 | 5 (58%) | 5.5 | 4.55 | PTC IS UNNECESSARY | 98% |
| SAMPLE 5-4-2 | | 5.5 | 5 (58%) | 5.5 | 4.55 | PTC IS UNNECESSARY | 98% |
| SAMPLE 5-4-3 | | 5.5 | 5 (42%) | 5.5 | 4.55 | PTC IS UNNECESSARY | 98% |
| SAMPLE 5-4-4 | | 5.5 | 5 (42%) | 5.5 | 4.55 | PTC IS UNNECESSARY | 98% |
| SAMPLE 5-4-5 | | 5.5 | 5 (62%) | 5.5 | 4.55 | PTC IS NECESSARY | 98% |
| SAMPLE 5-4-6 | | 5.5 | 5 (62%) | 5.5 | 4.55 | PTC IS NECESSARY | 98% |
| SAMPLE 5-4-7 | | 5.5 | 5 (36%) | 5.5 | 4.55 | PTC IS UNNECESSARY | 98% |
| SAMPLE 5-4-8 | | 5.5 | 5 (36%) | 5.5 | 4.55 | PTC IS UNNECESSARY | 98% |
| SAMPLE 5-4-9 | | 5.5 | 5 (53%) | 5.5 | 4.55 | PTC IS NECESSARY | 98% |
| SAMPLE 5-4-10 | | 5.5 | 5 (52%) | 5.5 | 4.55 | PTC IS NECESSARY | 98% |
| SAMPLE 5-4-11 | | 5.5 | 5 (52%) | 5.5 | 4.55 | PTC IS NECESSARY | 98% |
| SAMPLE 5-4-12 | | — | 16 (52%) | — | 4.55 | PTC IS UNNECESSARY | 98% |

TABLE 37

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TATAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 5-5-1 | PIERCING STRENGTH | 280 | 18 | 324 | 146 (45%) | 32 (10%) | 146 (45%) |
| SAMPLE 5-5-2 | 270 [gf] OR MORE | 280 | 18 | 326 | 140 (43%) | 39 (12%) | 147 (45%) |
| SAMPLE 5-5-3 | | 298 | 18 | 461 | 194 (42%) | 83 (18%) | 184 (40%) |
| SAMPLE 5-5-4 | | 298 | 18 | 430 | 172 (40%) | 86 (20%) | 172 (40%) |
| SAMPLE 5-5-5 | | 340 | 18 | 255 | 115 (45%) | 20 (8%) | 120 (47%) |
| SAMPLE 5-5-6 | | 340 | 18 | 278 | 128 (46%) | 25 (9%) | 125 (45%) |
| SAMPLE 5-5-7 | PIERCING STRENGTH | 234 | 18 | 403 | 137 (34%) | 141 (35%) | 125 (31%) |
| SAMPLE 5-5-8 | 270 [gf] OR LESS | 234 | 18 | 365 | 117 (32%) | 146 (40%) | 102 (28%) |
| SAMPLE 5-5-9 | | 241 | 18 | 226 | 84 (37%) | 54 (24%) | 88 (39%) |
| SAMPLE 5-5-10 | | 259 | 18 | 296 | 115 (39%) | 59 (20%) | 121 (41%) |
| SAMPLE 5-5-11 | | 259 | 18 | 252 | 96 (38%) | 63 (25%) | 93 (37%) |

TABLE 37-continued

| SAMPLE | | | | | | | |
|---|---|---|---|---|---|---|---|
| SAMPLE 5-5-12 | PE SOLE BODY | 369 | 18 | 243 | — | 243 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| | SAMPLE 5-5-1 | 6 | 6 (58%) | 6 | 4.55 | PTC IS UNNECESSARY | 98% |
| | SAMPLE 5-5-2 | 6 | 6 (58%) | 6 | 4.55 | PTC IS UNNECESSARY | 98% |
| | SAMPLE 5-5-3 | 6 | 6 (42%) | 6 | 4.55 | PTC IS UNNECESSARY | 98% |
| | SAMPLE 5-5-4 | 6 | 6 (42%) | 6 | 4.55 | PTC IS UNNECESSARY | 98% |
| | SAMPLE 5-5-5 | 6 | 6 (62%) | 6 | 4.55 | PTC IS NECESSARY | 98% |
| | SAMPLE 5-5-6 | 6 | 6 (62%) | 6 | 4.55 | PTC IS NECESSARY | 98% |
| | SAMPLE 5-5-7 | 6 | 6 (36%) | 6 | 4.55 | PTC IS UNNECESSARY | 98% |
| | SAMPLE 5-5-8 | 6 | 6 (36%) | 6 | 4.55 | PTC IS UNNECESSARY | 98% |
| | SAMPLE 5-5-9 | 6 | 6 (53%) | 6 | 4.55 | PTC IS NECESSARY | 98% |
| | SAMPLE 5-5-10 | 6 | 6 (52%) | 6 | 4.55 | PTC IS NECESSARY | 98% |
| | SAMPLE 5-5-11 | 6 | 6 (52%) | 6 | 4.55 | PTC IS NECESSARY | 98% |
| | SAMPLE 5-5-12 | — | 16 (52%) | — | 4.55 | PTC IS UNNECESSARY | 98% |

TABLE 38

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 5-6-1 | PIERCING STRENGTH | 312 | 20 | 360 | 162 (45%) | 36 (10%) | 162 (45%) |
| SAMPLE 5-6-2 | 300 [gf] OR MORE | 312 | 20 | 364 | 156 (43%) | 45 (12%) | 163 (45%) |
| SAMPLE 5-6-3 | | 332 | 20 | 515 | 216 (42%) | 95 (18%) | 204 (40%) |
| SAMPLE 5-6-4 | | 332 | 20 | 479 | 193 (40%) | 95 (20%) | 191 (40%) |
| SAMPLE 5-6-5 | | 379 | 20 | 286 | 128 (45%) | 22 (8%) | 134 (47%) |
| SAMPLE 5-6-6 | | 379 | 20 | 310 | 143 (46%) | 28 (9%) | 139 (45%) |
| SAMPLE 5-6-7 | PIERCING STRENGTH | 259 | 20 | 450 | 153 (34%) | 157 (35%) | 139 (31%) |
| SAMPLE 5-6-8 | 300 [gf] OR LESS | 259 | 20 | 409 | 132 (32%) | 162 (40%) | 115 (28%) |
| SAMPLE 5-6-9 | | 268 | 20 | 253 | 93 (37%) | 61 (24%) | 99 (39%) |
| SAMPLE 5-6-10 | | 288 | 20 | 330 | 128 (39%) | 67 (20%) | 135 (41%) |
| SAMPLE 5-6-11 | | 288 | 20 | 279 | 106 (38%) | 69 (25%) | 104 (37%) |

TABLE 38-continued

| SAMPLE 5-6-12 | PE SOLE BODY | 410 | 20 | 270 | — | 270 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 5-6-1 | | 6.5 | 7 (58%) | 6.5 | 4.55 | PTC IS UNNECESSARY | 96% |
| SAMPLE 5-6-2 | | 6.5 | 7 (58%) | 6.5 | 4.55 | PTC IS UNNECESSARY | 96% |
| SAMPLE 5-6-3 | | 6.5 | 7 (42%) | 6.5 | 4.55 | PTC IS UNNECESSARY | 96% |
| SAMPLE 5-6-4 | | 6.5 | 7 (42%) | 6.5 | 4.55 | PTC IS UNNECESSARY | 96% |
| SAMPLE 5-6-5 | | 6.5 | 7 (62%) | 6.5 | 4.55 | PTC IS NECESSARY | 96% |
| SAMPLE 5-6-6 | | 6.5 | 7 (62%) | 6.5 | 4.55 | PTC IS NECESSARY | 96% |
| SAMPLE 5-6-7 | | 6.5 | 7 (36%) | 6.5 | 4.55 | PTC IS UNNECESSARY | 96% |
| SAMPLE 5-6-8 | | 6.5 | 7 (36%) | 6.5 | 4.55 | PTC IS UNNECESSARY | 96% |
| SAMPLE 5-6-9 | | 6.5 | 7 (53%) | 6.5 | 4.55 | PTC IS NECESSARY | 96% |
| SAMPLE 5-6-10 | | 6.5 | 7 (52%) | 6.5 | 4.55 | PTC IS NECESSARY | 96% |
| SAMPLE 5-6-11 | | 6.5 | 7 (52%) | 6.5 | 4.55 | PTC IS NECESSARY | 96% |
| SAMPLE 5-6-12 | | — | 20 (52%) | — | 4.55 | PTC IS UNNECESSARY | 96% |

TABLE 39

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 5-7-1 | PIERCING STRENGTH | 468 | 30 | 540 | 243 (45%) | 54 (10%) | 243 (45%) |
| SAMPLE 5-7-2 | 450 [gf] OR MORE | 468 | 30 | 546 | 234 (43%) | 65 (12%) | 245 (45%) |
| SAMPLE 5-7-3 | | 498 | 30 | 772 | 324 (42%) | 139 (18%) | 308 (40%) |
| SAMPLE 5-7-4 | | 498 | 30 | 718 | 287 (40%) | 143 (20%) | 287 (40%) |
| SAMPLE 5-7-5 | | 555 | 30 | 429 | 193 (45%) | 34 (8%) | 201 (47%) |
| SAMPLE 5-7-6 | | 555 | 30 | 465 | 213 (46%) | 41 (9%) | 209 (45%) |
| SAMPLE 5-7-7 | PIERCING STRENGTH | 388 | 30 | 675 | 229 (34%) | 236 (35%) | 209 (31%) |
| SAMPLE 5-7-8 | 450 [gf] OR LESS | 388 | 30 | 613 | 196 (32%) | 245 (40%) | 171 (28%) |
| SAMPLE 5-7-9 | | 402 | 30 | 379 | 140 (37%) | 90 (24%) | 147 (39%) |
| SAMPLE 5-7-10 | | 432 | 30 | 495 | 193 (39%) | 99 (20%) | 202 (41%) |
| SAMPLE 5-7-11 | | 432 | 30 | 418 | 158 (38%) | 104 (25%) | 154 (37%) |

TABLE 39-continued

| SAMPLE 5-7-12 | PE SOLE BODY | 615 | 30 | 405 | — | 405 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 5-7-1 | | 10 | 10 (58%) | 10 | 4.55 | PTC IS UNNECESSARY | 92% |
| SAMPLE 5-7-2 | | 10 | 10 (58%) | 10 | 4.55 | PTC IS UNNECESSARY | 92% |
| SAMPLE 5-7-3 | | 10 | 10 (42%) | 10 | 4.55 | PTC IS UNNECESSARY | 92% |
| SAMPLE 5-7-4 | | 10 | 10 (42%) | 10 | 4.55 | PTC IS UNNECESSARY | 92% |
| SAMPLE 5-7-5 | | 10 | 10 (62%) | 10 | 4.55 | PTC IS UNNECESSARY | 92% |
| SAMPLE 5-7-6 | | 10 | 10 (62%) | 10 | 4.55 | PTC IS UNNECESSARY | 92% |
| SAMPLE 5-7-7 | | 10 | 10 (36%) | 10 | 4.55 | PTC IS UNNECESSARY | 92% |
| SAMPLE 5-7-8 | | 10 | 10 (36%) | 10 | 4.55 | PTC IS UNNECESSARY | 92% |
| SAMPLE 5-7-9 | | 10 | 10 (53%) | 10 | 4.55 | PTC IS UNNECESSARY | 92% |
| SAMPLE 5-7-10 | | 10 | 10 (52%) | 10 | 4.55 | PTC IS UNNECESSARY | 92% |
| SAMPLE 5-7-11 | | 10 | 10 (52%) | 10 | 4.55 | PTC IS UNNECESSARY | 92% |
| SAMPLE 5-7-12 | | — | 30 (52%) | — | 4.55 | PTC IS UNNECESSARY | 92% |

TABLE 40

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 5-8-1 | PIERCING STRENGTH | 546 | 35 | 630 | 283 (45%) | 63 (10%) | 283 (45%) |
| SAMPLE 5-8-2 | 525 [gf] OR MORE | 546 | 35 | 637 | 273 (43%) | 76 (12%) | 286 (45%) |
| SAMPLE 5-8-3 | | 581 | 35 | 901 | 378 (42%) | 162 (18%) | 360 (40%) |
| SAMPLE 5-8-4 | | 581 | 35 | 838 | 335 (40%) | 167 (20%) | 335 (40%) |
| SAMPLE 5-8-5 | | 663 | 35 | 500 | 225 (45%) | 40 (8%) | 235 (47%) |
| SAMPLE 5-8-6 | | 663 | 35 | 542 | 249 (46%) | 48 (9%) | 243 (45%) |
| SAMPLE 5-8-7 | PIERCING STRENGTH | 453 | 35 | 787 | 267 (34%) | 275 (35%) | 243 (31%) |
| SAMPLE 5-8-8 | 525 [gf] OR LESS | 453 | 35 | 715 | 228 (32%) | 286 (40%) | 200 (28%) |
| SAMPLE 5-8-9 | | 469 | 35 | 442 | 163 (37%) | 106 (24%) | 172 (39%) |
| SAMPLE 5-8-10 | | 504 | 35 | 577 | 225 (39%) | 115 (20%) | 236 (41%) |
| SAMPLE 5-8-11 | | 504 | 35 | 488 | 185 (38%) | 122 (25%) | 180 (37%) |

TABLE 40-continued

| | | | | | | | |
|---|---|---|---|---|---|---|---|
| SAMPLE 5-8-12 | PE SOLE BODY | 717 | 35 | 472 | — | 472 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 5-8-1 | | 11.5 | 12 (58%) | 11.5 | 4.55 | PTC IS UNNECESSARY | 89% |
| SAMPLE 5-8-2 | | 11.5 | 12 (58%) | 11.5 | 4.55 | PTC IS UNNECESSARY | 89% |
| SAMPLE 5-8-3 | | 11.5 | 12 (42%) | 11.5 | 4.55 | PTC IS UNNECESSARY | 89% |
| SAMPLE 5-8-4 | | 11.5 | 12 (42%) | 11.5 | 4.55 | PTC IS UNNECESSARY | 89% |
| SAMPLE 5-8-5 | | 11.5 | 12 (62%) | 11.5 | 4.55 | PTC IS UNNECESSARY | 89% |
| SAMPLE 5-8-6 | | 11.5 | 12 (62%) | 11.5 | 4.55 | PTC IS UNNECESSARY | 89% |
| SAMPLE 5-8-7 | | 11.5 | 12 (36%) | 11.5 | 4.55 | PTC IS UNNECESSARY | 89% |
| SAMPLE 5-8-8 | | 11.5 | 12 (36%) | 11.5 | 4.55 | PTC IS UNNECESSARY | 89% |
| SAMPLE 5-8-9 | | 11.5 | 12 (53%) | 11.5 | 4.55 | PTC IS UNNECESSARY | 89% |
| SAMPLE 5-8-10 | | 11.5 | 12 (52%) | 11.5 | 4.55 | PTC IS UNNECESSARY | 89% |
| SAMPLE 5-8-11 | | 11.5 | 12 (52%) | 11.5 | 4.55 | PTC IS UNNECESSARY | 89% |
| SAMPLE 5-8-12 | | — | 35 (52%) | — | 4.55 | PTC IS UNNECESSARY | 89% |

TABLE 41

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST | AIR PERMEABILITY OF THE 2ND | AIR PERMEABILITY OF THE 3RD |
| | FEATURE | PIERCING STRENGTH [gf] | FILM THICKNESS [μ] | AIR PERMEABILITY [sec/100 ml] | LAYER PP [sec/100 ml] (TO TOTAL) | LAYER PE [sec/100 ml] (TO TOTAL) | LAYER PP [sec/100 ml] (TO TOTAL) |
| SAMPLE 6-1-1 | PIERCING STRENGTH | 78 | 5 | 90 | 40.5 (45%) | 9 (10%) | 40.5 (45%) |
| SAMPLE 6-1-2 | 75 [gf] OR MORE | 78 | 5 | 91 | 39 (43%) | 11 (12%) | 41 (45%) |
| SAMPLE 6-1-3 | | 83 | 5 | 128 | 54 (42%) | 23 (18%) | 51 (40%) |
| SAMPLE 6-1-4 | | 83 | 5 | 119 | 48 (40%) | 23 (20%) | 48 (40%) |
| SAMPLE 6-1-5 | | 94 | 5 | 71 | 32 (45%) | 6 (8%) | 33 (47%) |
| SAMPLE 6-1-6 | | 94 | 5 | 78 | 36 (46%) | 7 (9%) | 35 (45%) |
| SAMPLE 6-1-7 | PIERCING STRENGTH | 64 | 5 | 112 | 38 (34%) | 39 (35%) | 35 (31%) |
| SAMPLE 6-1-8 | 75 [gf] OR LESS | 64 | 5 | 102 | 33 (32%) | 41 (40%) | 28 (28%) |
| SAMPLE 6-1-9 | | 67 | 5 | 63 | 23 (37%) | 15 (24%) | 25 (39%) |
| SAMPLE 6-1-10 | | 72 | 5 | 82 | 32 (39%) | 16 (20%) | 34 (41%) |
| SAMPLE 6-1-11 | | 72 | 5 | 69 | 26 (38%) | 17 (25%) | 25 (37%) |

TABLE 41-continued

| SAMPLE 6-1-12 | PE SOLE BODY | 102 | 5 | 67 | — | 67 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| | SAMPLE 6-1-1 | 1.5 | 2 (58%) | 1.5 | 4.6 | PTC IS NECESSARY | 99% |
| | SAMPLE 6-1-2 | 1.5 | 2 (58%) | 1.5 | 4.6 | PTC IS NECESSARY | 99% |
| | SAMPLE 6-1-3 | 1.5 | 2 (42%) | 1.5 | 4.6 | PTC IS NECESSARY | 99% |
| | SAMPLE 6-1-4 | 1.5 | 2 (42%) | 1.5 | 4.6 | PTC IS NECESSARY | 99% |
| | SAMPLE 6-1-5 | 1.5 | 2 (62%) | 1.5 | 4.6 | PTC IS NECESSARY | 99% |
| | SAMPLE 6-1-6 | 1.5 | 2 (62%) | 1.5 | 4.6 | PTC IS NECESSARY | 99% |
| | SAMPLE 6-1-7 | 1.5 | 2 (36%) | 1.5 | 4.6 | PTC IS NECESSARY | 99% |
| | SAMPLE 6-1-8 | 1.5 | 2 (36%) | 1.5 | 4.6 | PTC IS NECESSARY | 99% |
| | SAMPLE 6-1-9 | 1.5 | 2 (53%) | 1.5 | 4.6 | PTC IS NECESSARY | 99% |
| | SAMPLE 6-1-10 | 1.5 | 2 (52%) | 1.5 | 4.6 | PTC IS NECESSARY | 99% |
| | SAMPLE 6-1-11 | 1.5 | 2 (53%) | 1.5 | 4.6 | PTC IS NECESSARY | 99% |
| | SAMPLE 6-1-12 | — | 5 (52%) | — | 4.6 | PTC IS NECESSARY | 99% |

TABLE 42

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 6-2-1 | PIERCING STRENGTH | 156 | 10 | 180 | 81 (45%) | 18 (10%) | 81 (45%) |
| SAMPLE 6-2-2 | 150 [gf] OR MORE | 156 | 10 | 182 | 78 (43%) | 21 (12%) | 81 (45%) |
| SAMPLE 6-2-3 | | 166 | 10 | 257 | 108 (42%) | 47 (18%) | 102 (40%) |
| SAMPLE 6-2-4 | | 166 | 10 | 240 | 96 (40%) | 48 (20%) | 96 (40%) |
| SAMPLE 6-2-5 | | 189 | 10 | 143 | 64 (45%) | 11 (8%) | 67 (47%) |
| SAMPLE 6-2-6 | | 189 | 10 | 155 | 71 (46%) | 14 (9%) | 70 (45%) |
| SAMPLE 6-2-7 | PIERCING STRENGTH | 130 | 10 | 225 | 76 (34%) | 78 (35%) | 70 (31%) |
| SAMPLE 6-2-8 | 150 [gf] OR LESS | 130 | 10 | 204 | 66 (32%) | 81 (40%) | 57 (28%) |
| SAMPLE 6-2-9 | | 134 | 10 | 126 | 46 (37%) | 30 (24%) | 49 (39%) |
| SAMPLE 6-2-10 | | 144 | 10 | 165 | 64 (39%) | 33 (20%) | 67 (41%) |
| SAMPLE 6-2-11 | | 144 | 10 | 139 | 53 (38%) | 34 (25%) | 52 (37%) |

TABLE 42-continued

| SAMPLE 6-2-12 | PE SOLE BODY | 205 | 10 | 135 | — | 135 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 6-2-1 | | 3 | 4 (58%) | 3 | 4.6 | PTC IS UNNECESSARY | 99% |
| SAMPLE 6-2-2 | | 3 | 4 (58%) | 3 | 4.6 | PTC IS UNNECESSARY | 99% |
| SAMPLE 6-2-3 | | 3 | 4 (42%) | 3 | 4.6 | PTC IS UNNECESSARY | 99% |
| SAMPLE 6-2-4 | | 3 | 4 (42%) | 3 | 4.6 | PTC IS UNNECESSARY | 99% |
| SAMPLE 6-2-5 | | 3 | 4 (62%) | 3 | 4.6 | PTC IS NECESSARY | 99% |
| SAMPLE 6-2-6 | | 3 | 4 (62%) | 3 | 4.6 | PTC IS NECESSARY | 99% |
| SAMPLE 6-2-7 | | 3 | 4 (36%) | 3 | 4.6 | PTC IS UNNECESSARY | 99% |
| SAMPLE 6-2-8 | | 3 | 4 (36%) | 3 | 4.6 | PTC IS UNNECESSARY | 99% |
| SAMPLE 6-2-9 | | 3 | 4 (53%) | 3 | 4.6 | PTC IS NECESSARY | 99% |
| SAMPLE 6-2-10 | | 3 | 4 (52%) | 3 | 4.6 | PTC IS NECESSARY | 99% |
| SAMPLE 6-2-11 | | 3 | 4 (52%) | 3 | 4.6 | PTC IS NECESSARY | 99% |
| SAMPLE 6-2-12 | | — | 10 (52%) | — | 4.6 | PTC IS UNNECESSARY | 99% |

TABLE 43

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | | | | | AIR PERMEABILITY OF THE 1ST | AIR PERMEABILITY OF THE 2ND | AIR PERMEABILITY OF THE 3RD |
| | FEATURE | PIERCING STRENGTH [gf] | FILM THICKNESS [μ] | AIR PERMEABILITY [sec/100 ml] | LAYER PP [sec/100 ml] (TO TOTAL) | LAYER PE [sec/100 ml] (TO TOTAL) | LAYER PP [sec/100 ml] (TO TOTAL) |
| SAMPLE 6-3-1 | PIERCING STRENGTH | 187 | 12 | 216 | 97 (45%) | 22 (10%) | 97 (45%) |
| SAMPLE 6-3-2 | 180 [gf] OR MORE | 187 | 12 | 218 | 94 (43%) | 26 (12%) | 98 (45%) |
| SAMPLE 6-3-3 | | 199 | 12 | 307 | 129 (42%) | 55 (18%) | 123 (40%) |
| SAMPLE 6-3-4 | | 199 | 12 | 288 | 115 (40%) | 58 (20%) | 115 (40%) |
| SAMPLE 6-3-5 | | 226 | 12 | 171 | 77 (45%) | 14 (8%) | 80 (47%) |
| SAMPLE 6-3-6 | | 226 | 12 | 186 | 85 (46%) | 17 (9%) | 84 (45%) |
| SAMPLE 6-3-7 | PIERCING STRENGTH | 156 | 12 | 271 | 92 (34%) | 95 (35%) | 84 (31%) |
| SAMPLE 6-3-8 | 180 [gf] OR LESS | 156 | 12 | 244 | 78 (32%) | 98 (40%) | 68 (28%) |
| SAMPLE 6-3-9 | | 160 | 12 | 151 | 56 (37%) | 36 (24%) | 59 (39%) |
| SAMPLE 6-3-10 | | 172 | 12 | 198 | 77 (39%) | 40 (20%) | 81 (41%) |
| SAMPLE 6-3-11 | | 172 | 12 | 165 | 63 (38%) | 41 (25%) | 61 (37%) |

TABLE 43-continued

| SAMPLE | | | | | | | |
|---|---|---|---|---|---|---|---|
| SAMPLE 6-3-12 | PE SOLE BODY | 246 | 12 | 162 | — | 162 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 6-3-1 | | 4 | 4 (58%) | 4 | 4.6 | PTC IS UNNECESSARY | 99% |
| SAMPLE 6-3-2 | | 4 | 4 (58%) | 4 | 4.6 | PTC IS UNNECESSARY | 99% |
| SAMPLE 6-3-3 | | 4 | 4 (42%) | 4 | 4.6 | PTC IS UNNECESSARY | 99% |
| SAMPLE 6-3-4 | | 4 | 4 (42%) | 4 | 4.6 | PTC IS UNNECESSARY | 99% |
| SAMPLE 6-3-5 | | 4 | 4 (62%) | 4 | 4.6 | PTC IS NECESSARY | 99% |
| SAMPLE 6-3-6 | | 4 | 4 (62%) | 4 | 4.6 | PTC IS NECESSARY | 99% |
| SAMPLE 6-3-7 | | 4 | 4 (36%) | 4 | 4.6 | PTC IS UNNECESSARY | 99% |
| SAMPLE 6-3-8 | | 4 | 4 (36%) | 4 | 4.6 | PTC IS UNNECESSARY | 99% |
| SAMPLE 6-3-9 | | 4 | 4 (53%) | 4 | 4.6 | PTC IS NECESSARY | 99% |
| SAMPLE 6-3-10 | | 4 | 4 (52%) | 4 | 4.6 | PTC IS NECESSARY | 99% |
| SAMPLE 6-3-11 | | 4 | 4 (52%) | 4 | 4.6 | PTC IS NECESSARY | 99% |
| SAMPLE 6-3-12 | | — | 12 (52%) | — | 4.6 | PTC IS UNNECESSARY | 99% |

TABLE 44

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 6-4-1 | PIERCING STRENGTH | 250 | 16 | 288 | 129 (49%) | 30 (10%) | 129 (45%) |
| SAMPLE 6-4-2 | 240 [gf] OR MORE | 250 | 16 | 291 | 125 (43%) | 35 (12%) | 131 (45%) |
| SAMPLE 6-4-3 | | 265 | 16 | 410 | 172 (42%) | 74 (18%) | 164 (40%) |
| SAMPLE 6-4-4 | | 265 | 16 | 383 | 153 (40%) | 77 (20%) | 153 (40%) |
| SAMPLE 6-4-5 | | 302 | 16 | 227 | 102 (45%) | 18 (8%) | 107 (47%) |
| SAMPLE 6-4-6 | | 302 | 16 | 247 | 114 (46%) | 22 (9%) | 111 (45%) |
| SAMPLE 6-4-7 | PIERCING STRENGTH | 208 | 16 | 359 | 122 (34%) | 126 (35%) | 111 (31%) |
| SAMPLE 6-4-8 | 240 [gf] OR LESS | 208 | 16 | 325 | 104 (32%) | 130 (40%) | 91 (28%) |
| SAMPLE 6-4-9 | | 214 | 16 | 201 | 74 (37%) | 48 (24%) | 78 (39%) |
| SAMPLE 6-4-10 | | 230 | 16 | 263 | 102 (39%) | 53 (20%) | 108 (41%) |
| SAMPLE 6-4-11 | | 230 | 16 | 224 | 85 (38%) | 56 (25%) | 83 (37%) |

TABLE 44-continued

| SAMPLE 6-4-12 | PE SOLE BODY | 328 | 16 | 216 | — | 216 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 6-4-1 | | 5.5 | 5 (58%) | 5.5 | 4.6 | PTC IS UNNECESSARY | 98% |
| SAMPLE 6-4-2 | | 5.5 | 5 (58%) | 5.5 | 4.6 | PTC IS UNNECESSARY | 98% |
| SAMPLE 6-4-3 | | 5.5 | 5 (42%) | 5.5 | 4.6 | PTC IS UNNECESSARY | 98% |
| SAMPLE 6-4-4 | | 5.5 | 5 (42%) | 5.5 | 4.6 | PTC IS UNNECESSARY | 98% |
| SAMPLE 6-4-5 | | 5.5 | 5 (62%) | 5.5 | 4.6 | PTC IS NECESSARY | 98% |
| SAMPLE 6-4-6 | | 5.5 | 5 (62%) | 5.5 | 4.6 | PTC IS NECESSARY | 98% |
| SAMPLE 6-4-7 | | 5.5 | 5 (36%) | 5.5 | 4.6 | PTC IS UNNECESSARY | 98% |
| SAMPLE 6-4-8 | | 5.5 | 5 (36%) | 5.5 | 4.6 | PTC IS UNNECESSARY | 98% |
| SAMPLE 6-4-9 | | 5.5 | 5 (53%) | 5.5 | 4.6 | PTC IS NECESSARY | 98% |
| SAMPLE 6-4-10 | | 5.5 | 5 (52%) | 5.5 | 4.6 | PTC IS NECESSARY | 98% |
| SAMPLE 6-4-11 | | 5.5 | 5 (52%) | 5.5 | 4.6 | PTC IS NECESSARY | 98% |
| SAMPLE 6-4-12 | | — | 16 (52%) | — | 4.6 | PTC IS UNNECESSARY | 98% |

TABLE 45

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 6-5-1 | PIERCING STRENGTH | 280 | 18 | 324 | 146 (45%) | 32 (10%) | 146 (45%) |
| SAMPLE 6-5-2 | 270 [gf] OR MORE | 280 | 18 | 326 | 140 (43%) | 39 (12%) | 147 (45%) |
| SAMPLE 6-5-3 | | 298 | 18 | 461 | 194 (42%) | 83 (18%) | 184 (40%) |
| SAMPLE 6-5-4 | | 298 | 18 | 430 | 172 (40%) | 86 (20%) | 172 (40%) |
| SAMPLE 6-5-5 | | 340 | 18 | 255 | 115 (45%) | 20 (8%) | 120 (47%) |
| SAMPLE 6-5-6 | | 340 | 18 | 278 | 128 (46%) | 25 (9%) | 125 (45%) |
| SAMPLE 6-5-7 | PIERCING STRENGTH | 234 | 18 | 403 | 137 (34%) | 141 (35%) | 125 (31%) |
| SAMPLE 6-5-8 | 270 [gf] OR LESS | 234 | 18 | 365 | 117 (32%) | 146 (40%) | 102 (28%) |
| SAMPLE 6-5-9 | | 241 | 18 | 226 | 84 (37%) | 54 (24%) | 88 (39%) |
| SAMPLE 6-5-10 | | 259 | 18 | 296 | 115 (39%) | 59 (20%) | 121 (41%) |
| SAMPLE 6-5-11 | | 259 | 18 | 252 | 96 (38%) | 63 (25%) | 93 (37%) |

TABLE 45-continued

| SAMPLE 6-5-12 | PE SOLE BODY | 369 | 18 | 243 | — | 243 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 6-5-1 | | 6 | 6 (58%) | 6 | 4.6 | PTC IS UNNECESSARY | 98% |
| SAMPLE 6-5-2 | | 6 | 6 (58%) | 6 | 4.6 | PTC IS UNNECESSARY | 98% |
| SAMPLE 6-5-3 | | 6 | 6 (42%) | 6 | 4.6 | PTC IS UNNECESSARY | 98% |
| SAMPLE 6-5-4 | | 6 | 6 (42%) | 6 | 4.6 | PTC IS UNNECESSARY | 98% |
| SAMPLE 6-5-5 | | 6 | 6 (62%) | 6 | 4.6 | PTC IS NECESSARY | 98% |
| SAMPLE 6-5-6 | | 6 | 6 (62%) | 6 | 4.6 | PTC IS NECESSARY | 98% |
| SAMPLE 6-5-7 | | 6 | 6 (36%) | 6 | 4.6 | PTC IS UNNECESSARY | 98% |
| SAMPLE 6-5-8 | | 6 | 6 (36%) | 6 | 4.6 | PTC IS UNNECESSARY | 98% |
| SAMPLE 6-5-9 | | 6 | 6 (53%) | 6 | 4.6 | PTC IS NECESSARY | 98% |
| SAMPLE 6-5-10 | | 6 | 6 (52%) | 6 | 4.6 | PTC IS NECESSARY | 98% |
| SAMPLE 6-5-11 | | 6 | 6 (52%) | 6 | 4.6 | PTC IS NECESSARY | 98% |
| SAMPLE 6-5-12 | | — | 16 (52%) | — | 4.6 | PTC IS UNNECESSARY | 98% |

TABLE 46

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 6-6-1 | PIERCING STRENGTH | 312 | 20 | 360 | 162 (45%) | 36 (10%) | 162 (45%) |
| SAMPLE 6-6-2 | 300 [gf] OR MORE | 312 | 20 | 364 | 156 (43%) | 45 (12%) | 163 (45%) |
| SAMPLE 6-6-3 | | 332 | 20 | 515 | 216 (42%) | 95 (18%) | 204 (40%) |
| SAMPLE 6-6-4 | | 332 | 20 | 479 | 193 (40%) | 95 (20%) | 191 (40%) |
| SAMPLE 6-6-5 | | 379 | 20 | 286 | 128 (45%) | 22 (8%) | 134 (47%) |
| SAMPLE 6-6-6 | | 379 | 20 | 310 | 143 (46%) | 28 (9%) | 139 (45%) |
| SAMPLE 6-6-7 | PIERCING STRENGTH | 259 | 20 | 450 | 153 (34%) | 157 (35%) | 139 (31%) |
| SAMPLE 6-6-8 | 300 [gf] OR LESS | 259 | 20 | 409 | 132 (32%) | 162 (40%) | 115 (28%) |
| SAMPLE 6-6-9 | | 268 | 20 | 253 | 93 (37%) | 61 (24%) | 99 (39%) |
| SAMPLE 6-6-10 | | 288 | 20 | 330 | 128 (39%) | 67 (20%) | 135 (41%) |
| SAMPLE 6-6-11 | | 288 | 20 | 279 | 106 (38%) | 69 (25%) | 104 (37%) |

TABLE 46-continued

| SAMPLE 6-6-12 | PE SOLE BODY | 410 | 20 | 270 | — | 270 (100[%]) | — |

| | | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 6-6-1 | | 6.5 | 7 (58%) | 6.5 | 4.6 | PTC IS UNNECESSARY | 96% |
| SAMPLE 6-6-2 | | 6.5 | 7 (58%) | 6.5 | 4.6 | PTC IS UNNECESSARY | 96% |
| SAMPLE 6-6-3 | | 6.5 | 7 (42%) | 6.5 | 4.6 | PTC IS UNNECESSARY | 96% |
| SAMPLE 6-6-4 | | 6.5 | 7 (42%) | 6.5 | 4.6 | PTC IS UNNECESSARY | 96% |
| SAMPLE 6-6-5 | | 6.5 | 7 (62%) | 6.5 | 4.6 | PTC IS NECESSARY | 96% |
| SAMPLE 6-6-6 | | 6.5 | 7 (62%) | 6.5 | 4.6 | PTC IS NECESSARY | 96% |
| SAMPLE 6-6-7 | | 6.5 | 7 (36%) | 6.5 | 4.6 | PTC IS UNNECESSARY | 96% |
| SAMPLE 6-6-8 | | 6.5 | 7 (36%) | 6.5 | 4.6 | PTC IS UNNECESSARY | 96% |
| SAMPLE 6-6-9 | | 6.5 | 7 (53%) | 6.5 | 4.6 | PTC IS NECESSARY | 96% |
| SAMPLE 6-6-10 | | 6.5 | 7 (52%) | 6.5 | 4.6 | PTC IS NECESSARY | 96% |
| SAMPLE 6-6-11 | | 6.5 | 7 (52%) | 6.5 | 4.6 | PTC IS NECESSARY | 96% |
| SAMPLE 6-6-12 | | — | 20 (52%) | — | 4.6 | PTC IS UNNECESSARY | 96% |

TABLE 47

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 6-7-1 | PIERCING STRENGTH | 468 | 30 | 540 | 243 (45%) | 54 (10%) | 243 (45%) |
| SAMPLE 6-7-2 | 450 [gf] OR MORE | 468 | 30 | 546 | 234 (43%) | 65 (12%) | 245 (45%) |
| SAMPLE 6-7-3 | | 498 | 30 | 772 | 324 (42%) | 139 (18%) | 308 (40%) |
| SAMPLE 6-7-4 | | 498 | 30 | 718 | 287 (40%) | 143 (20%) | 287 (40%) |
| SAMPLE 6-7-5 | | 555 | 30 | 429 | 193 (45%) | 34 (8%) | 201 (47%) |
| SAMPLE 6-7-6 | | 555 | 30 | 465 | 213 (46%) | 41 (9%) | 209 (45%) |
| SAMPLE 6-7-7 | PIERCING STRENGTH | 388 | 30 | 675 | 229 (34%) | 236 (35%) | 209 (31%) |
| SAMPLE 6-7-8 | 450 [gf] OR LESS | 388 | 30 | 613 | 196 (32%) | 245 (40%) | 171 (28%) |
| SAMPLE 6-7-9 | | 402 | 30 | 379 | 140 (37%) | 90 (24%) | 147 (39%) |
| SAMPLE 6-7-10 | | 432 | 30 | 495 | 193 (39%) | 99 (20%) | 202 (41%) |
| SAMPLE 6-7-11 | | 432 | 30 | 418 | 158 (38%) | 104 (25%) | 154 (37%) |

TABLE 47-continued

| SAMPLE 6-7-12 | PE SOLE BODY | 615 | 30 | 405 | — | 405 (100[%]) | — |

| | | FILM THICKNESS AND VOID RATIO OF EACH PORTION | | | | | LOAD |
|---|---|---|---|---|---|---|---|
| | | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | CHARACTERISTICS (DISCHARGE CAPACITANCE MAINTAINING RATIO AT 1[C] TO THAT AT 0.2[C]) |
| SAMPLE 6-7-1 | | 10 | 10 (58%) | 10 | 4.6 | PTC IS UNNECESSARY | 92% |
| SAMPLE 6-7-2 | | 10 | 10 (58%) | 10 | 4.6 | PTC IS UNNECESSARY | 92% |
| SAMPLE 6-7-3 | | 10 | 10 (42%) | 10 | 4.6 | PTC IS UNNECESSARY | 92% |
| SAMPLE 6-7-4 | | 10 | 10 (42%) | 10 | 4.6 | PTC IS UNNECESSARY | 92% |
| SAMPLE 6-7-5 | | 10 | 10 (62%) | 10 | 4.6 | PTC IS UNNECESSARY | 92% |
| SAMPLE 6-7-6 | | 10 | 10 (62%) | 10 | 4.6 | PTC IS UNNECESSARY | 92% |
| SAMPLE 6-7-7 | | 10 | 10 (36%) | 10 | 4.6 | PTC IS UNNECESSARY | 92% |
| SAMPLE 6-7-8 | | 10 | 10 (36%) | 10 | 4.6 | PTC IS UNNECESSARY | 92% |
| SAMPLE 6-7-9 | | 10 | 10 (53%) | 10 | 4.6 | PTC IS UNNECESSARY | 92% |
| SAMPLE 6-7-10 | | 10 | 10 (52%) | 10 | 4.6 | PTC IS UNNECESSARY | 92% |
| SAMPLE 6-7-11 | | 10 | 10 (52%) | 10 | 4.6 | PTC IS UNNECESSARY | 92% |
| SAMPLE 6-7-12 | | — | 30 (52%) | — | 4.6 | PTC IS UNNECESSARY | 92% |

TABLE 48

| | | PHYSICAL PROPERTIES OF SEPARATOR | | | ACTUAL MEASUREMENT VALUE OF AIR PERMEABILITY AND RATIO OF EACH PORTION | | |
|---|---|---|---|---|---|---|---|
| | FEATURE | PIERCING STRENGTH [gf] | FILM THICKNESS [μ] | AIR PERMEABILITY [sec/100 ml] | AIR PERMEABILITY OF THE 1ST LAYER PP [sec/100 ml] (TO TOTAL) | AIR PERMEABILITY OF THE 2ND LAYER PE [sec/100 ml] (TO TOTAL) | AIR PERMEABILITY OF THE 3RD LAYER PP [sec/100 ml] (TO TOTAL) |
| SAMPLE 6-8-1 | PIERCING STRENGTH | 546 | 35 | 630 | 283 (45%) | 63 (10%) | 283 (45%) |
| SAMPLE 6-8-2 | 525 [gf] OR MORE | 546 | 35 | 637 | 273 (43%) | 76 (12%) | 286 (45%) |
| SAMPLE 6-8-3 | | 581 | 35 | 901 | 378 (42%) | 162 (18%) | 360 (40%) |
| SAMPLE 6-8-4 | | 581 | 35 | 838 | 335 (40%) | 167 (20%) | 335 (40%) |
| SAMPLE 6-8-5 | | 663 | 35 | 500 | 225 (45%) | 40 (8%) | 235 (47%) |
| SAMPLE 6-8-6 | | 663 | 35 | 542 | 249 (46%) | 48 (9%) | 243 (45%) |
| SAMPLE 6-8-7 | PIERCING STRENGTH | 453 | 35 | 787 | 267 (34%) | 275 (35%) | 243 (31%) |
| SAMPLE 6-8-8 | 525 [gf] OR LESS | 453 | 35 | 715 | 228 (32%) | 286 (40%) | 200 (28%) |
| SAMPLE 6-8-9 | | 469 | 35 | 442 | 163 (37%) | 106 (24%) | 172 (39%) |
| SAMPLE 6-8-10 | | 504 | 35 | 577 | 225 (39%) | 115 (20%) | 236 (41%) |
| SAMPLE 6-8-11 | | 504 | 35 | 488 | 185 (38%) | 122 (25%) | 180 (37%) |

TABLE 48-continued

| | | | | | | | |
|---|---|---|---|---|---|---|---|
| SAMPLE 6-8-12 | PE SOLE BODY | 717 | 35 | 472 | — | 472 (100[%]) | — |

| | FILM THICKNESS AND VOID RATIO OF EACH PORTION | | | | | LOAD CHARACTERISTICS (DISCHARGE CAPACITANCE MAINTAINING RATIO AT 1[C] TO THAT AT 0.2[C]) |
|---|---|---|---|---|---|---|
| | FILM THICKNESS OF THE 1ST LAYER PP [μm] | FILM THICKNESS OF THE 2ND LAYER PE [μm] (VOID RATIO) | FILM THICKNESS OF THE 3RD LAYER PP [μm] | CHARGE VOLTAGE [V] | NECESSITY OF 60 [° C.] EXTERNAL SHORT-CIRCUIT PTC | |
| SAMPLE 6-8-1 | 11.5 | 12 (58%) | 11.5 | 4.6 | PTC IS UNNECESSARY | 89% |
| SAMPLE 6-8-2 | 11.5 | 12 (58%) | 11.5 | 4.6 | PTC IS UNNECESSARY | 89% |
| SAMPLE 6-8-3 | 11.5 | 12 (42%) | 11.5 | 4.6 | PTC IS UNNECESSARY | 89% |
| SAMPLE 6-8-4 | 11.5 | 12 (42%) | 11.5 | 4.6 | PTC IS UNNECESSARY | 89% |
| SAMPLE 6-8-5 | 11.5 | 12 (62%) | 11.5 | 4.6 | PTC IS UNNECESSARY | 89% |
| SAMPLE 6-8-6 | 11.5 | 12 (62%) | 11.5 | 4.6 | PTC IS UNNECESSARY | 89% |
| SAMPLE 6-8-7 | 11.5 | 12 (36%) | 11.5 | 4.6 | PTC IS UNNECESSARY | 89% |
| SAMPLE 6-8-8 | 11.5 | 12 (36%) | 11.5 | 4.6 | PTC IS UNNECESSARY | 89% |
| SAMPLE 6-8-9 | 11.5 | 12 (53%) | 11.5 | 4.6 | PTC IS UNNECESSARY | 89% |
| SAMPLE 6-8-10 | 11.5 | 12 (52%) | 11.5 | 4.6 | PTC IS UNNECESSARY | 89% |
| SAMPLE 6-8-11 | 11.5 | 12 (52%) | 11.5 | 4.6 | PTC IS UNNECESSARY | 89% |
| SAMPLE 6-8-12 | — | 35 (52%) | — | 4.6 | PTC IS UNNECESSARY | 89% |

(Samples 1-1-1 to 1-8-12)

A manufacturing method of the battery in which the capacitance of the anode 22 is expressed by the capacitive component by the dope and dedope of lithium, that is, the lithium ion secondary battery will be described hereinbelow with reference to FIG. 1.

First, the cathode active material is formed. Commercially available nickel nitrate, cobalt nitrate, and manganese nitrate are mixed as an aqueous solution so that mole ratios of Ni, Co, and Mn are respectively equal to 0.50, 0.20, and 0.30 and, thereafter, aqueous ammonia is dropped into the mixture solution while sufficiently agitating them, so that a composite hydroxide is obtained. The composite hydroxide and a lithium hydroxide are mixed, baked at 900° C. for 10 hours by using an electric furnace, and thereafter ground, so that lithium composite oxide powder as a cathode active material is obtained. By analyzing the obtained lithium composite oxide powder by ASS (Atomic Absorption Spectrometry), the compositions of $LiNi_{0.50}Co_{0.20}Mn_{0.30}O_2$ are confirmed. By measuring particle size by a laser diffracting method, an average particle size is equal to 13 μm. By further performing an X-ray diffraction measurement, it has been confirmed that a measured pattern is analogous to a pattern of $LiNiO_2$ disclosed in "09-0063" of an ICDD (International Center for Diffraction Data) card and a stratified rock-salt structure similar to that of $LiNiO_2$ is formed. Moreover, by observing the cathode active material by an SEM (Scanning Electron Microscope), spherical particles in which primary particles of 0.1 to 5 μm have been aggregated are observed.

The obtained $LiNi_{0.50}Co_{0.20}Mn_{0.30}O_2$ powder, graphite as a conductive material, and polyvinylidene fluoride as a binder are mixed at mass ratios of ($LiNi_{0.50}Co_{0.20}Mn_{0.30}O_2$ powder: graphite: polyvinylidene fluoride=86:10:4) and the cathode mixture is adjusted. Subsequently, the cathode mixture is dispersed into N-methyl-2-pyrolidone as a solvent, thereby forming the cathode mixture slurry. Subsequently, both surfaces of the cathode collector 21A made of a belt-shaped aluminum foil having a thickness of 20 μm are uniformly coated with the cathode mixture slurry, the solvent is dried, thereafter, the collector is compression-molded by the roll pressing machine, and the cathode active material layer 21B is formed. Thus, the cathode 21 is manufactured. A thickness of cathode 21 is set to 150 μm. After that, the cathode lead 25 made of aluminum is attached to one end of the cathode collector 21A.

As an anode active material, spherical graphite powder whose average particle size is equal to 30 μm and polyvinylidene fluoride as a binder are mixed at a mass ratio of (spherical graphite powder:polyvinylidene fluoride=90:10) and the anode mixture is adjusted. Subsequently, the anode mixture is dispersed into N-methyl-2-pyrolidone as a solvent, thereby forming the anode mixture slurry. Subsequently, both surfaces of the anode collector 22A made of a belt-shaped copper foil having a thickness of 15 μm are uniformly coated with the anode mixture slurry, the collector is press-molded with heat, and the anode active material layer 22B is formed. Thus, the anode 22 is manufactured. A thickness of anode 22 is set to 160 μm. After that, the anode lead 26 made of nickel is attached to one end of the anode collector 22A. An electrochemical equivalent ratio of the cathode 21 and the anode 22 is designed so that the capacitance of the anode 22 is expressed by the capacitive component by the dope and dedope of lithium.

After the cathode 21 and the anode 22 were formed as mentioned above, the separator 23 serving as a microporous membrane having the construction shown in each of TABLEs 1 to 8 is prepared. The anode 22, separator 23, cathode 21, and separator 23 are laminated in this order and the laminated body is wound in a spiral shape a number of times, thereby forming the winded electrode member 20 of a jelly-roll type. As separators 23, as shown in TABLEs 1 to 8, the separator obtained by thermally melt-bonding the polypropylene surface layer 23B onto both surfaces of the polyethylene base material layer 23A and the separator formed only by the polyethylene base material layer 23A are used. The film thickness is set to the following eight kinds of values: 5 μm, 10 μm, 12 μm, 16 μm, 18 μm, 20 μm, 30 μm, and 35 μm.

After the winded electrode member 20 was manufactured, the winded electrode member 20 is sandwiched by a pair of insulating plates 12 and 13, the anode lead 26 is welded to the battery can 11, the cathode lead 25 is welded to the relief valve mechanism 15, and the winded electrode member 20 is enclosed in the battery can 11 made of nickel-plated iron. After that, an electrolytic solution of 4.0 g is injected into the battery can 11 by a pressure reducing system.

As an electrolytic solution, there is used an electrolytic solution obtained by dissolving $LiPF_6$ as an electrolyte salt of 1.5 mol/kg into the solvent obtained by mixing ethylene carbonate, dimethyl carbonate, and vinylene carbonate as a solvent at mass ratios of (ethylene carbonate: dimethyl carbonate: vinylene carbonate=35:60:1).

After the electrolytic solution was injected into the battery can 11, the battery cap 14 is caulked to the battery can 11 through the gasket 17 whose surface has been coated with asphalt, so that the cylindrical secondary batteries each having a diameter of 18 mm and a height of 65 mm of the samples 1-1-1 to 1-8-12 are obtained.

<External Short-Circuit Test>

Each of the secondary batteries obtained as mentioned above is charged at a constant current of 1000 mA and a constant voltage of 4.2V. After that, an external short-circuit test is executed in a high-temperature bath at 60° C. and the temperature of the center part of the battery after 5 second interval from the short-cut is measured. By this test, when the battery temperature does not exceed 120° C., cut-off due to the shut-down of the separator 23 can be performed and the PTC element 16 is unnecessary. However, when the battery temperature exceeds 120° C., the shut-down by the separator 23 is not performed and the PTC element 16 is certainly necessary. In other words, the secondary battery in which the cut-off can be performed by the shut-down of the separator 23 even if there is no PTC element 16 can be regarded as a cell having excellent safety.

<Load Characteristics Evaluation>

First, each of the secondary batteries obtained as mentioned above is charged at a constant current of 1000 mA and a constant voltage of 4.2V under an environment of 23° C. After that, each of the secondary batteries is constant-current discharged under the conditions of a current of 0.2 C and a final voltage of 3V. Subsequently, the constant-current and constant-voltage charge is executed at 1000 mA and 4.2V. After that, the constant-current discharge is executed under the conditions of a current of 1 C and a final voltage of 3V.

After that, the load characteristics are obtained by the following expression.

[(discharge capacitance (mAh) at current 1 C)/(discharge capacitance (mAh) at current 0.2 C)]×100 where, the discharge capacitance is obtained by the following expression.

(Current value)×(discharge time until final voltage of 3.0V)

1 C: current value adapted to discharge a rated capacitance of the battery for 1 hour 0.2 C: current value adapted to discharge the rated capacitance of the battery for 5 hours (Samples 2-1-1 to 2-8-12)

The cylindrical secondary batteries are obtained in a manner similar to all of the foregoing Samples 1-1-1 to 1-8-12. Subsequently, the external short-circuit test and the load characteristics evaluation of each of the secondary batteries obtained in this manner are executed as follows.

<External Short-Circuit Test>

The external short-circuit test is executed in a manner similar to all of the foregoing Samples 1-1-1 to 1-8-12 except that the battery voltage is set to 4.35V.

<Load Characteristics Evaluation>

The load characteristics evaluation is made in a manner similar to all of the foregoing Samples 1-1-1 to 1-8-12 except that the battery voltage is set to 4.35V.

(Samples 3-1-1 to 3-8-12)

First, the cylindrical secondary batteries are obtained in a manner similar to all of the foregoing Samples 1-1-1 to 1-8-12. Subsequently, the external short-circuit test and the load characteristics evaluation of each of the secondary batteries obtained in this manner are executed as follows.

<External Short-Circuit Test>

The external short-circuit test is executed in a manner similar to all of the foregoing Samples 1-1-1 to 1-8-12 except that the battery voltage is set to 4.4V.

<Load Characteristics Evaluation>

The load characteristics evaluation is made in a manner similar to all of the foregoing Samples 1-1-1 to 1-8-12 except that the battery voltage is set to 4.4V.

(Samples 4-1-1 to 4-8-12)

First, the cylindrical secondary batteries are obtained in a manner similar to all of the foregoing Samples 1-1-1 to 1-8-12. Subsequently, the external short-circuit test and the load characteristics evaluation of each of the secondary batteries obtained in this manner are executed as follows.

<External Short-Circuit Test>

The external short-circuit test is executed in a manner similar to all of the foregoing Samples 1-1-1 to 1-8-12 except that the battery voltage is set to 4.45V.

<Load Characteristics Evaluation>

The load characteristics evaluation is made in a manner similar to all of the foregoing Samples 1-1-1 to 1-8-12 except that the battery voltage is set to 4.45V.

(Samples 5-1-1 to 5-8-12)

First, the cylindrical secondary batteries are obtained in a manner similar to all of the foregoing Samples 1-1-1 to 1-8-12. Subsequently, the external short-circuit test and the load characteristics evaluation of each of the secondary batteries obtained in this manner are executed as follows.

<External Short-Circuit Test>

The external short-circuit test is executed in a manner similar to all of the foregoing Samples 1-1-1 to 1-8-12 except that the battery voltage is set to 4.55V.

<Load Characteristics Evaluation>

The load characteristics evaluation is made in a manner similar to all of the foregoing Samples 1-1-1 to 1-8-12 except that the battery voltage is set to 4.55V.

(Samples 6-1-1 to 6-8-12)

First, the cylindrical secondary batteries are obtained in a manner similar to all of the foregoing Samples 1-1-1 to 1-8-12. Subsequently, the external short-circuit test and the load characteristics evaluation of each of the secondary batteries obtained in this manner are executed as follows.

<External Short-Circuit Test>

The external short-circuit test is executed in a manner similar to all of the foregoing Samples 1-1-1 to 1-8-12 except that the battery voltage is set to 4.6V.

<Load Characteristics Evaluation>

The load characteristics evaluation is made in a manner similar to all of the foregoing Samples 1-1-1 to 1-8-12 except that the battery voltage is set to 4.6V.

Results of the external short-circuit test and the load characteristics evaluation of the foregoing Samples 1-1-1 to 6-8-12 are shown in TABLEs 1 to 48. The following points are understood from the evaluation results.

When the film thickness of the separator is less than 10 μm, although the load characteristics are good, the PTC element 16 is necessary at all of the charge voltages.

When the film thickness of the separator exceeds 20 μm, although the PTC element 16 is not necessary at all of the charge voltages, the load characteristics are bad.

The secondary battery in which the PTC element 16 is unnecessary and the load characteristics exceed 95% is a secondary battery using the separator 23 which has a film thickness of 10 to 20 μm and in which a piercing strength in the case of the film thickness of 20 μm is equal to 300 gf (150 gf in the case of the film thickness of 10 μm) or more and air permeability of the polyethylene base material layer 23A is equal to or larger than 10% of that of the whole separator and is a secondary battery using the separator 23 in which the piercing strength is equal to or less than 300 gf and the air permeability of the polyethylene base material layer 23A is equal to or larger than 35% of that of the whole separator.

As shown in table 1-48, the layers with same thickness and same void ratio do not always take on the same air permeability. The permeability can be different. And the necessity of PTC element checked by the external short-circuit test at 60° C. depends not on thickness or void ratio of the polyethylene base material layer 23A, but on air permeability.

Although examples of embodiments have specifically been described above, the embodiments are not limited to them but many modifications are possible.

For example, the numerical values mentioned in the foregoing embodiments and Examples are merely shown as examples and other numerical values different from them may be used as necessary.

For example, although the foregoing embodiments and Examples have been explained with respect to the case of using lithium as an electrode reactive substance, the invention can be also applied and similar effects can be obtained with respect to the case of using another 1A group element such as sodium (Na), potassium (K), or the like, a 2A group element such as magnesium, calcium (Ca), or the like, another light metal such as aluminum or the like, lithium, or their alloy. In this instance, an anode material as described in the foregoing embodiments can be similarly used as an anode active material.

Although the foregoing examples have been explained with respect to the secondary battery having a winded structure, other battery structures can be similarly applied such as a battery having a structure in which the cathode and anode are folded or piled. In addition, the secondary battery can be what is called a coin type, a button type, a rectangular type, or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery in which a cathode and an anode are arranged to face each other and having a separator in between, wherein
said separator is formed by a plurality of laminated microporous membranes and has a film thickness of 10x μm and a piercing strength of 150x gf or more, where $1 \leq x \leq 2$,
the plurality of microporous membranes comprises a polyethylene base material layer and a polypropylene surface layer formed on a surface of the base material layer, and
an air permeability of the base material layer is between 10%-40% of an air permeability of the entire separator.

2. A battery according to claim 1, wherein an open circuit voltage in a full charging state per pair of said cathode and anode ranges from 4.25V to 6.00V.

3. A battery according to claim 1, wherein the base material layer and the microporous membranes other than said base material layer have different air permeability values.

4. A battery according to claim 1, wherein a melting point of the base material layer is lower than the melting point of the surface layer.

5. A battery according to claim 1, wherein said anode includes a carbon material or a metal material which can dope and dedope alkaline metal ions or alkaline earth metal ions.

6. A battery according to claim 5, wherein said carbon material contains at least one kind of material selected from a group consisting of graphite, easy-graphitizable carbon, and non-easy-graphitizable carbon.

7. A battery according to claim 5, wherein said alkaline metal or said alkaline earth metal contains at least one metal selected from the group consisting of silicon, germanium, tin, and lead.

8. A separator formed by a plurality of laminated microporous membranes, wherein
said separator has a film thickness of 10x μm and a piercing strength of 150x gf or more, where $1 \leq x \leq 2$,
the plurality of microporous membranes comprises a polyethylene base material layer and a polypropylene surface layer formed on a surface of the base material layer, and
an air permeability of the base material layer is between 10%-40% of an air permeability of the entire separator.

9. A battery in which a cathode and an anode are arranged to face each other and having a separator in between, wherein
said separator is formed by a plurality of laminated microporous membranes and has a film thickness of 10x μm and a piercing strength of 150x gf or more, where $1 \leq x \leq 2$,
the plurality of microporous membranes comprises a polyethylene base material layer and a polypropylene surface layer formed on a surface of the base material layer, and
an air permeability of the base material layer is between 35%-40% of an air permeability of the entire separator.

10. A battery according to claim 9, wherein an open circuit voltage in a full charging state per pair of said cathode and anode ranges from 4.25V to 6.00V.

11. A battery according to claim 9, wherein the base material layer and the microporous membranes other than said base material layer have different air permeability values.

12. A battery according to claim 9, wherein a melting point of the base material layer is lower than the melting point of the surface layer.

13. A battery according to claim 9, wherein said anode includes a carbon material or a metal material which can dope and dedope alkaline metal ions or alkaline earth metal ions.

14. A battery according to claim 13, wherein said carbon material contains at least one kind selected from the group consisting of a graphite, easy-graphitizable carbon, and non-easy-graphitizable carbon.

15. A battery according to claim 13, wherein said alkaline metal or said alkaline earth metal contains at least one kind selected from the group consisting of silicon, germanium, tin, and lead.

16. A separator formed by a plurality of laminated microporous membranes, wherein
   said separator has a film thickness of $10x$ μm and a piercing strength of $150x$ gf or more, where $1 \leq x \leq 2$,
   the plurality of microporous membranes comprises a polyethylene base material layer and a polypropylene surface layer formed on a surface of the base material layer, and
   an air permeability of the base material layer is between 35%-40% of an air permeability of the entire separator.

* * * * *